(12) United States Patent
Chen et al.

(10) Patent No.: US 9,473,752 B2
(45) Date of Patent: Oct. 18, 2016

(54) ACTIVATION OF PARAMETER SETS FOR MULTIVIEW VIDEO CODING (MVC) COMPATIBLE THREE-DIMENSIONAL VIDEO CODING (3DVC)

(71) Applicant: Qualcomm Incorporated, San Diego, CA (US)

(72) Inventors: Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 13/689,626

(22) Filed: Nov. 29, 2012

(65) Prior Publication Data

US 2013/0136176 A1    May 30, 2013

Related U.S. Application Data

(60) Provisional application No. 61/565,376, filed on Nov. 30, 2011, provisional application No. 61/565,938, filed on Dec. 1, 2011, provisional application No. 61/579,631, filed on Dec. 22, 2011, provisional application No. 61/584,009, filed on Jan. 6, 2012.

(51) Int. Cl.
*H04N 19/00* (2014.01)
*H04N 19/50* (2014.01)
(Continued)

(52) U.S. Cl.
CPC ............ *H04N 7/32* (2013.01); *H04N 13/0003* (2013.01); *H04N 13/0048* (2013.01);
(Continued)

(58) Field of Classification Search
CPC .................... H04N 13/0003; H04N 13/0048; H04N 7/32; H04N 19/423; H04N 19/50; H04N 19/176; H04N 19/70; H04N 19/597; H04N 19/467; H04N 19/61; H04N 7/12; H04N 19/43; H04N 19/44; H04N 19/42; G06K 9/36; G06K 9/46; G06T 1/00
See application file for complete search history.

(56) References Cited

U.S. PATENT DOCUMENTS

| | | | |
|---|---|---|---|
| 7,415,069 | B2 | 8/2008 | Winger |
| 8,139,611 | B2 | 3/2012 | Wiegand |

(Continued)

FOREIGN PATENT DOCUMENTS

| | | |
|---|---|---|
| JP | 2004274694 A | 9/2004 |
| JP | 2010157824 A | 7/2010 |

(Continued)

OTHER PUBLICATIONS

Shao et al. Asymmetric coding of multi-view video plus depth based 3-D video for view rendering, F Shao, G Jiang, M Yu, K Chen, YS Ho—Multimedia, IEEE Transactions on, Sep. 22, 2011.*

(Continued)

*Primary Examiner* — Jayanti K Patel
*Assistant Examiner* — Frank Huang
(74) *Attorney, Agent, or Firm* — Shumaker & Sieffert, P.A.

(57) ABSTRACT

In general, techniques are described for separately coding depth and texture components of video data. A video coding device for coding video data that includes a view component comprised of a depth component and a texture component may perform the techniques. The video coding device may comprise, as one example, a processor configured to activate a parameter set as a texture parameter set for the texture component of the view component, and code the texture component of the view component based on the activated texture parameter set.

38 Claims, 9 Drawing Sheets

(51) Int. Cl.
  *H04N 13/00* (2006.01)
  *H04N 19/597* (2014.01)
  *H04N 19/176* (2014.01)
  *H04N 19/70* (2014.01)
  *H04N 19/423* (2014.01)

(52) U.S. Cl.
  CPC ......... *H04N 19/176* (2014.11); *H04N 19/423* (2014.11); *H04N 19/50* (2014.11); *H04N 19/597* (2014.11); *H04N 19/70* (2014.11)

(56) References Cited

U.S. PATENT DOCUMENTS

| | | | |
|---|---|---|---|
| 8,532,410 B2 * | 9/2013 | Tian et al. | 382/238 |
| 8,675,730 B2 * | 3/2014 | Garg et al. | 375/240.01 |
| 2005/0058206 A1 | 3/2005 | Lim et al. | |
| 2007/0086521 A1 | 4/2007 | Wang et al. | |
| 2008/0013620 A1 | 1/2008 | Hannuksela et al. | |
| 2009/0147850 A1 | 6/2009 | Pandit | |
| 2010/0002762 A1 | 1/2010 | Pandit et al. | |
| 2010/0020884 A1 | 1/2010 | Pandit | |
| 2010/0034258 A1 | 2/2010 | Pandit et al. | |
| 2010/0091881 A1 | 4/2010 | Pandit et al. | |
| 2010/0091882 A1 | 4/2010 | Luo et al. | |
| 2010/0111183 A1 | 5/2010 | Jeon et al. | |
| 2010/0142613 A1 | 6/2010 | Zhu | |
| 2010/0189173 A1 | 7/2010 | Chen et al. | |
| 2010/0260265 A1 | 10/2010 | Jeon | |
| 2010/0316134 A1 | 12/2010 | Chen et al. | |
| 2011/0032999 A1 | 2/2011 | Chen et al. | |
| 2011/0216833 A1 | 9/2011 | Chen et al. | |
| 2011/0221861 A1 | 9/2011 | Jeon et al. | |
| 2011/0222602 A1 | 9/2011 | Sung et al. | |
| 2011/0255796 A1 | 10/2011 | Nakamura et al. | |
| 2011/0298895 A1 | 12/2011 | Tian et al. | |
| 2012/0016965 A1 | 1/2012 | Chen et al. | |
| 2012/0056981 A1 | 3/2012 | Tian et al. | |

FOREIGN PATENT DOCUMENTS

| | | |
|---|---|---|
| JP | 2010525662 A | 7/2010 |
| JP | 2010525724 A | 7/2010 |
| JP | 2010531554 A | 9/2010 |
| JP | 2011509631 A | 3/2011 |
| JP | 2015535405 A | 12/2015 |
| KR | 20090077906 A | 7/2009 |
| KR | 20100014553 A | 2/2010 |
| KR | 20110116239 A | 10/2011 |
| WO | 2008047303 A2 | 4/2008 |
| WO | 2008048515 A2 | 4/2008 |
| WO | 2008084443 A1 | 7/2008 |
| WO | 2008128388 A1 | 10/2008 |
| WO | 2008130528 A2 | 10/2008 |
| WO | 2008133455 A1 | 11/2008 |
| WO | 2009048502 A2 | 4/2009 |
| WO | 2009091383 A1 | 7/2009 |
| WO | 2009091383 A2 | 7/2009 |
| WO | 2010043773 A1 | 4/2010 |
| WO | 2010085361 A2 | 7/2010 |
| WO | 2010096189 A1 | 8/2010 |
| WO | 2014044908 A1 | 3/2014 |

OTHER PUBLICATIONS

International Preliminary Report on Patentability—PCT/US2012/067426, The International Bureau of WIPO—Geneva, Switzerland, Feb. 26, 2014, 10 pp.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Response to Written Opinion dated Mar. 6, 2013 from International Application No. PCT/US2012/067426, filed Sep. 25, 2013, 25 pp.
Second Written Opinion from International Application No. PCT/US2012/067426, dated Nov. 25, 2013, 8 pp.
Response to Second Written Opinion dated Nov. 25, 2013 from International Application No. PCT/US2012/067426, dated Jan. 24, 2014, 6 pp.
Vetro, "Joint Draft 7.0 on Multiview Video Coding," 27th Meeting, Geneva, CH, JVT ISO/IEC JTC1/SC29/WG11 and ITU-T SG.16, Document JVT-AA209, Apr. 23-29, 2008, 55 pp.
Vetro, "Text of ISO/IEC 14496-10:200X/FPDAM 1 Multiview Video Coding," MPEG Meeting, Antalya, Turkey, ISO/IEC JTC1/SC29/WG11, Document No. N9576, Jan. 2008, 42 pp.
Suzuki et al., "Text of ISO/IEC 14496-10:2012/PDAM2 MVC extension for inclusion of depth maps," MPEG Meeting, Geneva, CH, ISO/IEC JTC1/SC29/WG11, Document No. N12731, May 2012, 44 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 2011, JCTVC-G1103_d2, 214 pp.
Bross et al., "High efficiency video coding (HEVC) text specification draft 6," 7th Meeting: Geneva, CH, Nov. 21-30, 2011, JCTVC-H1003, 259 pp.
Bross et al., "High efficiency video coding (HEVC) text specification draft 7," 9th Meeting: Geneva, CH, Apr. 27-May 7, 2012, JCTVC-I1003_d21, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High Efficiency Video Coding (HEVC) text specification draft 9," 11th Meeting: Shanghai, CN, Oct. 10-19, 2012, JCTVC-K1003_v7, 290 pp.
Bross et al., "High Efficiency Video Coding (HEVC) text specification draft 10," 12th Meeting: Geneva, CH, Jan. 14-23, 2013, JCTVC-L1003_v34, 310 pp.
Chen et al., "The Emerging MVC Standard for 3D Video Services," EURASIP Journal on Advances in Signal Processing, vol. 2009, Article ID 786015, published Mar. 25, 2008, 13 pp.
Chen et al., "3D-HLS: Signalling number of to-be-decoded texture/depth views for MVC based 3DV," MPEG Meeting, Stockholm, SE, ISO/IEC JTC1/SC29/WG11, Document No. JCT2-A0100, Jul. 16-20, 2012, 3 pp.
Chen et al., "Buffer Requirement Analyses for Multiview Video Coding," Institute of Signal Processing, Tampere University of Technology Nokia Research Center, Nov. 7, 2007, 4 pp.
Chen et al., "Description of 3D video coding technology proposal by Qualcomm Incorporated," MPEG Meeting, Geneva, CH, ISO/IEC JTC1/SC29/WG11, Document No. m22583, Nov. 2011, 21 pp.
Chen et al., "High Level Syntax Design for MVC Compatible 3DV (Fast Track)," MPEG Meeting, San Jose, USA, ISO/IEC JTC1/SC29/WG11, Document No. m23805, Feb. 2012, 7 pp.
Hattori et al., "3DV-ATM HP: Proposed HRD text for ISO/IEC 14496-10:2012/PDAM 2MVC extensions for inclusion of depth maps," 1st Meeting: Stockholm, SE, Jul. 16-20, 2012, 26 pp.
Suzuki et al., "WD on MVC extensions for inclusion of depth maps," Coding of Moving Pictures and Associated Audio Information, Geneva, CH, Document No. Nxxxxx, Nov. 2011, 15 pp.
International Search Report and Written Opinion—PCT/US2012/067426—ISA/EPO—Mar. 6, 2013, 15 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Reichel, "Joint Scalable Video Model (JSVM) 4.0—Annex G," MPEG Meeting, Nice, FR, ISO/IEC JTC1/SC29/WG11, Document No. N7556-AnnexG, Oct. 2005, 166 pp.
Karlsson et al., "Layer Assignment Based on Depth Data Distribution for Multiview-Plus-Depth Scalable Video Coding," IEEE Transactions on Circuits and Systems for Video Technology, vol. 21, No. 6, June 2011, pp. 742-754.

(56) References Cited

OTHER PUBLICATIONS

Lee et al., "Multi-view prediction structure for free viewpoint video," Proceedings of 2010 IEEE 17th International Conference on Image Processing, Sep. 26-29, 2010, Hong Kong, pp. 3409-3412.
Na et al., "Multi-view Depth Video Coding using Depth View Synthesis," IEEE International Symposium on Circuits and Systems, May 18-21, 2008, pp. 1400-1403.
Shimizu et al., "Free-Viewpoint Scalable Multi-View Video Coding Using Panoramic Mosaic Depth Maps," 16th European Signal Processing Conference, Lausanne, Switzerland, Aug. 25-29, 2008, 5 pp.
Sullivan et al., "Editors' draft revision to ITU-T Rec. H.264 | ISO/IEC 14496-10 Advanced Video Coding—in preparation for ITU-T SG 16 AAP Consent (in integrated form)," ISO/IEC JTC1/SC29/WG11 and ITU-T SG16 Q.6, 30th Meeting, Geneva, CH, Jan. 29-Feb. 3, 2009, 683 pp.
Suzuki et al., "WD on MVC extensions for inclusion of depth maps," Coding of Moving Pictures and Associated Audio Information, ISO/IEC/JTC1/SC29/WG11, Document No. N12351, Dec. 2011, 14 pp.
Tian et al., "On 2D + Depth SEI Message," MPEG Meeting, Maui, USA, ISO/IEC JTC1/SC29/WG11, Document No. M16320, Apr. 2009, 10 pp.
Tian et al., "On spatially interleaved pictures SEI Message," 30th Meeting, Geneva, CH, Document No. JVT-AD017, Jan. 29-Feb. 3, 2009, 12 pp.
Vetro et al., "Overview of the Stereo and Multiview Video Coding Extensions of the H.264/MPEG-4 AVC Standard," Proceedings of the IEEE, vol. 99, No. 4, Apr. 2011, pp. 626-642.
U.S. Appl. No. 13/689,605, by Ying Chen, filed Nov. 29, 2012.
U.S. Appl. No. 13/689,560, by Ying Chen, filed Nov. 29, 2012.
U.S. Appl. No. 13/689,508, by Ying Chen, filed Nov. 29, 2012.
Wiegand et al., "WD1: Working Draft 1 of High-Efficiency Video Coding," JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011,193 pp.
Merkle, et al., "Multi-View Video Plus Depth Representation and Coding," IEEE International Conference on Image Processing, 2007, ICIP 2007, Sep. 16, 2007-Oct. 19, 2007, pp. 201-204, vol. 1.
"H.264 (Mar. 2010)", [online], Mar. 2010, ITU-T, pp. 608-612 (H.7.4.1.2.1).

Rusert T., et.al., "High-level syntax for 3D and scalable extensions: Inter-layer SPS prediction", [online], Apr. 26, 2012, Joint Collaborative Team on Video Coding (JCT-VC) of ITU-T SG 16 WP 3 and ISO/IEC JTC 1/SC 29/WG 11, Document: JCTVC-I0535 (version 1).
Suzuki T., et.al., "MVC Extension for Inclusion of Depth Maps Draft Text 4", [online], Jul. 30, 2012, Joint Collaborative Team on 3D Video Coding Extension Development of ITU-T SG 16 WP 3 and ISO/IEC JTC 1/SC 29/WG 11, Document: JCT2-A1001 (version 2).
"Series H: Audiovisual and Multimedia Systems, Infrastructure of audiovisual services—Coding of moving video," H.264 (Mar. 2010), Advanced video coding for generic audiovisual services; Mar. 2010, ITU-T, pp. 600-653 (Annex H), URL:https://www.itu.int/rec/dologin_pub.asp?lang=e&id=T-REC-H.264-201003-S!!PDF-E&type=items [Retrieved on Sep. 1, 2015].
"Series H: Audiovisual and Multimedia Systems, Infrastructure of audiovisual services—Coding of Moving video, Advanced video coding for generic audiovisual services, ITU-T H.264 (Mar. 2010)", [online], ITU-T, Mar. 2010, H.13.1.2, H.13.2.2, URL:https://www.itu.int/rec/dologin_pub.asp?lang=e&id=T-REC-H.264-201003-S!!PDF-E&type=items, 676 pp.
Suzuki, et al. "Text of ISO/IEC 14496-10:2012/DAM 2 MVC extensions for inclusion of depth maps" MPEG2012/Nxxxxx, [online], ISO/IEC JTC1/SC29/WG11, Jul. 19, 2012, JCT2-A0174_v2.doc, 1, URL: http://phenix.int-evry.fr/jct3v/doc_end_user/documents/1_Stockholm/wg11/J T3V-A0174-v3.zip, 81 pp.
Rusert, et al., "High level syntax for scalability support in HEVC", Jul. 1, 2011, Joint Collaborative Team on Video Coding (JCT-VC) of ITU-T SG16 WP3 and ISO/IEC JTC1/SC29/WG11, Document: JCTVC-F491 (version 1), [searched on Sep. 2, 2015], URL: http://phenix.it-sudparis.eu/jct/doc_end_user/documents/6_Torino/wg11/JCTVC-F491-v1.zip, 9 pp.
Suzuki, et al. "Text of ISO/IEC 14496-10:2012/DAM 2 MVC extensions for inclusion of depth maps" MPEG2012/N13140, ISO/IEC JTC1/SC29/WG11, Nov. 2, 2012, URL: http://phenix.int-evry.fr/jct3v/doc_end_user/documents/2_Shanghai/wg11/JCT3V-B1001-v1.zip, 81 pp.
Wang, et al., "MVC Output Related Conformance", Apr. 23, 2007, Joint Video Team (JVT) of ISO/IEC MPEG & ITU-T VCEG (ISO/IEC JTC1/SC29/WG11 and ITU-T SG16 Q.6), Apr. 21-27, 2007; Document: JVT-W036, [searched on Sep. 2, 2015], URL: http://wftp3.itu.int/av-arch/jvt-site/2007_04_SanJose/JVT-W036.zip, 2 pp.

* cited by examiner

ACTIVATION OF PARAMETER SETS FOR MULTIVIEW VIDEO CODING (MVC) COMPATIBLE THREE-DIMENSIONAL VIDEO CODING (3DVC)

This disclosure claims priority to U.S. Provisional Application No. 61/565,376 filed 30 Nov. 2011, U.S. Provisional Application No. 61/565,938 filed 1 Dec. 2011, U.S. Provisional Application No. 61/579,631 filed 22 Dec. 2011, and U.S. Provisional Application No. 61/584,009 filed 6 Jan. 2012, the contents of each of which is hereby incorporated by reference in its entirety.

TECHNICAL FIELD

This disclosure relates to video coding and, more particularly, three-dimensional video coding (3DVC).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for three-dimensional video coding (3DVC). More particularly, this disclosure describes techniques for performing 3DVC using a 3DVC extension of the H.264/Advanced Video Coding (AVC) standard. The 3DVC extension defines a video coding technology for encoding multiple views of video data with depth data. Each view may correspond to a different perspective, or angle, at which corresponding video data of a common scene was captured. In the context of 3DVC, each view may contain a texture view and a depth view. A coded representation of a view in one time instance is a view component. A view component may contain a depth view component and a texture view component. The techniques of this disclosure generally relate to enabling handling of both texture components and depth components of a view for 3DVC when coding multiview video data plus depth data. The techniques may promote compatibility of 3DVC with MVC.

In one example, a method of coding video data including a view component comprising a depth component and a texture component comprises activating a parameter set as a texture parameter set for the texture component of the view component and coding the texture component of the view component based on the activated texture parameter set.

In another example, a video coding device for coding video data including a view component comprised of a depth component and a texture component comprises a processor configured to activate a parameter set as a texture parameter set for the texture component of the view component, and code the texture component of the view component based on the activated texture parameter set.

In another example, a video coding device for coding video data including a view component comprised of a depth component and a texture component comprises means for activating a parameter set as a texture parameter set for the texture component of the view component and means for coding the texture component of the view component based on the activated texture parameter set.

In another example, a non-transitory computer-readable storage medium has stored thereon instructions that, when executed, cause one or more processors of a video coding device to activate a parameter set as a texture parameter set for the texture component of the view component, and code the texture component of the view component based on the activated texture parameter set.

In another example, a method of processing video data including a view component comprises a depth component and a texture component is described. The method comprises determining a supplemental enhancement information message that applies when processing the view component of the video data, and determining a nested supplemental enhancement information message that applies to the depth component of the view component in addition to the supplemental enhancement information message.

In another example, a device for processing video data including a view component comprised of a depth component and a texture component is described. The device comprises a processor configured to determine a supplemental enhancement information message that applies when processing the view component of the video data, and determine a nested supplemental enhancement information message that applies in addition to the supplemental enhancement information message when processing the depth component of the view component.

In another example, a device for processing video data including a view component comprised of a depth component and a texture component is described. The device comprises means for determining a supplemental enhancement information message that applies when processing the view component of the video data, and means for determining a nested supplemental enhancement information message that applies in addition to the supplemental enhancement information message when processing the depth component of the view component.

In another example, a non-transitory computer-readable storage medium has stored thereon instructions that, when executed, cause one or more processors of a device for processing video data including a view component comprised of a depth component and a texture component to determine a supplemental enhancement information message that applies when processing a view component of the video data, wherein the view component includes both a depth component and a texture component and determine a nested supplemental enhancement information message that applies in addition to the supplemental enhancement information message when processing the depth component of the view component.

In another example, a method for video coding comprises storing a depth component in a decoded picture buffer, analyzing a view dependency to determine whether the depth component is used for inter-view prediction and removing the depth component from the decoded picture buffer in response to determining that the depth component is not used for inter-view prediction.

In another example, a video coding device configured to code video data comprises a decoded picture buffer and a processor configured to store a depth component in the decoded picture buffer, analyze a view dependency to determine whether the depth component is used for inter-view prediction and remove the depth component from the decoded picture buffer in response to determining that the depth component is not used for inter-view prediction.

In another example, a video coding device for coding video data comprises means for storing a depth component in a decoded picture buffer, means for analyzing a view dependency to determine whether the depth component is used for inter-view prediction, and means for removing the depth component from the decoded picture buffer in response to determining that the depth component is not used for inter-view prediction.

In another example, a non-transitory computer-readable storage medium has stored thereon instructions that, when executed, cause one or more processors of a video coding device to store a depth component in a decoded picture buffer, analyze a view dependency to determine whether the depth component is used for inter-view prediction, and remove the depth component from the decoded picture buffer in response to determining that the depth component is not used for inter-view prediction.

In another example, a method of processing video data including a view component comprising one or more depth components and one or more texture components, the method comprises determining first sequence level information describing characteristics of the depth components, and determining second sequence level information describing characteristics of an operation point of the video data.

In another example, a video coding device for processing video data including a view component comprising one or more depth components and one or more texture components is described. The video coding device comprises one or more processors configured to determine first sequence level information describing characteristics of the depth components, and determine second sequence level information describing characteristics of an operation point of the video data.

In another example, a video coding device for processing video data including a view component comprising one or more depth components and one or more texture components is described. The video coding device comprises means for determining first sequence level information describing characteristics of the depth components and means for determining second sequence level information describing characteristics of an operation point of the video data.

In another example, a non-transitory computer-readable storage medium has stored thereon instructions that, when executed, cause one or more processors of a video coding device to determine first sequence level information describing characteristics of one or more depth components of video data, wherein the video data includes a view component comprising the one or more depth components and one or more texture components and determine second sequence level information describing characteristics of an operation point of the video data.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
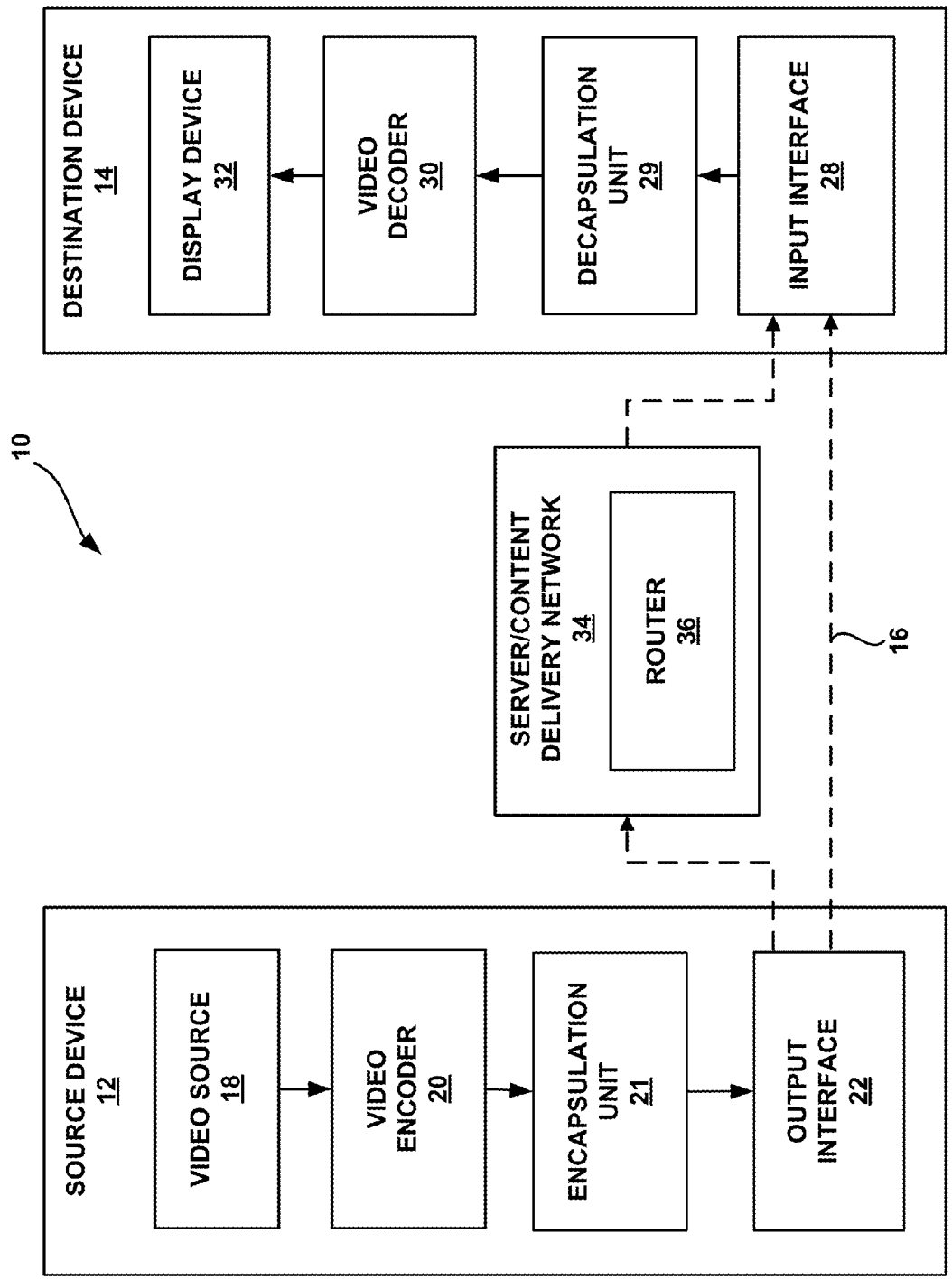
FIG. 1 is a block diagram illustrating an example video encoding and decoding system that may utilize the techniques described in this disclosure.

According to certain video coding systems, motion estimation and motion compensation may be used to reduce the temporal redundancy in a video sequence, so as to achieve data compression. In this case, a motion vector can be generated that identifies a predictive block of video data, e.g., a block from another video picture or slice, which can be used to predict the values of the current video block being coded. The values of the predictive video block are subtracted from the values of the current video block to produce a block of residual data. Motion information (e.g., a motion vector, motion vector indexes, prediction directions, or other information) is communicated from a video encoder to a video decoder, along with the residual data. The decoder can locate the same predictive block (based on the motion vector) and reconstruct the encoded video block by combining the residual data with the data of the predictive block.

Multiview Video Coding (MVC) is a video coding process for coding multiple views of video data. In general, each view corresponds to a different perspective, or angle, at which corresponding video data of a common scene was captured. Three dimensional video coding (3DVC) may be performed using MVC plus depth coding. A 3DVC extension to the ITU-T H.264/AVC standard is presently under development. A working draft of an amendment to the H.264/AVC standard to add the 3DVC extension is described in "WD on MVC Extensions for Inclusion of Depth Maps," ISO/IEC/JTC1/SC29/WG11/N12351, Geneva, Switzerland, dated November 2011 ("3DVC WD"). The 3DVC extension, also referred to as MVC extensions for inclusion of depth maps, defines techniques for coding views to support display of 3D video data.

For example, in 3D video, two views (e.g., left and right eye views of a human viewer) may be displayed simultaneously or near simultaneously using different polarizations of light, and a viewer may wear passive, polarized glasses such that each of the viewer's eyes receives a respective one of the views. Alternatively, the viewer may wear active glasses that shutter each eye independently, and a display may rapidly alternate between images of each eye in synchronization with the glasses.

While each view (e.g., left and right eye views) may be individually coded, in 3DVC, one of the views is reconstructed from the other view using a depth component of the view. For this reason, this form of 3DVC may also be referred to as multiview video coding plus depth (MVC+D). To illustrate, a depth map of a particular picture of a view (where this particular picture of a view may be referred to as a "view component" of the view) may be computed as a difference between the left eye view and the right eye view. The encoder may encode the left eye view, for example, as a so-called "texture component" of the view component and the depth map may be encoded as a so-called "depth component" of the view component.

The decoder may then decode the texture component of the view component and the depth component of the view component and reconstruct the right eye view from the texture component (which represents the left eye view) using the depth component. By encoding only one view and a corresponding depth map in this manner, 3DVC may more efficiently encode both the left eye and right eye view in comparison to encoding both the left eye view and the right eye view independently as separate views of the 3DVC data.

When encoding the texture and depth components of a view, the video encoder typically handles or otherwise processes both the texture and depth components as view components without providing any way by which to distinguish between texture and depth components. That is, 3DVC provides for handling or coding of view components without providing a way by which to individually process texture components separately from depth components of the same view component. This lack of distinction in 3DVC may result in less coding efficiency and/or lower quality of reconstructed video data.

For example, a depth component may currently be required to be specified at the same resolution as a corresponding texture component so as to accommodate joint handling of this view component. A higher resolution depth component (in comparison to the resolution of the texture component) may, however, result in three-dimensional (3D) video playback in that a better, more immersive 3D video may result that better mimics what a viewer's visual system expects. Moreover, a lower resolution depth component (compared to the resolution of the texture component) may provide the same or similar immersive 3D experience in certain instances but consume less bits when coded and thereby increase coding efficiency. By failing to enable separate handling of depth and texture components, 3DVC may reduce coding efficiency and/or provide for lower quality of reconstructed video data (often, in terms, of the viewing experience).

The techniques of this disclosure generally relate to enabling separate or independent handling of texture components and depth components of a view when processing or coding 3DVC video data. For example, this disclosure proposes signaling picture size of a depth map sequence in a sequence parameter set (SPS). These signaling techniques may be applied by an encoder and used by a decoder during the video encoding and/or decoding process. The described techniques are related to the coding of pictures of video content. The encoded pictures may have a unit size, such as a block of a selected height and width, which may be signaled as syntax elements in a sequence parameter set, in accordance with the techniques of this disclosure. Syntax elements for texture view sequences and depth map sequences may be signaled in a sequence parameter set.

More specifically, the techniques involve signaling syntax information when a depth map sequence has a different resolution than the corresponding texture view sequence. 3DVC may include coding multiple views with a depth map sequence for each view. These depth map sequences may have a different resolution than the texture view sequences. In this case, the depth view component and the texture view component cannot share the same sequence parameter set (SPS) when the texture and depth network abstraction layer (NAL) units are simply multiplexed together. It may not be possible to indicate different levels, with or without depth, in the current SPS MVC extension. In the AVC design principle, it may not be possible to activate more than one sequence parameter set, which contains the picture size. Thus, having two different picture sizes might result in activating multiple sequence parameter sets.

Techniques of the present disclosure can be used to indicate a 3DVC sequence based on AVC and MVC stereo, when the 3DVC sequence includes a depth map with a different spatial resolution than a corresponding texture view. By enabling such independent handling, the various aspects of the techniques described in this disclosure may promote bit savings (or, in other words, more efficient coding of multiview video data) and/or better quality of reconstructed video data (which again may be measured in terms of a perceived viewing experience).

The following description should be understood to be in the context of 3DVC, where reference to MVC is understood to be reference to MVC as it relates to MVC plus depth coding in the 3DVC extension. That is, given that MVC is an extension to H.264, and 3DVC is a further extension of H.264 that makes use of MVC, 3DVC incorporates or otherwise may be considered to "inherit" all aspects of MVC. 3DVC may extend or otherwise add to MVC where appropriate in the manner described herein to provide for a MVC-compliant bitstream that also includes depth maps for those video decoders that support 3DVC. In other words, in some examples, the techniques may provide for generation of a 3DVC bitstream that is backwards compatible with MVC (or, in other words, capable of being decoded by a video decoder that does not support 3DVC but that does support MVC). While the following techniques are each described in the context of 3DVC, these techniques may be extended in some instances to other ways of coding 3D video data having both texture view components and depth view components.

FIG. 1 is a block diagram illustrating an example video encoding and decoding system 10 that may utilize techniques for motion vector prediction in multiview coding. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, slate computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of transferring the encoded video data from source device 12 to destination device 14. In one example, computer-readable medium 16 may comprise a communication medium to enable source device 12 to transmit encoded video data directly to destination device 14 in real-time or near real-time.

The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from transmitter 24 of source device 24 to a storage device. Similarly, encoded data may be accessed from the storage device by receiver 26 of destination device 14. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12.

Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, a video encoder 20, an encapsulation unit 21, and an output interface 22. Destination device 14 includes input interface 28, decapsulation unit 29, video decoder 30, and display device 32. In some examples, source device 12 and destination device 14 may include other components or arrangements. For example, source device 12 may receive video data from an external video source 18, such as an external camera. Likewise, destination device 14 may interface with an external display device, rather than including integrated display device 32.

The illustrated system 10 of FIG. 1 is merely one example. Techniques for motion vector prediction in multiview coding (including 3DVC) may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Video source 24 may generally provide a plurality of views of a scene to video encoder 28. Video source 24 may also provide information indicative of locations of camera perspectives for the views. Video source 24 may provide this information to video encoder 28, or may provide the information directly to encapsulation unit 21.

Encapsulation unit 21 may use the information indicative of relative locations of camera perspectives for the views to assign view identifiers to views of multimedia content. Encapsulation unit 21 may form one or more representations of the multimedia content, where each of the representations may include one or more views. In some examples, video encoder 20 may encode each view in different ways, e.g., with different frame rates, different bit rates, different resolutions, or other such differences. Thus, encapsulation unit 21 may form various representations having various characteristics, e.g., bit rate, frame rate, resolution, and the like.

Each of the representations may correspond to respective bitstreams that can be retrieved by destination device 14. Encapsulation unit 21 may provide an indication of a range of view identifiers (view_ids) for views included in each representation, e.g., within a media presentation description (MPD) data structure for the multimedia content. For example, encapsulation unit 21 may provide an indication of a maximum view identifier and a minimum view identifier for the views of a representation. The MPD may further provide indications of maximum numbers of views targeted for output for each of a plurality of representations of the multimedia content. The MPD or data thereof may, in some examples, be stored in a manifest for the representation(s).

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Decapsulation unit 29 of destination device 14 may represent a unit that decapsulates SEI messages from a bitstream (or a subset of a bitstream referred to as an "operation point" in the context of MVC). Decapsulation unit 29 may perform operations in an order opposite those performed by encapsulation unit 29 to decapsulate data from the encapsulated encoded bitstream, such as SEI messages. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In the example shown in FIG. 1, system 10 also includes server/content delivery network 34 having router 36. In some examples, source device 12 may communicate with server/content delivery network 34 via a variety of wireless and/or wired transmission or storage media, as described above. Moreover, while shown separately in the example of FIG. 1, in some examples, source device 12 and server/content delivery network 34 comprise the same device. Server/content delivery network 34 may store one or more versions of coded video data (from video encoder 20 of source device 12), and may make such coded video data available for access by destination device 14 and video decoder 30. In some examples, router 36 may be responsible for providing coded video data to destination device 14 in a requested format.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, including the MVC extension and/or 3DVC extension to H.264. The techniques of this disclosure, however, are not limited to any particular coding standard. Other examples of video coding standards include MPEG-2 and ITU-T H.263.

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. H.264/AVC includes a scalable video coding (SVC) extensions and MVC extensions. In addition, there is further development to provide a 3DVC extension, making use of MVC with inclusion of depth maps. The Joint Video Team (JVT) continues to work on extensions to H.264/MPEG-4 AVC. While described within the context of 3DVC, the techniques described in this disclosure may be implemented with respect to other video coding algorithms capable of encoding and decoding 3D video involving both texture and depth components.

Video encoder 20 may send syntax data, such as block-based syntax data, picture-based syntax data, and GOP-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

In some examples, video encoder 20 may generate and video decoder 30 may receive certain parameter sets, which may be used when decoding video data. For example, parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence (e.g., sequence of pictures) or picture; hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as Supplemental Enhancement Information (SEI) NAL units.

SEI NAL units (referred to as SEI messages) may contain information that is not necessary for decoding the coded pictures samples from video coding layer (VCL) NAL units, but may assist in processes related to decoding, display, error resilience, and other purposes. SEI messages may be contained in non-VCL NAL units. SEI messages may be included in the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. View scalability information SEI messages also may provide sequence level information for the 3DVC extension to H.264. Encapsulation unit 21 may form these SEI messages and provide these SEI messages to server/content delivery network 34 for use in negotiating, as one example, delivery of encoded video data.

Encapsulation unit 30 may form NAL units comprising a header that identifies a program to which the NAL belongs, as well as a payload, e.g., audio data, video data, or data that describes the transport or program stream to which the NAL unit corresponds. For example, in H.264/AVC, a NAL unit includes a 1-byte header and a payload of varying size. In one example, a NAL unit header comprises a priority_id element, a temporal_id element, an anchor_pic_flag element, a view_id element, a non_idr_flag element, and an inter_view_flag element. In conventional MVC, the NAL unit defined by H.264 is retained, except for prefix NAL units and MVC coded slice NAL units, which include a 4-byte MVC NAL unit header and the NAL unit payload.

In some examples, video encoder 20 may encode a 3DVC bitstream that conforms to the 3DVC extension of H.264, using MVC plus depth information. The latest joint draft of MVC is described in "Advanced video coding for generic audiovisual services," ITU-T Recommendation H.264, March 2010, while a working draft of 3DVC is described in "WD on MVC Extensions for Inclusion of Depth Maps," ISO/IEC/JTC1/SC29/WG11/N12351, Geneva, Switzerland, dated November 2011, described above. Again, reference within this disclosure to MVC should be understood to be a reference to MVC plus depth within the context of 3DVC. That is, MVC is referred to in this disclosure as it relates to 3DVC in the sense that 3DVC incorporates or "builds off" of MVC.

In the 3DVC extension to H.264, a view includes texture and depth. The texture part of a view is named the texture view, and the depth part of a view is named the depth view. The texture part of a view in one access unit, i.e., a texture view in an access unit, is named the texture view component. The depth part of a view in one access unit, i.e., a depth view in an access unit, is named the depth view component. The term view component is a view in one access unit and collectively refers to both the texture view component and the depth view component in the same access unit.

In the extensions of H.264/AVC, syntax elements may be added in the NAL unit header extension to extend the NAL unit header from one byte to four bytes to describe the characteristics of a VCL NAL unit in multiple dimensions. Thus, a VCL NAL unit in the MVC extension may include a longer NAL unit header than the NAL unit header in the H.264/AVC standard. The MVC extension to H.264/AVC may be referred to in this disclosure as "MVC/AVC."

An MVC/AVC NAL unit may contain a one-byte NAL unit header that includes the NAL unit type, as well as an MVC/AVC NAL unit header extension. As one example, the MVC/AVC NAL unit header extension may include the syntax elements in the following table:

| NAL UNIT HEADER EXTENSION SYNTAX | | |
|---|---|---|
| nal_unit_header_extension( ) { | C | Descriptor |
| reserved_zero_bit | All | u(1) |
| idr_flag | All | u(1) |
| priority_id | All | u(6) |
| view_id | All | u(10) |
| temporal_id | All | u(3) |
| anchor_pic_flag | All | u(1) |
| inter_view_flag | All | u(1) |
| reserved_one_bit | All | u(1) |
| } | | |

In the above table, the idr_flag element may indicate whether the NAL unit belongs to an instantaneous decoder refresh (IDR) or a view-IDR (V-IDR) picture that can be used as a closed-GOP random access point. For example, an IDR picture and all of the pictures succeeding the IDR picture in both a display order and bitstream order can be properly decoded without decoding previous pictures in either bitstream order or display order.

The priority_id element may be used with a bitstream adaptation process that varies the bitstream according to changing network conditions and/or capabilities of video decoder 30 and/or display device 32 (e.g., such as single-pass adaptation process). The view_id element may be used to indicate the view identifier for the view to which the NAL unit belongs, which may be used inside an MVC decoder, e.g., for inter-view prediction and outside a decoder, e.g., for rendering. In some instances, the view_id may be set equal to a predefined camera id, and may be relatively large. The temporal_id element may be used to indicate the temporal level of the current NAL unit, which may correspond to a particular frame rate.

The anchor_pic_flag element may be used to indicate whether the NAL unit belongs to an anchor picture that can be used as an open-GOP random access point. For example, anchor pictures and all the pictures succeeding the anchor picture in display order may be properly decoded without decoding previous pictures in the decoding order (i.e. bitstream order) and thus may be used as random access points.

as a prefix NAL unit for the base view access unit, which may contain only the NAL unit header. If the prefix NAL unit is not required for decoding (e.g., such as decoding a single view), a decoder may ignore and/or discard the prefix NAL unit.

With respect to an SPS MVC/AVC extension, the MVC SPS may indicate views that may be used for purposes of inter-view prediction. For example, potential inter-view references may be signaled in and SPS MVC/AVC extension, and may be modified by the reference picture list construction process, which enables flexible ordering of the inter prediction or inter-view prediction references. An example MVC/AVC SPS is set forth in the table below:

| EXAMPLE MVC SPS | | |
|---|---|---|
| seq_parameter_set_mvc_extension( ) { | C | Descriptor |
| num_views_minus1 | 0 | ue(v) |
| for( i = 0; i <= num_views_minus1; i++ ) | | |
| view_id[ i ] | 0 | ue(v) |
| for( i = 1; i <= num_views_minus1; i++ ) { | | |
| num_anchor_refs_l0[ i ] | 0 | ue(v) |
| for( j = 0; j < num_anchor_refs_l0[ i ]; j++ ) | | |
| anchor_ref_l0[ i ][ j ] | 0 | ue(v) |
| num_anchor_refs_l1[ i ] | 0 | ue(v) |
| for( j = 0; j < num_anchor_refs_l1[ i ]; j++ ) | | |
| anchor_ref_l1[ i ][ j ] | 0 | ue(v) |
| } | | |
| for( i = 1; i <= num_views_minus1; i++ ) { | | |
| num_non_anchor_refs_l0[ i ] | 0 | ue(v) |
| for( j = 0; j < num_non_anchor_refs_l0[ i ]; j++ ) | | |
| non_anchor_ref_l0[ i ][ j ] | 0 | ue(v) |
| num_non_anchor_refs_l1[ i ] | 0 | ue(v) |
| for( j = 0; j < num_non_anchor_refs_l1[ i ]; j++ ) | | |
| non_anchor_ref_l1[ i ][ j ] | 0 | ue(v) |
| } | | |
| num_level_values_signalled_minus1 | 0 | ue(v) |
| for( i = 0; i <= num_level_values_signalled_minus1; i++ ) { | | |
| level_idc[ i ] | 0 | u(8) |
| num_applicable_ops_minus1[ i ] | 0 | ue(v) |
| for( j = 0; j <= num_applicable_ops_minus1[ i ]; j++ ) { | | |
| applicable_op_temporal_id[ i ][ j ] | 0 | u(3) |
| applicable_op_num_target_views_minus1[ i ][ j ] | 0 | ue(v) |
| for( k = 0; k <= applicable_op_num_target_views_minus1[ i ][ j ]; k++ ) | | |
| applicable_op_target_view_id[ i ][ j ][ k ] | 0 | ue(v) |
| applicable_op_num_views_minus1[ i ][ j ] | 0 | ue(v) |
| } | | |
| } | | |
| } | | |

Anchor pictures and non-anchor pictures may have different view dependencies, both of which may be signaled in an SPS.

That is, as described herein a, a view dependency may generally refer to a view from which a view currently being coded depends. In other words, view dependencies may set forth from which views a view currently being coded may be predicted. According to some examples, view dependency may be signaled in the SPS MVC extension. In such examples, all inter-view prediction may be done within the scope specified by the SPS MVC extension. The inter_view_flag element may be used to indicate whether the NAL unit is used for inter-view prediction for NAL units in other views.

To convey the NAL unit header information (which may be four-bytes) for the base view of an MVC bitstream, a prefix NAL unit may be defined in MVC. In the context of MVC, the base view access unit may include the VCL NAL units of a current time instance of a particular view, as well According to some examples, view dependency may be signaled in the SPS MVC extension. All inter-view prediction may be done within the scope specified by the SPS MVC extension. That is, the SPS may set forth which views may be referred to for purposes of prediction by a view currently being coded. In Table 2 above, the num_anchor_refs_l0[i] element may specify the number of view components for inter-view prediction in the initialized reference picture list for List 0 (e.g., RefPicList0).

In addition, the anchor_ref_l0[i][j] element may specify the view_id of the j-th view component for inter-view prediction in the initialized RefPicList0. The num_anchor_refs_l1[i] element may specify the number of view components for inter-view prediction in the initialized reference picture list for list one (e.g., RefPicList1). The anchor_ref_l1[i][j] element may specify the view_id of the j-th view component for inter-view prediction in the initialized RefPicList1.

The num_non_anchor_refs_l0[i] element may specify the number of view components for inter-view prediction in the initialized RefPicList0. The non_anchor_ref_l0[i][j] element may specify the view_id of the j-th view component for inter-view prediction in the initialized RefPicList0. The num_non_anchor_refs_l1[i] element may specify the number of view components for inter-view prediction in the initialized RefPicList1. The non_anchor_ref_l1[i][j] element may specify the view_id of the j-th view component for inter-view prediction in the initialized RefPicList.

The initialized, or "initial", reference picture list may be the same or different from a final reference picture list used for purposes of inter-view predicting view components. That is, certain reference candidates (i.e., reference pictures that may be used for inter-view prediction) may be removed from an initial reference picture list (e.g., redundant pictures). In addition, as described in greater detail below, reference candidates may be reordered from the initial reference picture list to form the final reference picture list.

In this example, according to MVC, view dependencies for anchor pictures and non-anchor pictures are separately maintained and signaled. That is, a video coder may determine a total of four reference picture lists (e.g., List 0, non-anchor pictures; List 1, non-anchor pictures; List 0, anchor pictures; List 1, anchor pictures). In addition, as shown in Table 2 above, separate signaling is required to indicate a view dependency to video decoder 30. That is, the SPS must include separate List 0 and List 1 signaling for both anchor_refs and non_anchor_refs.

Moreover, according to Table 2, the inter-view dependency for non-anchor view components is a subset of that for anchor view components. That is, for example, a view component of an anchor view may be predicted from more than one other view, such as view 3 and 4. A non-anchor view, however, may only be predicted from pictures of view 3 (a subset of the anchor view). In this way, the view dependencies for anchor and non-anchor view components may be separately maintained.

In addition, in Table 2, the num_level_values_signalled may specify the number of level values signaled for the coded video sequence. The level_idc[i] element may specify the i-th level value signaled for the coded video sequence. The num_applicable_ops_minus1[i] plus 1 element may specify the number of operation points to which the level indicated by level_idc1[i] applies. The applicable_op_temporal_id[i][j] element may specify the temporal_id of the j-th operation point to which the level indicated by level_idc [i] applies.

The applicable_op_num_target_views_minus1[i][j] element may specify the number of target output views for the j-th operation point to which the level indicated by level_idc [i] applies. The applicable_op_target_view_id[i][j][k] element may specify the k-th target output view for the j-th operation point to which the level indicated by level_idc[i] applies. The applicable_op_num_views_minus1[i][j] element may specify the number of views, including the views that are dependent on the target output views but that do not belong to the target output views, in the j-th operation point to which the level indicated by level_idc[i] applies.

Accordingly, in the SPS for MVC, the number of views that may be used to form reference picture List 0 and reference picture List 1 may be signaled for each view. In addition, the prediction relationship for an anchor picture, as signaled in the SPS for MVC, may be different from the prediction relationship for the non-anchor picture (signaled in the SPS of MVC) of the same view.

As described in greater detail below, video encoder 20 and video decoder 30 may flexibly arrange temporal and view prediction references when constructing reference picture lists. Allowing flexible arrangement provides not only potential coding efficiency gain, but also error resilience, because reference picture section and redundant picture mechanisms may be extended to the view dimension. Video encoder 20 and/or video decoder 30 may, in an example, construct a reference picture list according to the following steps:

1) Initialize the reference picture list for temporal (i.e., intra-view) reference pictures, such that reference pictures from other views are not considered.
2) Append the inter-view reference pictures to the end of the list in the order in which the pictures occur in the MVC SPS extension.
3) Apply a reference picture list reordering (RPLR) process for both intra-view and inter-view reference pictures. Inter-view reference pictures may be identified in the RPLR commands by their index values as specified in the MVC SPS extension.

In MVC, video encoder 20 and/or video decoder 30 may, when decoding multiview video data, activate zero or one picture parameter set (PPS) as an active PPS and zero or more view PPS (VPPS) as the active VPPS, where each active VPPS is active specifically for a particular view order index value less than a maximum view order index value. That is, video encoder 20 and/or video decoder 30 may activate a PPS that applies to every view component of the multiview video data within an access unit. Video encoder 20 and/or video decoder 30 may also activate a VPPS that applies only to a subset of the view components in the access unit. In some instances, the VPPS may include one or more syntax elements that override one or more syntax elements specified in the PPS for those views for which the VPPS was activated. In some instances, the VPPS may include one or more syntax elements that augment one or more syntax elements specified in the PPS for those views for which the VPPS was activated.

Moreover, in MVC, video encoder 20 and/or video decoder 30 may, when decoding multiview video data, activate zero or one MVC sequence parameter set (SPS) as the active MVC SPS zero or more view SPS (VSPS) as the active VSPS, where each active VSPS is active specifically for a particular view order index value less than a maximum view order index value. That is, video encoder 20 and/or video decoder 30 may activate a SPS that applies to every view component of the multiview video data within one or more access units. Video encoder 20 and/or video decoder 30 may also activate a VSPS that applies only to a subset of the view components in the one or more access units. In some instances, the VSPS may include one or more syntax elements that override one or more syntax elements specified in the SPS for those views for which the VSPS was activated. In some instances, the VSPS may include one or more syntax elements that augment one or more syntax elements specified in the SPS for those views for which the VSPS was activated.

Additionally, MVC provides functionality for parsing or extracting various so-called operation portions from a single bitstream. Each operation point may represent a different combination of views of the multiview video data encoded at varying temporal frame rates and spatial resolutions. In other words, an operation point may refer to an encoding of multiview video data in three dimensions including the view dimension (reflecting the number of views), the temporal dimensional (reflecting a frame rate) and spatial dimension (reflecting spatial resolution).

An operation point may be identified by a temporal_id value representing the target temporal level and a set of view_id values representing the target output views. One operation point is associated with a bitstream subset, which consists of the target output views and all other views the target output views depend on, that is derived using the sub-bitstream extraction process as specified in subclause H.8.5.3 of the three dimensional video coding (3DVC) extension of H.264/AVC with tIdTarget equal to the temporal_id value and viewIdTargetList consisting of the set of view_id values as inputs. More than one operation point may be associated with the same bitstream subset. When 3DVC states "an operation point is decoded," it refers to the decoding of a bitstream subset corresponding to the operation point and subsequent output of the target output views. In other words, each operation point is represented with a number of views target for output in a certain temporal level and/or spatial resolution or level.

In the sequence parameter set MVC extension, different operation points may be signaled with level_idc values. The following syntax elements are named level definitions syntax elements.

| | C | Descriptor |
|---|---|---|
| num_level_values_signalled_minus1 | 0 | ue(v) |
| for( i = 0; i <= num_level_values_signalled_minus1; i++ ) { | | |
|   level_idc[ i ] | 0 | u(8) |
|   num_applicable_ops_minus1[ i ] | 0 | ue(v) |
|   for( j = 0; j <= num_applicable_ops_minus1[ i ]; j++ ) { | | |
|     applicable_op_temporal_id[ i ][ j ] | 0 | u(3) |
|     applicable_op_num_target_views_minus1[ i ][ j ] | 0 | ue(v) |
|     for( k = 0; k <= applicable_op_num_target_views_minus1[ i ][ j ]; k++ ) | | |
|       applicable_op_target_view_id[ i ][ j ][ k ] | 0 | ue(v) |
|     applicable_op_num_views_minus1[ i ][ j ] | 0 | ue(v) |
| } | | |

For each level_idc signaled in the MVC SPS extension, a new level_idc_depth is signaled in the 3D video (3DV) SPS extension. So if it is assumed that all MVC operation points have the same level_idc[i], after including depth components and constructing 3DVC operation points, the 3DVC operation points will have the same level of level_idc_depth [i]. A detailed syntax design is shown as follows.

| | C | Descriptor |
|---|---|---|
| seq_parameter_set_3dvc_extension( ) { | | |
| ... | | |
|   for( i = 0; i <= num_level_values_signalled_minus1; i++ ) | | |
|     level_idc_depth[ i ] | 0 | u(8) |
| ... | | |
| } | | |

In addition, MVC provides that a view component may be removed from the decoded picture buffer (DPB) if the view component is not further used for inter-view reference and the view component is not used for output, when decoding a view component in the same access unit as the view component to be removed.

Currently, 3DVC provides no way by which to distinguish between texture and depth components of a view component, where the term "view component" refers to a picture of a view specified by 3D multiview video data. As a result, when encoding the texture and depth components of a view, the video encoder typically handles or otherwise processes both the texture and depth components as view components in a manner similar to that described above with respect to MVC without providing any way by which to distinguish between texture and depth components. That is, 3DVC currently provides for handling or coding of view components without providing a way by which to individually process texture components separately from depth components. This lack of distinction in 3DVC may result in less coding efficiency and/or lower quality of reconstructed video data.

For example, a depth component may currently be required to be specified at the same resolution as a corresponding texture component so as to accommodate joint handling of this view component. A higher resolution depth component (in comparison to the resolution of the texture component) may, however, result in three dimensional (3D) video playback in that a better, more immersive 3D video may result that better mimics what a viewer's visual system expects. Moreover, a lower resolution depth component (compared to the resolution of the texture component) may provide the same or similar immersive 3D experience in certain instances but consume less bits when coded and thereby increase coding efficiency. By failing to enable separate handling of depth and texture components, 3DVC may reduce coding efficiency and/or provide for lower quality of reconstructed video data (often, in terms, of the viewing experience).

The techniques of this disclosure generally relate to enabling separate or independent handling of texture components and depth components of a view when processing or coding 3D video data. For example, a sequence parameter set (SPS) 3DVC extension can be added for the 3DVC related profiles. Inside this SPS 3DVC extension, one or more of the following may be signaled: the picture size of the depth map sequences, the size of the picture to be displayed by the depth map sequences, and the levels of the operation points with depth map pictures taken into consideration, where each of the specific level corresponds to a level which has already been defined in the SPS MVC extension. The size of the picture to be displayed may be a decoded picture outputted by a display device.

In a 3DVC codec, a view component of each view of video data in a specific time instance may include a texture view component and a depth view component. The texture view component may include luminance (Y) components and chrominance (Cb and Cr) components. Luminance (brightness) and chrominance (color) components are collectively referred to herein as "texture" components. The depth view component may be from a depth map of an image. In 3D image rendering, depth maps include depth components and can be used for generating virtual views from a provided viewing perspective. Syntax elements for depth components and texture components may be signaled with the coded block unit. Coded block units, also referred to simply as "coded blocks" in this disclosure, may correspond to macroblocks in ITU-T H.264/AVC (Advanced Video Coding).

This disclosure describes signaling techniques that may be applied by an encoder and used by a decoder during the inter-prediction stage of a video encoding and/or decoding process. The described techniques are related to the coding of three-dimensional ("3D") video content. The 3D video content may be represented, for example, as multiview video plus depth ("MVD") coded blocks. More specifically, the techniques involve receipt of at least one two-dimensional image having texture view components and depth view components. Some texture view components and depth information may be coded together into a single coded block or as separate blocks. An image may be broken into slices of images. Syntax elements for coding texture view components and depth view components may be signaled in a sequence parameter set. Depth view components may or may not be predicted from the texture view components.

In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

In the H.264/AVC standard, Network Abstraction Layer (NAL) units are defined to provide a "network-friendly" video representation to address applications such as video telephony, storage, or streaming video. NAL units can be categorized to Video Coding Layer (VCL) NAL units and non-VCL NAL units. VCL units may contain a core compression engine and comprise block, macroblock (MB), and slice levels. Other NAL units are non-VCL NAL units.

For 2D video encoding, each NAL unit may contain a one byte NAL unit header and a payload of varying size. Five bits may be used to specify the NAL unit type. Three bits may be used for nal_ref_idc, which indicates how important the NAL unit is in terms of being referenced by other pictures (NAL units). For example, setting nal_ref_idc equal to 0 means that the NAL unit is not used for inter prediction.

As H.264/AVC may be expanded to include 3D video encoding, such as the scalable video coding (SVC) standard, the NAL header may be similar to that of the 2D scenario. For example, one or more bits in the NAL unit header may be used to identify that the NAL unit is a four-component NAL unit.

NAL unit headers may also be used for MVC NAL units. However, in MVC, the NAL unit header structure may be retained except for prefix NAL units and MVC coded slice NAL units. Techniques of the present disclosure provide a different NAL unit type that may be used to signal a super SPS.

The following table provides one example of a sequence parameter set RBSP syntax, in accordance with one aspect of the present disclosure. For illustrative purposes only, for examples associated with this table, it may be assumed that the texture and depth have the same view_id value and the nal_unit_type is used to distinguish the texture and depth. Below, the bolded items represent items that have been added, updated or altered in accordance with examples of this disclosure, in comparison to current or previous versions of the working draft for the 3DVC extension to MVC. Moreover, reference to annexes, such as annex G in the table below, refer to annexes of the H.264 video coding standard.

| subset_seq_parameter_set_rbsp( ) { | C | Descriptor |
|---|---|---|
| seq_parameter_set_data( ) | 0 | |
| if( profile_idc = = 83 \|\| profile_idc = = 86 ) { | | |
|     seq_parameter_set_svc_extension( ) /* specified in Annex G */ | 0 | |
|     svc_vui_parameters_present_flag | 0 | u(1) |
|     if( svc_vui_parameters_present_flag = = 1 ) | | |
|         svc_vui_parameters_extension( ) /* specified in Annex G */ | 0 | |
| } else if( profile_idc = = 118 \|\| profile_idc = = 128 ) { | | |
|     bit_equal_to_one /* equal to 1 */ | 0 | f(1) |
|     seq_parameter_set_mvc_extension( ) /* specified in Annex H */ | 0 | |
|     mvc_vui_parameters_present_flag | 0 | u(1) |
|     if( mvc_vui_parameters_present_flag = = 1 ) | | |
|         mvc_vui_parameters_extension( ) /* specified in Annex H */ | 0 | |
| } | | |
| else if ( profile_idc = = 138 \|\| profile_idc = = 148 ) { | | |
| //138: 3DV base profile; 148: 3DV Asymmetric profile | | |
|     bit_equal_to_one /* equal to 1 */ | 0 | f(1) |
|     seq_parameter_set_mvc_extension( ) | | |
|     seq_parameter_set_3dvc_extension( ) | | |
|     3dvc_vui_parameter_present_flag | 0 | u(1) |
|     if( 3dvc_vui_parameter_present_flag ) { | | |
|         3dvc_vui_parameters_extension( ) /* specified in Annex I */ | | |
|     } | | |
| } | | |
| additional_extension3_flag | 0 | u(1) |
| if ( additional_extension3_flag ) | | |
|     while( more_rbsp_data( ) ) | | |
|         additional_extension3_data_flag | 0 | u(1) |
| } | | |
| rbsp_trailing_bits( ) | 0 | |
| } | | |

According to table shown above, 3dvc_vui_parameter_present_flag equal to 1 indicates that 3dvc_vui_parameters_extension( ) is present. When 3dvc_vui_parameter_present_flag equals 0, the flag indicates that 3dvc_vui_parameters_extension( ) is not present. For example, 3dvc_vui_parameter_present_flag indicates that an extension incorporating some of the techniques of this disclosure is present in a sequence parameter set.

In some examples, a subset SPS with MVC profiles (e.g., stereo high or multiview high) may have the same SPS id as that of the subset SPS with 3DV profiles, so that the texture view components will refer to a same SPS_id having different content in different profiles. For example, a subset SPS with MVC may correspond to an operation point that only has texture. Having the same SPS id as that of a subset SPS with 3DV profiles may enable an operation point that only included texture to be extracted by a decoder or network device, such as a media aware network element (MANE).

Multiview High Profile supports an arbitrary number of views. Stereo High Profile supports two-view stereoscopic video. In other examples, the techniques described herein may apply to examples using other MVC profiles.

The following table provides an example of extension syntax elements for the sequence parameter set 3DVC extension.

| seq_parameter_set_3dvc_extension( ) { | C | Descriptor |
|---|---|---|
| disable_depth_inter_view_flag | 0 | u(1) |
| depth_pic_width_in_mbs_minus1 | 0 | ue(v) |
| depth_pic_height_in_map_units_minus1 | 0 | ue(v) |
| depth_frame_cropping_flag | 0 | u(1) |
| if( depth_frame_cropping_flag ) { | | |
|     depth_frame_crop_left_offset | 0 | ue(v) |
|     depth_frame_crop_right_offset | 0 | ue(v) |
|     depth_frame_crop_top_offset | 0 | ue(v) |
|     depth_frame_crop_bottom_offset | 0 | ue(v) |
| } | | |
| for( i = 0; i <= num_level_values_signalled_minus1; i++ ) | | |
|     level_idc_depth[ i ] | 0 | u(8) |
| } | | |

In one example, the sequence parameter set 3DVC extension specifies inter-view dependency relationships of the additional views with a higher resolution than the other views in the coded video sequence. The texture view components of the other views, with a lower resolution belong to a sub-bitstream that conforms to Annex H. The sequence parameter set 3DVC extension also specifies the dependency of the depth view components. The higher resolution views can have double width, identical height or double height, or identical width of the other views. In some examples, the higher resolution views can have only double width, identical height or double height, or identical width of the other views.

A chroma_format_idc for depth view components is inferred to be equal to 4:0:0.

The syntax element disable_depth_inter_view_flag may have the same semantics as in the flag with the same name in m22583. The syntax element depth_pic_width_in_mbs_minus1 plus 1 specifies the width of each depth view component picture in units of macroblocks. A variable for the picture width of depth view components in units of macroblocks may be derived as:

$$PicWidthInMbs = pic\_width\_in\_mbs\_minus1+1 \quad (1)$$

A variable for picture width of depth view components for a luma component is derived as:

$$PicWidthInSamplesL = PicWidthInMbs * 16 \quad (2)$$

In some examples, the syntax element depth_pic_height_in_map_units_minus1 plus 1 specifies the height in slice group map units of a decoded frame of depth view components. The variables PicHeightInMapUnits and PicSizeInMapUnits are derived as:

$$PicHeightInMapUnits = pic\_height\_in\_map\_units\_minus1+1 \quad (3)$$

$$PicSizeInMapUnits = PicWidthInMbs * PicHeightInMapUnits \quad (4)$$

In some examples, when the syntax element depth_frame_cropping_flag is equal to 1, depth_frame_cropping_flag specifies that the frame cropping offset parameters follow next in the sequence parameter set for depth view components. depth_frame_cropping_flag equal to 0 specifies that the frame cropping offset parameters are not present for depth view components.

The syntax elements depth_frame_crop_left_offset, depth_frame_crop_right_offset, depth_frame_crop_top_offset, and depth_frame_crop_bottom_offset may specify the samples of the pictures of the depth view components in the coded video sequence that are output from the decoding process, in terms of a rectangular region specified in frame coordinates for output. These offsets may define a cropping window for the pictures of the decoded depth view components.

In some examples, the syntax element level_idc_depth[i] specifies the i-th level value signaled for the coded video sequence with depth view components.

It is possible to extract one or more views from an MVC bitstream to produce a sub-bitstream. A sub-bitstream with a given reasonable set of target output views is referred to as an operation point. Because of view dependencies, the set of target output views can be a subset of the views contained in a sub-bitstream. The target output views can also be identical to the views contained in the sub-bitstream. However, if a service provider does not intend to support an operation point with a large number of views, the number of target output views can be a subset of the contained views. Note that the contained views are the views to be decoded.

An operation point is identified by a temporal_id value representing a target temporal level and a set of view_id values representing the target output views. One operation point is associated with a bitstream subset, which consists of the target output views and all other views the target output views depend on, that is derived using the sub-bitstream extraction process as specified in sub-clause H.8.5.3 with tIdTarget equal to the temporal_id value and viewIdTargetList consisting of the set of view_id values as inputs. More than one operation point may be associated with the same bitstream subset. When the 3DVC states "an operation point is decoded," it refers to the decoding of a bitstream subset corresponding to the operation point and subsequent output of the target output views.

According to techniques described herein, the construction of the operation points for 3DVC SPS extension may be the same as those in the MVC SPS extension, except that the depth view components are associated. In other words, for each operation point signaled in the MVC SPS extension having level equal to level_idc[i], a corresponding operation point is enabled in 3DVC SPS extension, with the same collection of target output views and temporal_id value, but further include, for each view component that includes a depth component, a level of level_idc_depth[i].

Alternatively, the level_idc values signaled in the SPS MVC extension of the current SPS with a 3DV profile, are always for operation points containing depth NAL units, thus the syntax element level_idc_depth[i] is not signaled in some instances for 3DVC. For example, when signaling level_idc values in the SPS with a 3DV profile including the SPS MVC extension, according to techniques described herein, the syntax element level_idc_depth[i] is not signaled because the level_idc values are for operation points that contain depth NAL units.

The following table provides example semantics for a 3DVC Video Usability Information (VUI) parameters extension.

| 3dvc_vui_parameters_extension( ) { | C | Descriptor |
|---|---|---|
|   vui_mvc_num_ops_minus1 | 0 | ue(v) |
|   for( i = 0; i <= vui_mvc_num_ops_minus1; i++ ) { | | |
|     vui_mvc_temporal_id[ i ] | 0 | u(3) |
|     vui_mvc_num_target_output_views_minus1[ i ] | 5 | ue(v) |
|     depth_present_flag[ i ] | 0 | u(1) |
|     for( j = 0; j <= vui_mvc_num_target_output_views_minus1[ i ]; j++ ) | | |
|       vui_mvc_view_id[ i ][ j ] | 5 | ue(v) |
|     vui_mvc_timing_info_present_flag[ i ] | 0 | u(1) |
|     if( vui_mvc_timing_info_present_flag[ i ] ) { | | |
|       vui_mvc_num_units_in_tick[ i ] | 0 | u(32) |
|       vui_mvc_time_scale[ i ] | 0 | u(32) |
|       vui_mvc_fixed_frame_rate_flag[ i ] | 0 | u(1) |
|     } | | |
|     vui_mvc_nal_hrd_parameters_present_flag[ i ] | 0 | u(1) |
|     if( vui_mvc_nal_hrd_parameters_present_flag[ i ] ) | | |
|       hrd_parameters( ) | 0 | |
|     vui_mvc_vcl_hrd_parameters_present_flag[ i ] | 0 | u(1) |
|     if( vui_mvc_vcl_hrd_parameters_present_flag[ i ] ) | | |
|       hrd_parameters( ) | 0 | |
|     if( vui_mvc_nal_hrd_parameters_present_flag[ i ] \|\| | | |
|       vui_mvc_vcl_hrd_parameters_present_flag[ i ] ) | | |
|       vui_mvc_low_delay_hrd_flag[ i ] | 0 | u(1) |
|     vui_mvc_pic_struct_present_flag[ i ] | 0 | u(1) |
|   } | | |
| } | | |

In the example table shown directly above, depth_present_flag[i] equal to 1 indicates that the current operation point includes depth view component for each view. depth_present_flag[i] equal to 0 indicates that the current operation point does not include any depth view component.

Other syntax elements may have the same semantics as those in the MVC VUI parameters extension with the same names.

Alternatively, depth_present_idc[i] may be signaled. The element depth_present_idc[i] equal to 1 may indicate that a current operation point includes depth view component for each view. In some examples, setting depth_present_idc[i] equal to 0 or 2 may indicate that the current operation point includes only texture view components. In other examples, setting depth_present_idc[i] equal to 0 may indicate that the current operation point does not include any depth view component. In other examples, setting depth_present_idc[i] equal to 2 may indicate that the current operation point does not include any depth view component.

In another example, a depth view component and a texture view component, even belonging to the same view, may have different view_id values signaled. However, the depth view components may still share the same view dependency as the texture. In some examples, the SPS 3DVC extension contains a mapping of the view_id values.

The following table provides another example of a SPS 3DVC extension.

| seq_parameter_set_3dvc_extension( ) { | C | Descriptor |
|---|---|---|
|   for ( i = 0; i <= num_views_minus1 ; i++) | | |
|     view_id_depth[ i ] | 0 | ue(v) |
|   disable_depth_inter_view_flag | 0 | u(1) |
|   depth_pic_width_in_mbs_minus1 | 0 | ue(v) |
|   depth_pic_height_in_map_units_minus1 | 0 | ue(v) |

-continued

| seq_parameter_set_3dvc_extension( ) { | C | Descriptor |
|---|---|---|
|   depth_frame_cropping_flag | 0 | u(1) |
|   if( depth_frame_cropping_flag ) { | | |
|     depth_frame_crop_left_offset | 0 | ue(v) |
|     depth_frame_crop_right_offset | 0 | ue(v) |
|     depth_frame_crop_top_offset | 0 | ue(v) |
|     depth_frame_crop_bottom_offset | 0 | ue(v) |
|   } | | |
|   for( i = 0; i <= num_level_values_signalled_minus1; i++ ) | | |
|     level_idc_depth[ i ] | 0 | u(8) |
| } | | |

The syntax element view_id_depth[i] specifies the view_id of the depth view with VOIdx equal to i, it belongs to the view with texture view having a view_id equal to view_id[i].

In another example, keeping all other aspects the same, the level_idc_depth values can be signaled in the same way as the level_idc values signaled in the SPS MVC extension.

In another example, the depth view components may share a different seq_parameter_set_data( ). As such, a width and height of the depth view components are signaled. In one example, the seq_parameter_set_data( ) syntax may include chorma_format_idc, which may be 4:0:0 in some examples. In these examples, the depth view prediction relation may still share the same prediction relation as the texture view prediction relation.

The following table provides an example of syntax elements for a subset sequence parameter set RBSP syntax for when the depth view components share the same seq_parameter_set_data( ) in accordance with one aspect of the present disclosure.

| subset_seq_parameter_set_rbsp( ) { | C | Descriptor |
|---|---|---|
|   seq_parameter_set_data( ) | 0 | |
|   if( profile_idc = = 83 \|\| profile_idc = = 86 ) { | | |
|     seq_parameter_set_svc_extension( ) /* specified in Annex G */ | 0 | |
|     svc_vui_parameters_present_flag | 0 | u(1) |
|     if( svc_vui_parameters_present_flag = = 1 ) | | |
|       svc_vui_parameters_extension( ) /* specified in Annex G */ | 0 | |
|   } else if( profile_idc = = 118 \|\| profile_idc = = 128 ) { | | |
|     bit_equal_to_one /* equal to 1 */ | 0 | f(1) |
|     seq_parameter_set_mvc_extension( ) /* specified in Annex H */ | 0 | |
|     mvc_vui_parameters_present_flag | 0 | u(1) |
|     if( mvc_vui_parameters_present_flag = = 1 ) | | |
|       mvc_vui_parameters_extension( ) /* specified in Annex H */ | 0 | |
|   } | | |
|   else if ( profile_idc = = 138 \|\| profile_idc = = 148 ) { | | |
|   //138: 3DV base profile; 148: 3DV Asymmetric profile | | |
|     bit_equal_to_one /* equal to 1 */ | 0 | f(1) |
|     seq_parameter_set_data( ) | | |
|     seq_parameter_set_mvc_extension( ) | | |
|     seq_parameter_set_3dvc_extension( ) | | |
|     3dvc_vui_parameter_present_flag | 0 | u(1) |
|     if ( 3dvc_vui_parameter_present_flag ) { | | |
|       3dvc_vui_parameters_extension( ) /* specified in Annex I */ | | |
|     } | | |
|   } | | |
|   additional_extension3_flag | 0 | u(1) |
|   if ( additional_extension3_flag ) | | |
|     while( more_rbsp_data( ) ) | | |
|       additional_extension3_data_flag | 0 | u(1) |
|   } | | |
|   rbsp_trailing_bits( ) | 0 | |
| } | | |

The following table provides an example sequence parameter set 3dVC extension syntax for when the depth view components share the same seq_parameter_set_data( ) in accordance with one aspect of the present disclosure.

| seq_parameter_set_3dvc_extension( ) { | C | Descriptor |
|---|---|---|
|   disable_depth_inter_view_flag | 0 | u(1) |
|   for( i = 0; i <= num_level_values_signalled_minus1; i++ ) | | |
|     level_idc_depth[ i ] | 0 | u(8) |
| } | | |

In some examples, the semantics of some of the syntax elements shown in some of the foregoing tables may be similar or the same as the analogous syntax elements described with respect to other ones of these tables.

In another example, a new NAL unit type may be provided. The NAL unit type may have a value, such as 15, that is used to signal a super SPS for the 3DV profile. The next three tables may correspond to syntax elements for a super SPS for the 3DV profile. In some examples, a super SPS may signal both depth view components and texture components.

The following table provides one example of a super sequence parameter set RBSP syntax. The SPS 3DVC extension syntax of the following table may be signaled using the new NAL unit type.

| supset_seq_parameter_set_rbsp( ) { | C | Descriptor |
|---|---|---|
|   seq_parameter_set_data( ) | 0 | |
|   if ( profile_idc = = 138) { | | |
|   //138: 3DV base profile; | | |
|     bit_equal_to_one /* equal to 1 */ | 0 | f(1) |
|     seq_parameter_set_mvc_extension( ) | | |
|     seq_parameter_set_3dvc_extension( ) | | |
|     3dvc_vui_parameter_present_flag | 0 | u(1) |
|     if ( 3dvc_vui_parameter_present_flag ) { | | |
|       3dvc_vui_parameters_extension( ) /* specified in Annex I */ | | |
|     } | | |
|   } | | |
|   additional_extension1_flag | 0 | u(1) |
|   if ( additional_extension1_flag ) | | |
|     while( more_rbsp_data( ) ) | | |
|       additional_extension1_data_flag | 0 | u(1) |
|   } | | |
|   rbsp_trailing_bits( ) | 0 | |
| } | | |

The following table provides one example of a SPS 3DVC extension syntax, according to techniques described herein. The SPS 3DVC extension syntax of the following table may be signaled using the new NAL unit type.

| seq_parameter_set_3dvc_extension( ) { | C | Descriptor |
|---|---|---|
|   disable_depth_inter_view_flag | 0 | u(1) |
|   cam_paras( ) | | |
|   depth_range( ) | | |
| } | | |

The following table provides one example of a 3DVC VUI parameters extension syntax, according to techniques described herein. The 3DVC VUI parameters extension syntax of the following table may be signaled using the new NAL unit type.

| 3dvc_vui_parameters_extension( ) { | C | Descriptor |
|---|---|---|
|     vui_mvc_num_ops_minus1 | 0 | ue(v) |
|     for( i = 0; i <= vui_mvc_num_ops_minus1; i++ ) { | | |
|         vui_mvc_temporal_id[ i ] | 0 | u(3) |
|         vui_mvc_num_target_output_views_minus1[ i ] | 5 | ue(v) |
|         depth_present_flag[ i ] | 0 | u(1) |
|         for( j = 0; j <= vui_mvc_num_target_output_views_minus1[ i ]; j++ ) | | |
|             vui_mvc_view_id[ i ][ j ] | 5 | ue(v) |
|         vui_mvc_timing_info_present_flag[ i ] | 0 | u(1) |
|         if( vui_mvc_timing_info_present_flag[ i ] ) { | | |
|             vui_mvc_num_units_in_tick[ i ] | 0 | u(32) |
|             vui_mvc_time_scale[ i ] | 0 | u(32) |
|             vui_mvc_fixed_frame_rate_flag[ i ] | 0 | u(1) |
|         } | | |
|         vui_mvc_nal_hrd_parameters_present_flag[ i ] | 0 | u(1) |
|         if( vui_mvc_nal_hrd_parameters_present_flag[ i ] ) | | |
|             hrd_parameters( ) | 0 | |
|         vui_mvc_vcl_hrd_parameters_present_flag[ i ] | 0 | u(1) |
|         if( vui_mvc_vcl_hrd_parameters_present_flag[ i ] ) | | |
|             hrd_parameters( ) | 0 | |
|         if( vui_mvc_nal_hrd_parameters_present_flag[ i ] \|\| vui_mvc_vcl_hrd_parameters_present_flag[ i ] ) | | |
|             vui_mvc_low_delay_hrd_flag[ i ] | 0 | u(1) |
|         vui_mvc_pic_struct_present_flag[ i ] | 0 | u(1) |
|     } | | |
| } | | |

In some examples, the semantics of some of the syntax elements shown in the foregoing tables may be similar or the same as the analogous syntax elements described with respect to other ones of the foregoing tables. The levels defined in the MVC SPS extension may apply to the operation points, taking depth NAL units into consideration. In the 3DV related profile, one SPS, one subset SPS, and one superset SPS can be simultaneously activated.

As a result, MVC may be extended by way of 3DVC to provide for separate handling of depth and texture components. By enabling such independent handling, the various aspects of the techniques described in this disclosure may promote bit savings (or, in other words, more efficient coding of multiview video data) and/or better quality of reconstructed video data (which again may be measured in terms of a perceived viewing experience).

For example, various aspects of the techniques described in this disclosure may enable a video coding device (which may represent a term used in this disclosure to refer to any device that includes a video encoder and/or a video decoder, such as source device 12 and/or destination device 14) to activate a parameter set as a texture parameter set for the texture component of the view component based at least on a view order index value assigned to the view component of the multiview video data. The view order index may describe the decoding order of a corresponding view component of an access unit. The view order index can be used with a picture order count (POC) value or a frame value to identify a view component of a bitstream. This aspect of the techniques may therefore provide for a parameter set, such as a PPS or SPS, that is activated only for the texture component of a view component and does not apply to the corresponding depth component of the same view component. In this respect, the video coding device may code only the texture component of the view component and not the depth component of the view component based on the activated texture parameter set.

Additionally, the video coding device may activate a parameter set for the depth component of the view component based at least on the view order index value assigned to the view component of the multiview video data. That is, in some instances, the video coding device may activate a texture-specific parameter set for the texture component of a view component and then activate yet another parameter set specifically for the depth component of the same view component. As a result, the video coding device may code the depth component of the view component based on the parameter set activated for the depth component of the view component and not the activated texture parameter set. The video coding device may code the texture component based on the activated texture parameter set. In this way, the techniques may promote separate activation of parameter sets, such as a PPS or SPS, for texture and depth components of a view component, providing a way by which to facilitate separate handling or processing of depth and texture components in an MVC-compatible 3DVC view.

Various aspects of the techniques described in this disclosure may also promote separate handling of depth and texture components by enabling a video coding device to determine a nested supplemental information (SEI) message that applies to both texture and depth components of a view component or only to a depth component of the view component. The term "nested SEI message" refers to an SEI message that incorporates various portions of another SEI message such that a nested SEI message is effectively "nested" within the scope of another SEI message. By enabling a nested SEI message to apply only to a depth component, these aspects of the techniques may again promote separate handling of texture and depth components.

A video coding device (i.e., source device 12 and/or destination device 14 in the example of FIG. 1) may perform these aspects of the techniques to determine a supplemental enhancement information message that applies to coding of the view component of the multiview video data. This SEI message may be referred to as a parent SEI message to reflect that it applies for a particular view component and sets the scope for any nested SEI messages. The video coding device may then determine a nested supplemental enhancement information message that applies in addition to the supplemental enhancement information message when coding the depth component of the view component. This nested SEI message may identify the parent SEI message and indicate that this nested SEI message only applies to the depth component of the view component to which the parent SEI message applies. The video coding device may then process the depth component of the view component based on the supplemental enhancement information message and the nested supplemental enhancement information message.

Typically, the nested SEI message includes a flag or other identifier that indicates whether the nested SEI message applies to both the texture and depth components of the view component or only to the depth component. Thus, in some instances, the video coding device may determine that the nested supplemental enhancement information message applies in addition to the supplemental enhancement information message when only processing the depth component of the view component and processes only the depth component of the view component and not the texture component of the view component based on the supplemental enhancement information message and the nested supplemental enhancement information message. Alternatively, the video coding device may determine that the nested supplemental enhancement information message applies in addition to the supplemental enhancement information message when processes the texture component of the view component and processes the texture component of the view component based on the supplemental enhancement information message and the nested supplemental enhancement information message. Again, these aspects of the techniques again facilitate separate handling or processing of depth and texture components of the view component.

Other aspects of the techniques described in this disclosure may promote separate handling of depth and texture components by enabling a video coding device to separately remove texture and depth components from a decoded picture buffer. The decoded picture buffer refers to a memory or other computer-readable medium capable of storing reference pictures for use in coding a current view component. Because the techniques set forth in this disclosure enable separate handling of texture and depth components, a video coding device may code a texture component of a view component using reference pictures different than those used when coding a depth component of the same view component contrary to conventional MVC where a view component (and therefore the depth and texture components of that view component) was coded using the same reference pictures. As a result, there may be instances where depth components of a reference view component may be removed from the decoded picture buffer prior to texture components of the same reference view component, and a texture component of a reference view component may be removed from the decoded picture buffer prior to the depth component of the same reference view component.

In operation, a video coding device may perform the techniques described in this disclosure by storing a depth component in a decoded picture buffer and analyzing a view dependency to determine whether the depth component is used for inter-view prediction. The video coding device may then remove the depth component from the decoded picture buffer in response to determining that the depth component is not used for inter-view prediction. That is, the video coding device may remove the depth component of a reference view component from the decoded picture buffer without removing the texture component of the same reference view component in response to determining that the depth component is not used for inter-view prediction. The video coding device may, prior to removing the depth component, validate this depth component as being eligible for removal by determining that the depth component does not belong to a target output view and that the depth component is associated with a network abstraction layer reference identification code having a value equal to zero (meaning that the content of the NAL unit encapsulating the depth component is not used to construct reference pictures for inter-picture prediction).

Additional aspects of the techniques described in this disclosure may also permit or otherwise facilitate separate handling of depth and texture components. For example, in terms of operation points, the techniques may enable a video coding device to generate a SEI message that includes a first syntax element, a second syntax element, and a third syntax element, where the first syntax element indicates whether an operation point contains a depth component. When the operation point contains a depth component, the video coding device may define the second syntax element to indicate a number of depth components on which a target output view of the operation point directly depends and define the third syntax elements to identify the depth components on which the target output view of the operation point directly depends.

In some instances, the operation points may include a first subset of the operation points and a second subset of the operation points, where each operation point in the first subset contains only a texture component and each operation point in the second subset contains a depth component. The video coding device may then determine that a profile identifier is equal to a given value that is associated with 3D video coding and generate, in response to determining that the profile identifier is equal to the given value, a subset SPS such that the subset SPS includes a first SPS extension and a second SPS extension. The first SPS extension may indicate the first subset and the levels to which the operation points in the first subset belong. The second SPS extension may indicate the second subset and the levels to which operation points in the second subset belong. In this way, the techniques may permit operations points to be defined separately for texture and depth components and by level.

This aspect of the techniques may leverage the separate handling of depth and texture components to permit operation points to be more easily extracted from a bitstream for multiview video coding. By signaling whether an operation point includes depth, a video decoder, such as video decoder 30, may determine which operation point best accommodates the abilities of video decoder 30. For example, video decoder 30 may be optimized to perform multiview video coding using views that do not include depth, preferring multiview video data where both the left and right eye perspectives are provided as separate pictures. Video decoder 30 may alternatively be optimized for depth-based multiview video data but may only accommodate a single view rather than two or more views. By signaling when the encoded multiview video data includes depth, and when including depth, the number of depth components on which the target output views of the operation point directly depends, video decoder 30 may select an operation point that accommodates the capabilities or optimizations of video decoder 30.

Additionally, a video coding device may perform aspects of the techniques described in this disclosure to signal levels to which operation points belong, where at least some of the operation points containing depth components. The video coding device may then determine that a profile identifier is equal to a given value that is associated with 3D video coding and generate, in response to determining that the profile identifier is equal to the given value, a subset SPS such that the subset SPS includes a MVC SPS extension that signals the operation points and the levels to which the operation points belong. Each of the operation points, in this example, may specify one or more output views, where each of the output views contains both a texture component and a depth component.

In yet other instances, the video coding device may perform the techniques described in this disclosure to generate, in a SPS, a syntax element that indicates a number of views to be decoded for an operation point in an MVC process, where each of the views has one of a number of texture components and one of a number of depth components. The video coding device may then signal, in the SPS, the number of texture components to be decoded for the operation point and the number of depth components to be decoded for the operation point. Again, by virtue of facilitating separate handling of depth and texture components, the techniques may provide for signaling of how these depth and texture components are utilized to form operation points.

Figure 2:
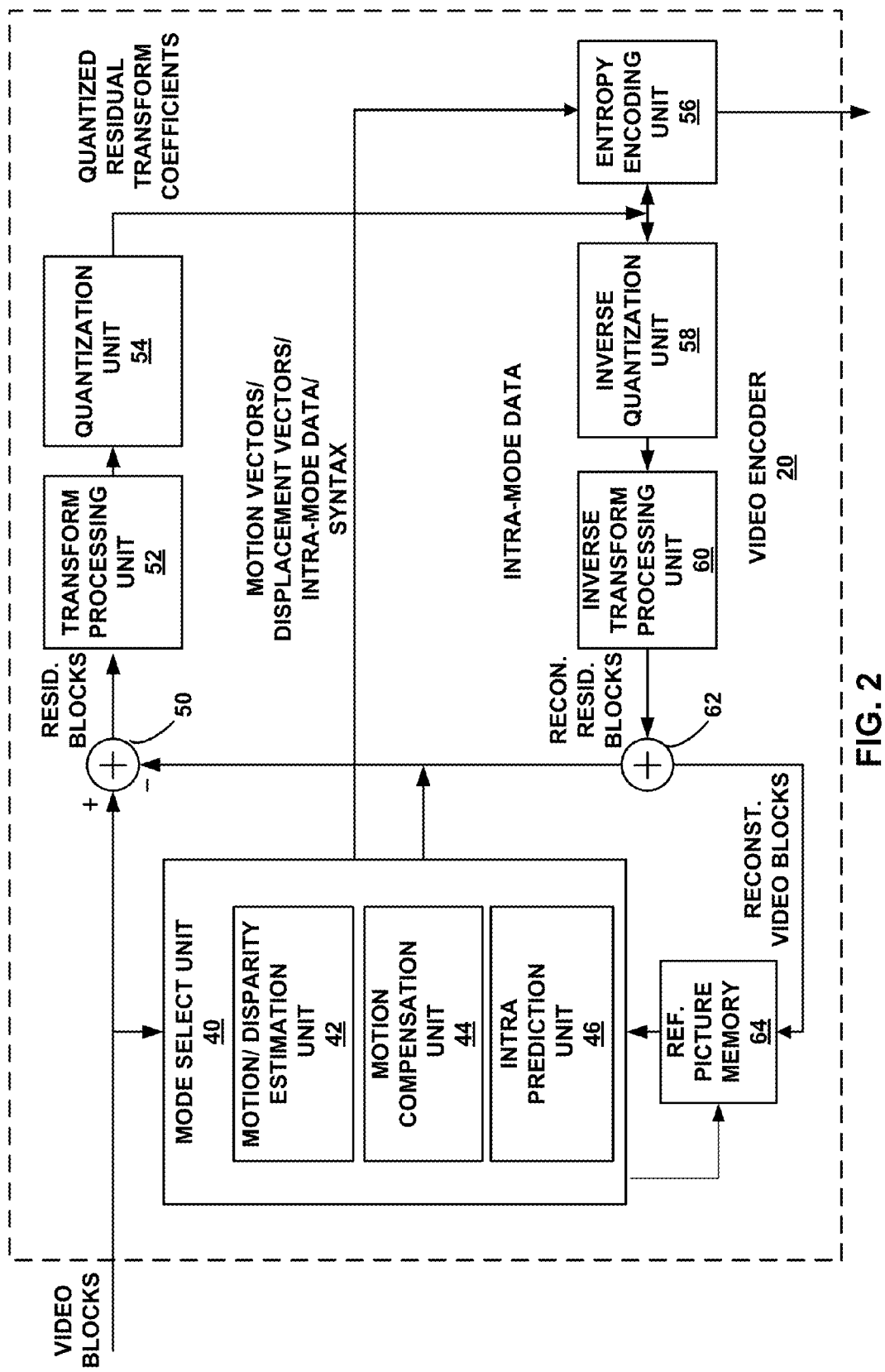
FIG. 2 is a block diagram illustrating the video encoder shown in the example of FIG. 1 in more detail.

FIG. 2 is a block diagram illustrating an example video encoder 20 that may implement the techniques described in this disclosure for coding multiview video data. Video encoder 20 receives video data to be encoded. In the example of FIG. 2, video encoder 20 includes a mode select unit 40, summer 50, transform processing unit 52, quantization unit 54, entropy encoding unit 56, and reference picture memory 64. Mode select unit 40, in turn, includes motion/disparity estimation unit 42, motion compensation unit 44, intra prediction unit 46, and partition unit 48.

For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter. Such filters are not shown for brevity, but if desired, may filter the output of summer 50 (as an in-loop filter).

Mode select unit 40 may receive raw video data in the form of blocks from one or more views. Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion/disparity estimation unit 42 and motion compensation unit 44 may be highly integrated, but are illustrated separately for conceptual purposes. Motion estimation, performed by motion/disparity estimation unit 42, is the process of generating motion vectors, which estimate motion for video blocks. A motion vector, for example, may indicate the displacement of a PU of a video block within a current picture relative to a predictive block within a reference picture (or other coded unit) relative to the current block being coded within the current picture (or other coded unit).

A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64, which may also be referred to as a reference picture buffer. For example, video encoder 20 may interpolate values of one-quarter pixel positions, one-eighth pixel positions, or other fractional pixel positions of the reference picture. Therefore, motion/disparity estimation unit 42 may perform a motion search relative to the full pixel positions and fractional pixel positions and output a motion vector with fractional pixel precision.

Motion/disparity estimation unit 42 calculates a motion vectors for a PU of a video block in an inter-coded slice by comparing the position of the PU to the position of a predictive block of a reference picture. Motion estimation/disparity unit 42 may also be configured to perform inter-view prediction, in which case motion estimation/disparity unit 42 may calculate displacement vectors between blocks of one view picture (e.g., view 0) and corresponding blocks of a reference view picture (e.g., view 1). In general, data for a motion/disparity vector may include a reference picture list, an index into the reference picture list (ref_idx), a horizontal component, and a vertical component. The reference picture may be selected from a first reference picture list (List 0), a second reference picture list (List 1), or a combined reference picture list (List C), each of which identify one or more reference pictures stored in reference picture memory 64. With respect to the combined list, video encoder 20 alternately select entries from two lists (i.e., List 0 and List 1) to be inserted (appended) into the combined list. When an entry is already put in the combined list, by checking the POC number, video encoder 20 may not insert the entry again. For each list (i.e., List 0 or List 1), video encoder 20 may select the entries based on ascending order of the reference index.

Motion/disparity estimation unit 42 may generate and send a motion/disparity vector that identifies the predictive block of the reference picture to entropy encoding unit 56 and motion compensation unit 44. That is, motion/disparity estimation unit 42 may generate and send motion vector data that identifies the reference picture list containing the predictive block, an index into the reference picture list identifying the picture of the predictive block, and a horizontal and vertical component to locate the predictive block within the identified picture.

Motion compensation, performed by motion compensation unit 44, may involve fetching or generating the predictive block based on the motion/disparity vector determined by motion/disparity estimation unit 42. Again, motion/disparity estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists.

Summer 50 forms a residual video block by subtracting pixel values of the predictive block from the pixel values of the current video block being coded, forming pixel difference values, as discussed below. In general, motion/disparity estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion/disparity estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the pictures of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion/disparity estimation unit 42 and motion compensation unit 44 as a reference block to inter-code a block in a subsequent picture.

Video encoder 20 may generate a number of syntax elements, as described above, which may be encoded by entropy encoding unit 56 or another encoding unit of video encoder 20. In some examples, video encoder 20 may generate and encode syntax elements for a 3DVC bitstream, as described above, where again this 3DVC bitstream may be backwards compatible with MVC. That is, a video decoder that supports MVC but that does not support 3DVC may still decode the 3DVC bitstream encoded in accordance with the techniques described in this disclosure. [explain/illustrate?]

Video encoder 20 may activate a parameter set as a texture parameter set for the texture component of the view component based at least on a view order index value assigned to the view component of the multiview video data. In other words, video encoder 20 may activate a parameter set, such as a PPS or SPS, only for the texture component of a view component such that this texture parameter set does not apply to the corresponding depth component of the same view component. In this respect, video encoder 20 may encode only the texture component of the view component and not the depth component of the view component based on the activated texture parameter set.

In particular, mode select unit 40 of video encoder 20 may activate a parameter set by selecting a mode, e.g., intra-view prediction (which may involve temporal or inter-picture prediction where the pictures all correspond to the same view), inter-view prediction or intra-prediction. Mode select unit 40 may analyze each of the iterations of coding a picture, where each iteration may involve different parameters. When selecting a various iteration of coding a picture, mode select unit 40 may effectively activate a parameter set for a particular sequence of pictures, view, view component, depth component and/or texture component. Moreover, mode select unit 40 may activate different parameter sets in this manner for texture and depth components that each belong to the same view component in the manner described below in more detail.

Additionally, mode select unit 40 may activate a parameter set for the depth component of the view component based at least on the view order index value assigned to the view component of the 3DVC data. That is, in some instances, mode select unit 40 may activate a texture-specific parameter set for the texture component of a view component and then activate yet another parameter set specifically for the depth component of the same view component. As a result, mode select unit 40 may encode the depth component of the view component based on the parameter set activated for the depth component of the view component and not the activated texture parameter set. Mode select unit 40 may encode the texture component based on the activated texture parameter set. In this way, the techniques may promote separate activation of parameter sets, such as a PPS or SPS, for texture and depth components of a view component, providing a way by which to facilitate separate handling or processing of depth and texture components in 3DVC.

Video encoder 20 may also separately remove texture and depth components from a decoded picture buffer, which is shown as reference picture memory 64 in the example of FIG. 2. Because the techniques set forth in this disclosure enable separate handling of texture and depth components, video encoder 20 may code a texture component of a view component using reference pictures different than those used when coding a depth component of the same view component contrary to conventional 3DVC where a view component (and therefore the depth and texture components of that view component) was coded using the same reference pictures. As a result, there may be instances where depth components of a reference view component may be removed from the decoded picture buffer prior to texture components of the same reference view component, and a texture component of a reference view component may be removed from the decoded picture buffer prior to the depth component of the same reference view component.

In operation, mode select unit 40 of video encoder 20 may be configured to perform the techniques described in this disclosure. Mode select unit 40 may store a depth component in reference picture memory 64 and analyze a view dependency to determine whether the depth component is used for inter-view prediction. Mode select unit 40 may then remove the depth component from reference picture memory 64 in response to determining that the depth component is not used for inter-view prediction. That is, mode select unit 40 may remove the depth component of a reference view component from reference picture memory 64 without removing the texture component of the same reference view component in response to determining that the depth component is not used for inter-view prediction. Mode select unit 40 may, prior to removing the depth component, validate this depth component as being eligible for removal by determining that the depth component does not belong to a target output view and that the depth component is associated with a network abstraction layer reference identification code having a value equal to zero (meaning that the content of the NAL unit encapsulating the depth component is not used to construct reference pictures for inter-picture prediction).

Figure 3:
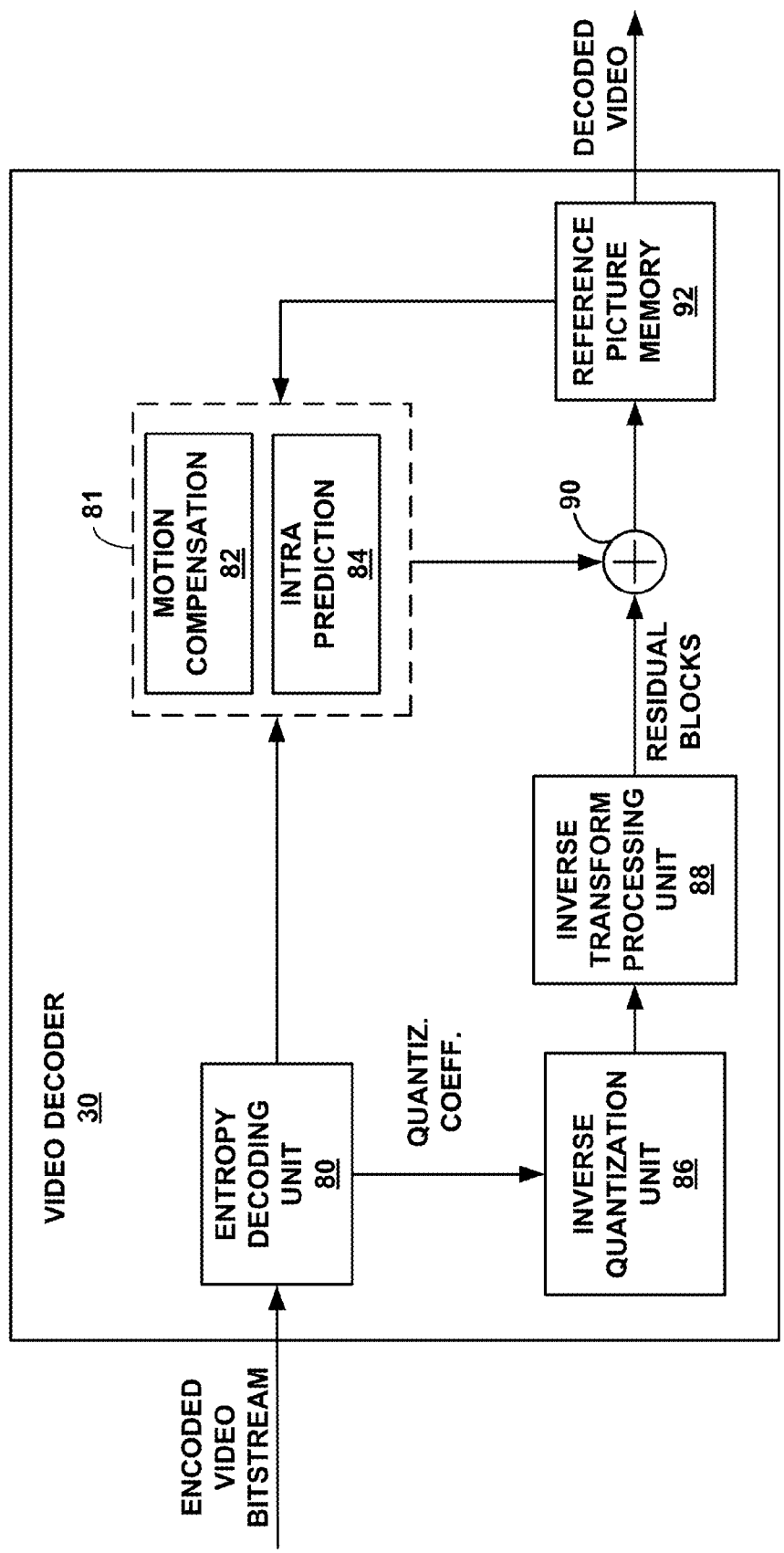
FIG. 3 is a block diagram illustrating the video decoder shown in the example of FIG. 1 in more detail.

FIG. 3 is a block diagram illustrating an example video decoder 30 that may implement the techniques described in this disclosure for decoding a multiview bitstream. In the example of FIG. 3, video decoder 30 includes an entropy decoding unit 80, prediction unit 81 having motion compensation unit 82 and intra prediction unit 84, inverse quantization unit 86, inverse transformation unit 88, summer 90, and reference picture memory 92.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction unit 81. Video decoder 30 may receive the syntax elements at the video slice level and/or the video block level.

For example, video decoder 30 may receive a number of NAL units having a NAL unit header that identifies a type of data stored to the NAL unit (e.g., VCL data and non-VCL data). Parameter sets may contain the sequence-level header information, such as an SPS, PPS, or other parameter set described above.

According to aspects of this disclosure, video decoder 30 may activate a parameter set as a texture parameter set for the texture component of the view component based at least on a view order index value assigned to the view component of the 3DVC data. More specifically, entropy decoding unit 80 may parse the parameter sets from the bitstream, decoding the parameter sets and providing the decoded parameter sets to the other components of video decoder 30, such as prediction unit 81, inverse quantization unit 86 and inverse transform processing unit 88. Each of these components may refer to the currently active parameter sets and in this sense, video decoder 30 activates the parameter set for each component of video decoder 30.

In any event, the view order index may, as noted above, describe the decoding order of a corresponding view component of an access unit. The view order index can be used with a picture order count (POC) value or a frame value to identify a view component of a bitstream. This aspect of the techniques may therefore provide for a parameter set, such as a PPS or SPS, that is activated only for the texture component of a view component and does not apply to the corresponding depth component of the same view component. In this respect, video decoder 30 may decode only the texture component of the view component and not the depth component of the view component based on the activated texture parameter set.

Additionally, video decoder 30 may activate a parameter set for the depth component of the view component based at least on the view order index value assigned to the view component of the 3DV data. That is, in some instances, the video coding device may activate a texture-specific parameter set for the texture component of a view component and then activate yet another parameter set specifically for the depth component of the same view component. As a result, video decoder 30 may code the depth component of the view component based on the parameter set activated for the depth component of the view component and not the activated texture parameter set. Video decoder 30 may decode the texture component based on the activated texture parameter set. In this way, the techniques may promote separate activation of parameter sets, such as a PPS or SPS, for texture and depth components of a view component, providing a way by which to facilitate separate handling or processing of depth and texture components in 3DVC.

In detail, this aspect of the techniques may enable a video coder (which may generally refer to both or either of a video encoder and/or a video decoder) to activate a separate parameter set for each of a depth component and a texture component. The sequence and picture parameter set mechanism may effectively decouple the transmission of infrequently changing information from the transmission of coded macroblock data. Sequence and picture parameter sets may, in some applications, be conveyed out-of-band using a reliable transport mechanism. A picture parameter set raw byte sequence payload (or "RBSP," which is another more formal way to refer to a picture parameter set) includes parameters that can be referred to by the coded slice NAL units of one or more texture or depth components of one or more view components. A sequence parameter set RBSP includes parameters that can be referred to by one or more picture parameter set or one or more buffering period SEI messages.

When decoding a 3DVC bitstream containing depth views, at any given moment during the operation of the decoding process, video decoder 30 may activate zero or one active picture parameter sets, zero or more active texture picture parameter sets, and zero or more active view picture parameter sets. Each active texture picture parameter set is active specifically for a particular view order index value less than or equal to the maximum view order index value, and each active view picture parameter set is active specifically for a particular view order index value that is less than the maximum view order index value.

Similarly, at a given moment during the operation of the decoding process, video decoder 30 may activate zero or one active MVC sequence parameter sets, zero or more active texture MVC sequence parameter sets, and zero or more active view MVC sequence parameter sets. Each active texture MVC sequence parameter set is active specifically for a particular view order index value less than or equal to the maximum view order index value, and each active view MVC sequence parameter set is active specifically for a particular view order index value that is less than the maximum view order index value.

In this sense, activation of parameter set for 3DVC generally is similar to activation of parameter sets in MVC, except for those differences noted herein (that involve instances of how to handle depth view components that are currently not supported in MVC). Moreover, MVC provides for a number of reserved bits in each parameter set to which additional syntax elements directed to extensions using MVC, such as 3DVC, may utilize to specify 3DVC-specific syntax elements. By providing these reserved bits, the parameter sets maintain backwards compatibility with MVC even though these reserve bits may be utilized to specify syntax elements unrelated to or not specified in the MVC extension to H.264/AVC. For this reason, even though the MVC parameter set may include additional syntax elements unrelated to MVC, these parameter sets are referred to as MVC parameter sets given the reserved bits present in the MVC parameter sets.

The detailed activation process for picture and sequence parameter sets is as follows. Video decoder 30 initially considers each picture parameter set RBSP as not active at the start of the operation of the decoding process. At most, video decoder 30 activates one picture parameter set RBSP as the active picture parameter set RBSP at any given moment during the operation of the decoding process. When any particular picture parameter set RBSP becomes the active picture parameter set RBSP, video decoder 30 effectively de-activates the previously-active picture parameter set RBSP (if any).

In addition to the active picture parameter set RBSP, video decoder 30 may activate zero or more picture parameter set RBSPs specifically for texture components (with a particular view order index value ("VOIdx") less than or equal to the maximum view order index value ("VOIdxMax")) that belong to the target output views or that may be referred to through inter-view prediction in decoding texture components belonging to the target output views. Such a picture parameter set RBSP is referred to as the active view picture parameter set RBSP for the particular value of VOIdx. The restrictions on active picture parameter set RBSPs also apply to active view picture parameter set RBSPs for a particular value of VOIdx.

Furthermore, video decoder 30 may activate zero or more picture parameter set RBSPs specifically for view components (with a particular value of VOIdx less than VOIdxMax) that belong to the target output views or that may be referred to through inter-view prediction in decoding depth components belonging to the target output views. Such a picture parameter set RBSP is referred to as the active view picture parameter set RBSP for the particular value of VOIdx. The restrictions on active picture parameter set RBSPs also apply to active view picture parameter set RBSPs for a particular value of VOIdx less than VOIdxMax.

When a picture parameter set RBSP (with a particular value of pic_parameter_set_id) is not the active picture parameter set RBSP and the picture parameter set RBSP is referred to by a coded slice NAL unit belonging to a depth component and with VOIdx equal to VOIdxMax (using that value of pic_parameter_set_id), video decoder 30 may activate the picture parameter set RBSP. A coded slice NAL unit belonging to a depth component may have a nal_unit_type equal to 21. This picture parameter set RBSP is called the active picture parameter set RBSP until the picture parameter set RBSP is deactivated when another picture parameter set RBSP becomes the active picture parameter set RBSP. A picture parameter set RBSP, with that particular value of pic_parameter_set_id, shall be available to the decoding process prior to activation of the picture parameter set RBSP.

When a picture parameter set RBSP (with a particular value of pic_parameter_set_id) is not the active view picture parameter set for a particular value of VOIdx less than VOIdxMax and the picture parameter set RBSP is referred to by a coded slice NAL unit belonging to a depth component (i.e., with nal_unit_type equal to 21) and with the particular value of VOIdx (using that value of pic_parameter_set_id), video decoder 30 activates the picture parameter set RBSP for view components with the particular value of VOIdx. This picture parameter set RBSP is called the active view picture parameter set RBSP for the particular value of VOIdx until the picture parameter set RBSP is deactivated when another picture parameter set RBSP becomes the active view picture parameter set RBSP for the particular value of VOIdx. A picture parameter set RBSP, with that particular value of pic_parameter_set_id, shall be available to the decoding process prior to activation of the picture parameter set RBSP.

When a picture parameter set RBSP (with a particular value of pic_parameter_set_id) is not the active texture picture parameter set for a particular value of VOIdx less than or equal to VOIdxMax and the picture parameter set RBSP is referred to by a coded slice NAL unit belonging to a texture component (i.e., with nal_unit_type equal to 1, 5 or 20) and with the particular value of VOIdx (using that value of pic_parameter_set_id), video decoder 30 activates the picture parameter set RBSP for depth components with the particular value of VOIdx. This picture parameter set RBSP is called the active texture picture parameter set RBSP for the particular value of VOIdx until the picture parameter set RBSP is deactivated when another picture parameter set RBSP becomes the active texture picture parameter set RBSP for the particular value of VOIdx. A picture parameter set RBSP, with that particular value of pic_parameter_set_id, shall be available to the decoding process prior to activation of the picture parameter set RBSP.

Any picture parameter set NAL unit containing the value of pic_parameter_set_id for the active picture parameter set RBSP for a coded picture shall have the same content as that of the active picture parameter set RBSP for this coded picture unless the picture parameter set NAL unit follows the last VCL NAL unit of this coded picture and precedes the first VCL NAL unit of another coded picture. Any picture parameter set NAL unit containing the value of pic_parameter_set_id for the active view picture parameter set RBSP for a particular value of VOIdx less than VOIdxMax for a coded picture shall have the same content as that of the active view picture parameter set RBSP for the particular value of VOIdx for this coded picture unless the picture parameter set NAL unit follows the last VCL NAL unit of this coded picture and precedes the first VCL NAL unit of another coded picture. Any picture parameter set NAL unit containing the value of pic_parameter_set_id for the active texture picture parameter set RBSP for a particular value of VOIdx for a coded picture shall have the same content as that of the active texture picture parameter set RBSP for the particular value of VOIdx for this coded picture unless the picture parameter set NAL unit follows the last VCL NAL unit of this coded picture and precedes the first VCL NAL unit of another coded picture.

Video decoder 30 initially determines that each MVC sequence parameter set RBSP is not active at the start of the operation of the decoding process. Again, reference to MVC sequence parameter sets refers to MVC sequence parameter sets within the context of 3DVC, which inherits or otherwise adopts MVC and thus incorporates MVC sequence parameter sets (although these parameter sets may be modified by adding additional 3DVC specific syntax elements). At most, video decoder 30 determines that one MVC sequence parameter set RBSP is the active MVC sequence parameter set RBSP at any given moment during the operation of the decoding process. When any particular MVC sequence parameter set RBSP becomes the active MVC sequence parameter set RBSP, video decoder 30 deactivates the previously-active MVC sequence parameter set RBSP (if any).

The active MVC sequence parameter set RBSP is either a sequence parameter set RBSP or a subset sequence parameter set RBSP. Sequence parameter set RBSPs are activated by coded slice NAL units with nal_unit_type equal to 1 or 5 or buffering period SEI messages that are not included in an MVC scalable nesting SEI message or a 3DV scalable nesting SEI message. Subset sequence parameter sets are activated by coded slice MVC extension NAL units (nal_unit_type equal to 21) or buffering period SEI messages that are included in a 3DV scalable nesting SEI message. A sequence parameter set RBSP and a subset sequence parameter set RBSP may have the same value of seq_parameter_set_id.

In addition to the active MVC sequence parameter set RBSP, video decoder 30 may activate zero or more MVC sequence parameter set RBSPs specifically for view components (with a particular value of VOIdx less than VOIdxMax) that belong to the target output views or that may be referred to through inter-view prediction in decoding view components belonging to the target output views. Such an MVC sequence parameter set RBSP is referred to as the active view MVC sequence parameter set RBSP for the particular value of VOIdx. The restrictions on active MVC sequence parameter set RBSPs also apply to active view MVC sequence parameter set RBSPs for a particular value of VOIdx less than VOIdxMax.

Furthermore, video decoder 30 may activate zero or more MVC sequence parameter set RBSPs specifically for texture components (with a particular value of VOIdx less than or equal to VOIdxMax) that belong to the target output views or that may be referred to through inter-view prediction in decoding texture components belonging to the target output views. Such an MVC sequence parameter set RBSP is referred to as the active texture MVC sequence parameter set RBSP for the particular value of VOIdx. The restrictions on active MVC sequence parameter set RBSPs also apply to active texture MVC sequence parameter set RBSPs for a particular value of VOIdx.

For the following description, the activating buffering period SEI message is specified as follows.

If VOIdxMax is equal to VOIdxMin and the access unit contains a buffering period SEI message not included in an MVC scalable nesting SEI message and not included in a 3DVC scalable nesting SEI message, this buffering period SEI message is the activating buffering period SEI message.

Otherwise, if VOIdxMax is not equal to VOIdxMin and the access unit contains a buffering period SEI message included in a 3DVC scalable nesting SEI message and associated with the operation point being decoded, this buffering period SEI message is the activating buffering period SEI message.

Otherwise, the access unit does not contain an activating buffering period SEI message.

When a sequence parameter set RBSP (nal_unit_type is equal to 7) with a particular value of seq_parameter_set_id is not already the active MVC sequence parameter set RBSP and the sequence parameter set RBSP is referred to by activation of a picture parameter set RBSP (using that value of seq_parameter_set_id) and the picture parameter set RBSP is activated by a coded slice NAL unit with nal_unit_type equal to 1 or 5 (the picture parameter set RBSP becomes the active picture parameter set RBSP and VOIdxMax is equal to VOIdxMin and there is no depth component in the access unit) and the access unit does not contain an activating buffering period SEI message, video decoder 30 may activate the sequence parameter set RBSP. This sequence parameter set RBSP is called the active MVC sequence parameter set RBSP until the sequence parameter set RBSP is deactivated when another MVC sequence parameter set RBSP becomes the active MVC sequence parameter set RBSP. A sequence parameter set RBSP, with that particular value of seq_parameter_set_id, shall be available to the decoding process prior to activation of the sequence parameter set RBSP.

When a sequence parameter set RBSP (nal_unit_type is equal to 7) with a particular value of seq_parameter_set_id is not already the active MVC sequence parameter set RBSP and the sequence parameter set RBSP is referred to by an activating buffering period SEI message (using that value of seq_parameter_set_id) that is not included in a 3DV scalable nesting SEI message and VOIdxMax is equal to VOIdxMin and there is no depth component in the access unit, video decoder 30 activates the sequence parameter set RBSP. This sequence parameter set RBSP is called the active MVC sequence parameter set RBSP until the sequence parameter set RBSP is deactivated when another MVC sequence parameter set RBSP becomes the active MVC sequence parameter set RBSP. A sequence parameter set RBSP, with that particular value of seq_parameter_set_id, shall be available to the decoding process prior to activation of the sequence parameter set RBSP.

When a subset sequence parameter set RBSP (nal_unit_type is equal to 15) with a particular value of seq_parameter_set_id is not already the active MVC sequence parameter set RBSP and the subset sequence parameter set RBSP is referred to by activation of a picture parameter set RBSP (using that value of seq_parameter_set_id) and the picture parameter set RBSP is activated by a coded slice NAL unit with nal_unit_type equal to 21 and with VOIdx equal to VOIdxMax (the picture parameter set RBSP becomes the active picture parameter set RBSP) and the access unit does not contain an activating buffering period SEI message, video decoder 30 may activate the subset sequence parameter set RBSP. This subset sequence parameter set RBSP is called the active MVC sequence parameter set RBSP until the subset sequence parameter set RBSP is deactivated when another MVC sequence parameter set RBSP becomes the active MVC sequence parameter set RBSP. A subset sequence parameter set RBSP, with that particular value of seq_parameter_set_id, shall be available to the decoding process prior to its activation.

When a subset sequence parameter set RBSP (nal_unit_type is equal to 15) with a particular value of seq_parameter_set_id is not already the active MVC sequence parameter set RBSP and the subset sequence parameter set RBSP is referred to by an activating buffering period SEI message (using that value of seq_parameter_set_id) that is included in a 3DV scalable nesting SEI message, video decoder 30 activates the subset sequence parameter set RBSP. This subset sequence parameter set RBSP is called the active MVC sequence parameter set RBSP until the subset sequence parameter set RBSP is deactivated when another MVC sequence parameter set RBSP becomes the active MVC sequence parameter set RBSP. A subset sequence parameter set RBSP, with that particular value of seq_parameter_set_id, shall be available to the decoding process prior to activation of the subset sequence parameter set RBSP.

For the following description, the activating texture buffering period SEI message for a particular value of VOIdx is specified as follows.

If the access unit contains one or more than one buffering period SEI message included in an MVC scalable nesting SEI message and associated with an operation point for which the greatest VOIdx in the associated bitstream subset is equal to the particular value of VOIdx, the first of these buffering period SEI messages, in decoding order, is the activating texture buffering period SEI message for the particular value of VOIdx.

Otherwise, if the access unit contains a buffering period SEI message not included in an MVC scalable nesting SEI message or a 3DV scalable nesting SEI message, this buffering period SEI message is the activating texture buffering period SEI message for the particular value of VOIdx equal to VOIdxMin.

Otherwise, the access unit does not contain an activating texture buffering period SEI message for the particular value of VOIdx.

When a sequence parameter set RBSP (nal_unit_type is equal to 7) with a particular value of seq_parameter_set_id is not already the active texture MVC sequence parameter set RBSP for VOIdx equal to VOIdxMin and the sequence parameter set RBSP is referred to by activation of a picture parameter set RBSP (using that value of seq_parameter_set_id) and the picture parameter set RBSP is activated by a coded slice NAL unit with nal_unit_type equal to 1 or 5 (the picture parameter set RBSP becomes the active texture picture parameter set RBSP for VOIdx equal to VOIdxMin), video decoder 30 may activate the sequence parameter set RBSP for texture components with VOIdx equal to VOIdxMin. This sequence parameter set RBSP is called the active texture MVC sequence parameter set RBSP for VOIdx equal to VOIdxMin until the sequence parameter set RBSP is deactivated when another MVC sequence parameter set RBSP becomes the active texture MVC sequence parameter set RBSP for VOIdx equal to VOIdxMin. A sequence parameter set RBSP, with that particular value of seq_parameter_set_id, shall be available to the decoding process prior to activation of the sequence parameter set RBSP.

When a sequence parameter set RBSP (nal_unit_type is equal to 7) with a particular value of seq_parameter_set_id is not already the active texture MVC sequence parameter set RBSP for VOIdx equal to VOIdxMin and the sequence parameter set RBSP is referred to by an activating texture buffering period SEI message (using that value of seq_parameter_set_id) that is not included in an MVC scalable nesting SEI message or a 3DV scalable nesting SEI message, video decoder 30 may activate the sequence parameter set RBSP for texture components with VOIdx equal to VOIdxMin. This sequence parameter set RBSP is called the active texture MVC sequence parameter set RBSP for VOIdx equal to VOIdxMin until the sequence parameter set RBSP is deactivated when another MVC sequence parameter set RBSP becomes the active texture MVC sequence parameter set RBSP for VOIdx equal to. A sequence parameter set RBSP, with that particular value of seq_parameter_set_id, shall be available to the decoding process prior to activation of the sequence parameter set RBSP.

When a subset sequence parameter set RBSP (nal_unit_type is equal to 15) with a particular value of seq_parameter_set_id is not already the active texture MVC sequence parameter set RBSP for a particular value of VOIdx less than or equal to VOIdxMax and the subset sequence parameter set RBSP is referred to by activation of a picture parameter set RBSP (using that value of seq_parameter_set_id) and the picture parameter set RBSP is activated by a coded slice MVC extension NAL unit (nal_unit_type equal to 20) with the particular value of VOIdx (the picture parameter set RBSP becomes the active texture picture parameter set RBSP for the particular value of VOIdx), video decoder 30 may activate the subset sequence parameter set RBSP for texture components with the particular value of VOIdx. This subset sequence parameter set RBSP is called the active texture MVC sequence parameter set RBSP for the particular value of VOIdx until the subset sequence parameter set RBSP is deactivated when another MVC sequence parameter set RBSP becomes the active texture MVC sequence parameter set RBSP for the particular value of VOIdx. A subset sequence parameter set RBSP, with that particular value of seq_parameter_set_id, shall be available to the decoding process prior to activation of the subset sequence parameter set RBSP.

When a subset sequence parameter set RBSP (nal_unit_type is equal to 15) with a particular value of seq_parameter_set_id is not already the active texture MVC sequence parameter set RBSP for a particular value of VOIdx less than or equal to VOIdxMax and the subset sequence parameter set RBSP is referred to by an activating texture buffering period SEI message (using that value of seq_parameter_set_id) that is included in an MVC scalable nesting SEI message and associated with the particular value of VOIdx, video decoder 30 may activate this subset sequence parameter set RBSP for texture components with the particular value of VOIdx. This subset sequence parameter set RBSP is called the active texture MVC sequence parameter set RBSP for the particular value of VOIdx until the subset sequence parameter set RBSP is deactivated when another MVC sequence parameter set RBSP becomes the active texture MVC sequence parameter set RBSP for the particular value of VOIdx. A subset sequence parameter set RBSP, with that particular value of seq_parameter_set_id, shall be available to the decoding process prior to activation of the subset sequence parameter set RBSP.

For the following specification, the activating view buffering period SEI message for a particular value of VOIdx is specified as follows.

If the access unit contains one or more than one buffering period SEI message included in a 3DVC scalable nesting SEI message and associated with an operation point for which the greatest VOIdx in the associated bitstream subset is equal to the particular value of VOIdx, the first of these buffering period SEI messages, in decoding order, is the activating view buffering period SEI message for the particular value of VOIdx.

Otherwise, the access unit does not contain an activating view buffering period SEI message for the particular value of VOIdx.

When a subset sequence parameter set RBSP (nal_unit_type is equal to 15) with a particular value of seq_parameter_set_id is not already the active view MVC sequence parameter set RBSP for a particular value of VOIdx less than VOIdxMax and the subset sequence parameter set RBSP is referred to by activation of a picture parameter set RBSP (using that value of seq_parameter_set_id) and the picture parameter set RBSP is activated by a coded slice NAL unit with nal_unit_type equal to 21 and with the particular value of VOIdx (the picture parameter set RBSP becomes the active view picture parameter set RBSP for the particular value of VOIdx), video decoder 30 activates the subset sequence parameter set RBSP for view components with the particular value of VOIdx. This subset sequence parameter set RBSP is called the active view MVC sequence parameter set RBSP for the particular value of VOIdx until the subset sequence parameter set RBSP is deactivated when another MVC sequence parameter set RBSP becomes the active view MVC sequence parameter set RBSP for the particular value of VOIdx or when decoding an access unit with VOIdxMax less than or equal to the particular value of VOIdx. A subset sequence parameter set RBSP, with that particular value of seq_parameter_set_id, shall be available to the decoding process prior to activation of the subset sequence parameter set RBSP.

When a subset sequence parameter set RBSP (nal_unit_type is equal to 15) with a particular value of seq_parameter_set_id is not already the active view MVC sequence parameter set RBSP for a particular value of VOIdx less than VOIdxMax and the subset sequence parameter set RBSP is referred to by an activating view buffering period SEI message (using that value of seq_parameter_set_id) that is included in a 3DV scalable nesting SEI message and associated with the particular value of VOIdx, video decoder 30 activates this subset sequence parameter set RBSP for view components with the particular value of VOIdx. This subset sequence parameter set RBSP is called the active view MVC sequence parameter set RBSP for the particular value of VOIdx until the subset sequence parameter set RBSP is deactivated when another MVC sequence parameter set RBSP becomes the active view MVC sequence parameter set RBSP for the particular value of VOIdx or when decoding an access unit with VOIdxMax less than or equal to the particular value of VOIdx. A subset sequence parameter set RBSP, with that particular value of seq_parameter_set_id, shall be available to the decoding process prior to activation of the subset sequence parameter set RBSP.

An MVC sequence parameter set RBSP that includes a value of profile_idc not specified in Annex A or Annex H or proposed Annex I to H.264/AVC shall not be referred to by activation of a picture parameter set RBSP as the active picture parameter set RBSP or as active view picture parameter set RBSP or as active texture picture parameter set RBSP (using that value of seq_parameter_set_id) or referred to by a buffering period SEI message (using that value of seq_parameter_set_id). An MVC sequence parameter set RBSP including a value of profile_idc not specified in Annex A or Annex H or proposed Annex I to H.264/AVC is ignored in the decoding for profiles specified in Annex A or Annex H or proposed Annex I to H.264/AVC.

It is a requirement of bitstream conformance that the following constraints are obeyed:

For each particular value of VOIdx, all coded slice NAL units (with nal_unit_type equal to 1, 5, 20, or 21) of a coded video sequence shall refer to the same value of seq_parameter_set_id (via the picture parameter set RBSP that is referred to by the value of pic_parameter_set_id).

The value of seq_parameter_set_id in a buffering period SEI message that is not included in an MVC scalable nesting SEI message shall be identical to the value of seq_parameter_set_id in the picture parameter set RBSP that is referred to by coded slice NAL units with nal_unit_type equal to 1 or 5 (via the value of pic_parameter_set_id) in the same access unit.

The value of seq_parameter_set_id in a buffering period SEI message that is included in an MVC scalable nesting SEI message and is associated with a particular value of VOIdx shall be identical to the value of seq_parameter_set_id in the picture parameter set RBSP that is referred to by coded slice NAL units with nal_unit_type equal to 1, 5 or 20 with the particular value of VOIdx (via the value of pic_parameter_set_id) in the same access unit.

The value of seq_parameter_set_id in a buffering period SEI message that is included in a 3DVC scalable nesting SEI message and is associated with a particular value of VOIdx shall be identical to the value of seq_parameter_set_id in the picture parameter set RBSP that is referred to by coded slice NAL units with nal_unit_type equal to 21 with the particular value of VOIdx (via the value of pic_parameter_set_id) in the same access unit.

The active view MVC sequence parameter set RBSPs for different values of VOIdx may be the same MVC sequence parameter set RBSP. The active MVC sequence parameter set RBSP and an active view MVC sequence parameter set RBSP for a particular value of VOIdx may be the same MVC sequence parameter set RBSP.

The active texture MVC sequence parameter set RBSPs for different values of VOIdx may be the same MVC sequence parameter set RBSP. The active MVC sequence parameter set RBSP and an active texture MVC sequence parameter set RBSP for a particular value of VOIdx may be the same MVC sequence parameter set RBSP. An active view MVC sequence parameter set RBSP for a particular value of VOIdx and an active texture MVC sequence parameter set RBSP for a particular value of VOIdx may be the same MVC sequence parameter set RBSP.

When the active MVC sequence parameter set RBSP for a coded picture is a sequence parameter set RBSP, any sequence parameter set RBSP in the coded video sequence containing this coded picture and with the value of seq_parameter_set_id for the active MVC sequence parameter set RBSP shall have the same content as that of the active MVC sequence parameter set RBSP.

When the active MVC sequence parameter set RBSP for a coded picture is a subset sequence parameter set RBSP, any subset sequence parameter set RBSP in the coded video sequence containing this coded picture and with the value of seq_parameter_set_id for the active MVC sequence parameter set RBSP shall have the same content as that of the active MVC sequence parameter set RBSP.

For each particular value of VOIdx, the following applies:

When the active texture MVC sequence parameter set RBSP for a coded picture is a sequence parameter set RBSP, any sequence parameter set RBSP in the coded video sequence containing this coded picture and with the value of seq_parameter_set_id for the active texture MVC sequence parameter set RBSP shall have the same content as that of the active texture MVC sequence parameter set RBSP.

When the active texture MVC sequence parameter set RBSP for a coded picture is a subset sequence parameter set RBSP, any subset sequence parameter set RBSP in the coded video sequence containing this coded picture and with the value of seq_parameter_set_id for the active texture MVC sequence parameter set RBSP shall have the same content as that of the active texture MVC sequence parameter set RBSP.

The active view MVC sequence parameter set RBSP for a coded picture is a subset sequence parameter set RBSP, and any subset sequence parameter set RBSP in the coded video sequence containing this coded picture and with the value of seq_parameter_set_id for the active view MVC sequence parameter set RBSP shall have the same content as that of the active view MVC sequence parameter set RBSP.

If picture parameter set RBSPs or MVC sequence parameter set RBSPs are conveyed within the bitstream, these constraints impose an order constraint on the NAL units that contain the picture parameter set RBSPs or MVC sequence parameter set RBSPs, respectively. Otherwise (picture parameter set RBSPs or MVC sequence parameter set RBSPs are conveyed by other means not specified in this Recommendation|International Standard to the H.264 video coding standard), they must be available to the decoding process in a timely fashion such that these constraints are obeyed.

When present, a sequence parameter set extension RBSP includes parameters having a similar function to those of a sequence parameter set RBSP. For purposes of establishing constraints on the syntax elements of the sequence parameter set extension RBSP and for purposes of determining activation of a sequence parameter set extension RBSP, the sequence parameter set extension RBSP shall be considered part of the preceding sequence parameter set RBSP with the same value of seq_parameter_set_id. When a sequence parameter set RBSP is present that is not followed by a sequence parameter set extension RBSP with the same value of seq_parameter_set_id prior to the activation of the sequence parameter set RBSP, the sequence parameter set extension RBSP and its syntax elements shall be considered not present for the active MVC sequence parameter set RBSP. The contents of sequence parameter set extension RBSPs only apply when the base texture view, which conforms to one or more of the profiles specified in Annex A, of a coded video sequence conforming to one or more profiles specified in Annex I is decoded. Subset sequence parameter set RBSPs shall not be followed by a sequence parameter set extension RBSP.

Sequence parameter sets extension RBSPs are not considered to be part of a subset sequence parameter set RBSP and subset sequence parameter set RBSPs must not be followed by a sequence parameter set extension RBSP.

For view components with VOIdx equal to VOIdxMax, all constraints that are expressed on the relationship between the values of the syntax elements (and the values of variables derived from those syntax elements) in MVC sequence parameter sets and picture parameter sets and other syntax elements are expressions of constraints that apply only to the active MVC sequence parameter set and the active picture parameter set. For view components with a particular value of VOIdx less than VOIdxMax, all constraints that are expressed on the relationship between the values of the syntax elements (and the values of variables derived from those syntax elements) in MVC sequence parameter sets and picture parameter sets and other syntax elements are expressions of constraints that apply only to the active view MVC sequence parameter set and the active view picture parameter set for the particular value of VOIdx.

If any MVC sequence parameter set RBSP having profile_idc equal to the value of one of the profile_idc values specified in Annex A, Annex H or proposed Annex I is present that is never activated in the bitstream (i.e., the MVC sequence parameter set RBSP never becomes the active MVC sequence parameter set or an active view MVC sequence parameter set), syntax elements of the MVC sequence parameter set RBSP shall have values that would conform to the specified constraints if the MVC sequence parameter set RBSP were activated by reference in an otherwise-conforming bitstream. If any picture parameter set RBSP is present that is never activated in the bitstream (i.e., the picture parameter set RBSP never becomes the active picture parameter set or an active view picture parameter set), syntax elements of the picture parameter set RBSP shall have values that would conform to the specified constraints if the picture parameter set RBSP were activated by reference in an otherwise-conforming bitstream.

During operation of the decoding process, for view components with VOIdx equal to VOIdxMax, the values of parameters of the active picture parameter set and the active MVC sequence parameter set shall be considered in effect (meaning, in one example, applied when decoding). For view components with a particular value of VOIdx less than VOIdxMax, the values of the parameters of the active view picture parameter set and the active view MVC sequence parameter set for the particular value of VOIdx shall be considered in effect. For interpretation of SEI messages that apply to the entire access unit or the view component with VOIdx equal to VOIdxMax, the values of the parameters of the active picture parameter set and the active MVC sequence parameter set for the same access unit shall be considered in effect unless otherwise specified in the SEI message semantics. For interpretation of SEI messages that apply to view components with a particular value of VOIdx less than VOIdxMax, the values of the parameters of the active view picture parameter set and the active view MVC sequence parameter set for the particular value of VOIdx for the same access unit shall be considered in effect unless otherwise specified in the SEI message semantics.

For any active MVC SPS or active view MVC SPS, part of the syntax elements in the MVC SPS extension applies only to the depth views referring to this SPS, while the some other parts of the syntax elements in the MVC SPS extension collectively apply to both the depth views referring to this SPS and the corresponding texture views. More specifically, the view dependency information of the MVC SPS extension applies only to the depth views, and the level definitions collectively apply to operation points, each of which contains both depth views and their corresponding texture views.

In some instances, the techniques of this disclosure may enable video decoder 30 to activate, during coding of a bitstream that contains depth views, a texture picture parameter set (PPS) or a texture MVC sequence parameter set (SPS) for a view order index value.

In some instances, video decoder 30 may activate, during coding of the bitstream, an active PPS, activate, during coding of the bitstream, an active view PPS for the view order index value, activate, during coding of the bitstream, an active view MVC SPS for the view order index value, and activate, during coding of the bitstream, an active MVC SPS.

In some instances, activating the texture PPS may involve activating, for depth components that specify the view order index value, a PPS raw byte sequence payload (RBSP) when the PPS RBSP is not an active texture PPS for the view order index value and the PPS RBSP is referred to by a coded slice Network Abstraction Layer (NAL) unit that both belongs to a texture component and that specifies the view order index value, activating the PPS RBSP. Video decoder 30 may also activate the texture PPS and the texture MVC SPS as described above.

In any event, when the video slice is coded as an intra-coded (I) slice, intra prediction unit 84 of prediction unit 81 may generate prediction data for a video block of the current video slice based on a signaled intra prediction mode and data from previously decoded blocks of the current picture in view of the active parameter sets. When the picture is coded as an inter-coded (i.e., B, P or generalize PB (GPB)) slice, motion compensation unit 82 of prediction unit 81 produces predictive blocks for a video block of the current video slice based on the motion vectors and other syntax elements received from entropy decoding unit 80, again in view of the active parameter sets. The predictive blocks may be produced from one of the reference pictures within one of the reference picture lists. Video decoder 30 may construct the reference picture lists, List 0 and List 1 (or a combined list, List c) using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied.

Inverse transform processing unit 88 applies an inverse transform, e.g., an inverse DCT, an inverse integer transform, or a conceptually similar inverse transform process, to the transform coefficients in order to produce residual blocks in the pixel domain. Inverse transform processing unit 88 may determine the manner in which transforms were applied to residual data.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 92, which stores reference pictures used for subsequent motion compensation. Reference picture memory 92 also stores decoded video for later presentation on a display device, such as display device 32 of FIG. 1.

Other aspects of the techniques described in this disclosure may promote separate handling of depth and texture components by enabling a video coding device to separately remove texture and depth components from a decoded picture buffer. The decoded picture buffer refers to a memory or other computer-readable medium capable of storing reference pictures for use in coding a current view component. The decoded picture buffer is shown as reference picture memory 92 in the example of FIG. 3. Because the techniques set forth in this disclosure enable separate handling of texture and depth components, video decoder 30 may decode a texture component of a view component using reference pictures different than those used when coding a depth component of the same view component contrary to conventional 3DVC where a view component (and therefore the depth and texture components of that view component) was coded using the same reference pictures given treatment of views in MVC. As a result, there may be instances where depth components of a reference view component may be removed from the decoded picture buffer prior to texture components of the same reference view component, and a texture component of a reference view component may be removed from the decoded picture buffer prior to the depth component of the same reference view component.

In operation, video decoder 30 may perform the techniques described in this disclosure by storing a depth component in reference picture memory 92 and analyzing a view dependency to determine whether the depth component is used for inter-view prediction. Video decoder 30 may then remove the depth component from reference picture memory 92 in response to determining that the depth component is not used for inter-view prediction. That is, video decoder 30 may remove the depth component of a reference view component from reference picture memory 92 without removing the texture component of the same reference view component in response to determining that the depth component is not used for inter-view prediction. Video decoder 30 may, prior to removing the depth component, validate this depth component as being eligible for removal by determining that the depth component does not belong to a target output view and that the depth component is associated with a network abstraction layer reference identification code having a value equal to zero (meaning that the content of the NAL unit encapsulating the depth component is not used to construct reference pictures for inter-picture prediction).

That is, in 3DVC (which again may also be referred to as MVC plus depth or MVC+D), the texture or depth portion of each view has its own reference picture marking processes. The texture and depth components belonging to the target output views may be outputted simultaneously.

For a depth component which does not belong to a target output view and has nal_ref_idc equal to 0, video decoder 30 may remove the depth component from the DPB once the depth component is never used for inter-view reference, by analyzing the view dependency signaled in the MVC SPS extension of the subset SPS containing a 3DV profile and is currently activated as the active view MVC sequence parameter set RBSP. Again, reference to MVC in this disclosure refers to MVC in the context of 3DVC, which as noted above is a proposed extension of H.264.

For instance, the techniques of this disclosure may enable a video coder (which may refer to both or either of video encoder 20 and/or video decoder 30) to store a depth component in a decoded picture buffer, the depth component not belonging to a target output view and having a nal_ref_idc equal to 0. Furthermore, a video coder may analyze a view dependency to determine whether the depth component is never used to inter-view reference. In addition, the video coder may comprise removing a depth component from a decoded picture buffer in response to determining that the depth component is never used for inter-view reference. The view dependency may be signaled in a MVC sequence parameter set (SPS) extension of a subset SPS, the subset SPS containing a 3DV profile, the subset SPS being currently activated as an active view MVC sequence parameter set. The video encoder may encode the depth component. Alternatively, the video coder may decode the depth component.

While various aspects of the techniques are described above with respect to one of video encoder 20 or video decoder 30, the techniques may in some instances be implemented by both video encoder 20 and video decoder 30 in a same or reciprocal fashion. As a result, the techniques may be generally implemented by a video coder, which may represent a term used in this disclosure to refer to both or only one of video encoder 20 and video decoder 30. These techniques should therefore not be limited in this respect, but may generally be implemented by any video coder.

Figure 4:
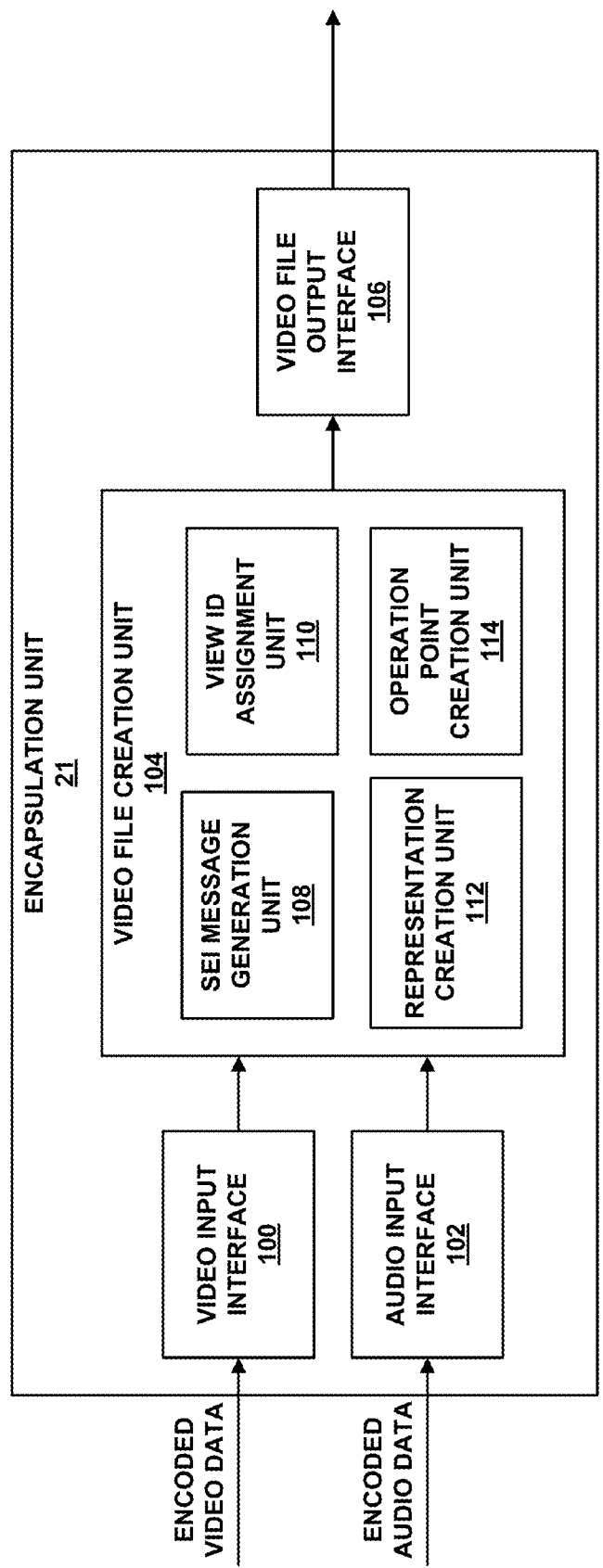
FIG. 4 is a block diagram illustrating the encapsulation unit shown in the example of FIG. 1 in more detail.

FIG. 4 is a block diagram illustrating encapsulation unit 21 in more detail. In the example of FIG. 4, encapsulation unit 21 includes a video input interface 100, an audio input interface 102, a video file creation unit 104, and a video file output interface 106. Video file creation unit 104, in this example, includes a supplemental enhancement information (SEI) message generation unit 108, a view identifier (ID) assignment unit 110, a representation creation unit 112, and an operation point creation unit 114.

Video input interface 100 and audio input interface 102 receive encoded video and audio data, respectively. While not shown in the example of FIG. 1, source device 12 may also include an audio source and audio encoder to generate audio data and encode audio data, respectively. Encapsulation unit 21 may then encapsulate the encoded audio data and the encoded video data to form a video file. Video input interface 100 and audio input interface 102 may receive encoded video and audio data as the data is encoded, or may retrieve encoded video and audio data from a computer-readable medium. Upon receiving encoded video and audio data, video input interface 100 and audio input interface 102 pass the encoded video and audio data to video file creation unit 104 for assembly into a video file.

Video file creation unit 104 may correspond to a control unit including hardware, software, and/or firmware configured to perform the functions and procedures attributed thereto. The control unit may further perform the functions attributed to encapsulation unit 21 generally. For examples in which video file creation unit 104 is embodied in software and/or firmware, encapsulation unit 21 may include a computer-readable medium comprising instructions for video file creation unit 104 and a processing unit to execute the instructions. Each of the sub-units of video file creation unit 104 (SEI message generation unit 108, view ID assignment unit 110, representation creation unit 112, and operation point creation unit 114, in this example) may be implemented as individual hardware units and/or software modules, and may be functionally integrated or further separated into additional sub-units.

Video file creation unit 104 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation unit 104 may further include a non-transitory computer-readable medium storing instructions for any or all of SEI message generation unit 108, view ID assignment unit 110, representation creation unit 112, and operation point creation unit 114, as well as a processor for executing the instructions.

In general, video file creation unit 104 may create one or more video files including the received audio and video data. Video file creation unit 104 may construct a media presentation description (MPD) for multimedia content including two or more views. In other examples, video file creation unit 104 may create a manifest storing data similar to that of the MPD for the multimedia content. SEI message generation unit 108 may represent a unit that generates SEI messages. View ID assignment unit 110 may assign view identifiers to each of the views of the multimedia content. Representation creation unit 112 may construct one or more representations for the multimedia content, each of which may include one or more of the views for the multimedia content. In some examples, view ID assignment unit 110 may include data in the MPD and/or the representations (e.g., header data for the representations) indicating a maximum and a minimum of the view identifiers for views included in the representations. In addition, representation creation unit 112 may provide information in the MPD that indicates whether larger view IDs correspond to views having camera perspectives to the right or to the left of camera perspectives for views having smaller view IDs.

In some examples, the same view may be encoded using various encoding characteristics, such as different frame rates, different bit rates, different encoding schemes, or other differences. Representation creation unit 112 may ensure that each view included in a common representation is encoded according to the same encoding characteristics. In this manner, the MPD and/or header data for the representation may signal a set of characteristics (or attributes) for the representation that applies to all views in the representation. Moreover, representation creation unit 112 may create multiple representations including the same views, albeit with potentially different encoding characteristics. In some examples, representation creation unit 112 may encapsulate each view of multimedia content in individual representations. In such examples, to output more than one view, destination device 14 may request two or more representations of the multimedia content.

Operation point creation unit 114 may create operation points for one or more representations of the multimedia content. In general, an operation point corresponds to a subset of views in a representation that are targeted for output, where each of the views shares a common temporal level. As defined by the H.264/AVC specification: An operation point is identified by a temporal_id value representing the target temporal level and a set of view_id values representing the target output views. One operation point is associated with a bitstream subset, which consists of the target output views and all other views the target output views depend on, that is derived using the sub-bitstream extraction process as specified in subclause H.8.5.3 with tIdTarget equal to the temporal_id value and viewIdTargetList consisting of the set of view_id values as inputs. More than one operation point may be associated with the same bitstream subset. When the specification states "an operation point is decoded" it refers to the decoding of a bitstream subset corresponding to the operation point and subsequent output of the target output views.

SEI message generation unit 108 may, in accordance with the techniques described in this disclosure, determine a nested supplemental information (SEI) message that applies to both texture and depth components of a view component or only to a depth component of the view component. By enabling a nested SEI message to apply only to a depth component, these aspects of the techniques may again promote separate handling of texture and depth components.

SEI message generation unit 108 may perform these aspects of the techniques to determine a supplemental enhancement information message that applies to coding of the view component of the multiview video data. SEI message generation unit 108 may then determine a nested supplemental enhancement information message that applies in addition to the supplemental enhancement information message when processes the depth component of the view component. SEI message generation unit 108 may then encode the depth component of the view component based on the supplemental enhancement information message and the nested supplemental enhancement information message.

Typically, the nested SEI message includes a flag or other identifier that indicates whether the nested SEI message applies to both the texture and depth components of the view component or only to the depth component. Thus, in some instances, SEI message generation unit 108 may determine that the nested supplemental enhancement information message applies in addition to the supplemental enhancement information message when only processing the depth component of the view component and processes only the depth component of the view component and not the texture component of the view component based on the supplemental enhancement information message and the nested supplemental enhancement information message. Alternatively, SEI message generation unit 108 may determine that the nested supplemental enhancement information message applies in addition to the supplemental enhancement information message when processing the texture component of the view component and codes the texture component of the view component based on the supplemental enhancement information message and the nested supplemental enhancement information message. Again, these aspects of the techniques again facilitate separate handling or processing of depth and texture components of the view component.

This flag may be defined for an SEI message referred to as a "3DV scalable nesting SEI message," which may represent an SEI message for nesting of SEI messages for operation points containing depth components. The following table illustrates an example 3DV scalable nesting SEI message syntax.

| 3dv_scalable_nesting( payloadSize ) { | C | Descriptor |
|---|---|---|
| operation_point_flag | 5 | u(1) |
| if ( !operation_point_flag ) { | | |
|     all_view_components_in_au_flag | 5 | u(1) |
|     if( !all_view_components_in_au_flag ) { | | |
|         num_view_components_minus1 | 5 | ue(v) |
|         for( i = 0; i <= | | |
|         num_view_components_minus1; i++ ) { | | |
|             sei_view_id[ i ] | 5 | u(10) |
|             sei_view_applicability_flag[ i ] | 5 | u(1) |
|         } | | |
|     } | | |
| } else { | | |
|     num_view_components_op_minus1 | 5 | ue(v) |
|     for( i = 0; i <= | | |
|     num_view_components_op_minus1; i++ ) { | | |
|         sei_op_view_id[ i ] | 5 | u(10) |
|         sei_op_view_applicability_flag[ i ] | 5 | u(1) |
|     } | | |
|     sei_op_temporal_id | 5 | u(3) |
| } | | |
| while( !byte_aligned( ) ) | | |
|     sei_nesting_zero_bit /* equal to 0 */ | 5 | f(1) |
| sei_message( ) | 5 | |
| } | | |

In the table above, sei_view_applicability_flag[i] equal to 1 indicates that the nested SEI message applies to both the texture component and the depth component of the view with view_id equal to sei_view_id[i]. sei_view_applicability_flag[i] equal to 0 indicates that the nested SEI message applies only to the depth component of the view with view_id equal to sei_view_id[i].

In the table above, sei_op_view_applicability_flag[i] equal to 1 indicates that the nested SEI message applies to both the texture component and the depth component of the view with view_id equal to sei_op_view_id[i]. sei_op_view_applicability_flag[i] equal to 0 indicates that the nested SEI message applies only to the depth component of the view with view_id equal to sei_op_view_id[i].

The semantics of the other syntax elements of 3DV scalable nesting SEI message is the same as the semantics of the MVC scalable nesting SEI message.

Alternatively, when a SEI message is nested for one view component, the SEI message may be nested for both the texture component and the depth component of this view component. In this case, SEI message generation unit 108 defines the syntax of the 3DV scalable nesting SEI message similar to the syntax of the MVC scalable nesting SEI message, and the semantics of the 3DV scalable nesting SEI message similar to the semantics of the MVC scalable nesting SEI message. In the semantics of the 3DV scalable nesting SEI message, as defined earlier, a view component may include (and may consist of) a texture component and a depth component. In the context of proposed Annex I, which may refer to the 3DVC extension to H.264/AVC, the semantics of the MVC scalable nesting SEI message are changed as follows. The semantics of the MVC scalable nesting SEI message applies with all instances of "view components" being replaced by "texture components." The following table presents the syntax of the MVC scalable nesting SEI message.

| mvc_scalable_nesting( payloadSize ) { | C | Descriptor |
|---|---|---|
|   operation_point_flag | 5 | u(1) |
|   if ( !operation_point_flag ) { | | |
|     all_view_components_in_au_flag | 5 | u(1) |
|     if( !all_view_components_in_au_flag ) { | | |
|       num_view_components_minus1 | 5 | ue(v) |
|       for( i = 0; i <= num_view_components_minus1; i++ ) | | |
|         sei_view_id[ i ] | 5 | u(10) |
|   } else { | | |
|     num_view_components_op_minus1 | 5 | ue(v) |
|     for( i = 0; i <= num_view_components_op_minus1; i++ ) | | |
|       sei_op_view_id[ i ] | 5 | u(10) |
|     sei_op_temporal_id | 5 | u(3) |
|   } | | |
|   while( !byte_aligned( ) ) | | |
|     sei_nesting_zero_bit /* equal to 0 */ | 5 | f(1) |
|   sei_message( ) | 5 | |
| } | | |

To further facilitate the separate handling of depth and texture components, SEI message generation unit 108 may generate an SEI message referred to as a 3D view scalability SEI message that includes a first syntax element, a second syntax element, and a third syntax element, where the first syntax element indicates whether an operation point contains a depth component. When the operation point contains a depth component, SEI message generation unit 108 may define the second syntax element to indicate a number of depth components on which a target output view of the operation point directly depends and define the third syntax elements to identify the depth components on which the target output view of the operation point directly depends.

In some instances, the operation points may include a first subset of the operation points and a second subset of the operation points, where each operation point in the first subset contains only a texture component and each operation point in the second subset contains a depth component. SEI message generation unit 108 may then determine that a profile identifier is equal to a given value that is associated with 3D video coding and generate, in response to determining that the profile identifier is equal to the given value, a subset SPS such that the subset SPS includes a first SPS extension and a second SPS extension. The first SPS extension may indicate the first subset and the levels to which the operation points in the first subset belong. The second SPS extension may indicate the second subset and the levels to which operation points in the second subset belong. In this way, the techniques may permit operations points to be defined separately for texture and depth components and by level.

In this manner, a video coding device may determine first sequence level information describing characteristics of the depth components and determining second sequence level information describing characteristics of an operation point of the video data. In some examples, the first sequence level information comprises a three-dimensional video coding sequence parameter set that specifies a view dependency of the depth components. Moreover, the video coding device may determining a reference picture list that identifies one or more reference pictures for the depth components indicated in the three-dimensional video coding sequence parameter set.

In some examples, the second sequence level information includes a three-dimensional video coding sequence parameter set that described, for the operation point, a list of target output views, a number of texture views to be decoded when decoding the operation point, and a number of depth views to be decoded for when decoding the operation point, where the number of texture views to be decoded is different form the number of depth views. In some examples, the video coding device may further target, for each of the target output views specified in the list of target output views, the one or more depth components when available.

In some examples, the video coding device may specify a three-dimensional video coding scalability information SEI message as part of the video data, wherein three-dimensional video coding scalability information SEI message includes a description of the operation point without the depth components or a description of the operation point with the depth components. In some instances, the SEI message includes an indication of whether the operation point includes the depth components. Moreover, in some examples, the SEI message includes an indication of whether the operation point includes the depth components and directly dependent depth views with directly dependent texture views for the decoding of the operation point.

This aspect of the techniques may leverage the separate handling of depth and texture components to permit operation points to be more easily extracted from a bitstream for multiview video coding. By signaling whether an operation point includes depth, a video decoder, such as video decoder 30, may determine which operation point best accommodates the abilities of video decoder 30. For example, video decoder 30 may be optimized to perform multiview video coding using views that do not include depth, preferring multiview video data where both the left and right eye perspectives are provided as separate pictures. Video decoder 30 may alternatively be optimized for depth-based multiview video data but may only accommodate a single view rather than two or more views. By signaling when the encoded multiview video data includes depth, and when including depth, the number of depth components on which the target output views of the operation point directly depends, video decoder 30 may select an operation point that accommodates the capabilities or optimizations of video decoder 30.

In operation, a 3D view scalability information SEI message, in one example, may have syntax elements specified as shown in the following table.

| 3d_view_scalability_info( payloadSize ) { | C | Descriptor |
|---|---|---|
|   num_operation_points_minus1 | 5 | ue(v) |
|   for( i = 0; i <= num_operation_points_minus1; i++ ) { | | |
|     operation_point_id[ i ] | 5 | ue(v) |
|     priority_id[ i ] | 5 | u(5) |
|     temporal_id[ i ] | 5 | u(3) |
|     num_target_output_views_minus1[ i ] | 5 | ue(v) |
|     op_with_depth_flag[ i ] | | |
|     for( j = 0; j <= num_target_output_views_minus1[ i ]; j++ ) | | |

-continued

| 3d_view_scalability_info( payloadSize ) { | C | Descriptor |
|---|---|---|
|         view_id[ i ][ j ] | 5 | ue(v) |
|         profile_level_info_present_flag[ i ] | 5 | u(1) |
|         bitrate_info_present_flag[ i ] | 5 | u(1) |
|         frm_rate_info_present_flag[ i ] | 5 | u(1) |
|         if( !num_target_output_views_minus1[ i ] ) | | |
|             view_dependency_info_present_flag[ i ] | 5 | u(1) |
|         parameter_sets_info_present_flag[ i ] | 5 | u(1) |
|         bitstream_restriction_info_present_flag[ i ] | 5 | u(1) |
|         if ( profile_level_info_present_flag[ i ] ) | | |
|             op_profile_level_idc[ i ] | 5 | u(24) |
|         if( bitrate_info_present_flag[ i ] ) { | | |
|             avg_bitrate[ i ] | 5 | u(16) |
|             max_bitrate[ i ] | 5 | u(16) |
|             max_bitrate_calc_window[ i ] | 5 | u(16) |
|         } | | |
|         if( frm_rate_info_present_flag[ i ] ) { | | |
|             constant_frm_rate_idc[ i ] | 5 | u(2) |
|             avg_frm_rate[ i ] | 5 | u(16) |
|         } | | |
|         if( view_dependency_info_present_flag[ i ] ) { | | |
|             num_directly_dependent_views[ i ] | 5 | ue(v) |
|             for( j = 0; j < num_directly_dependent_views[ i ]; j++ ) { | | |
|                 directly_dependent_view_id[ i ][ j ] | 5 | ue(v) |
|             if(op_with_depth_flag[ i ]) { | | |
|                 num_directly_dependent_depth_views[ i ] | | |
|                 for( j = 0; j < num_directly_dependent_views[ i ]; j++ ) { | | |
|                     directly_dependent_depth_view_id[ i ][ j ] | 5 | ue(v) |
|         } else | | |
|             view_dependency_info_src_op_id[ i ] | 5 | ue(v) |
|         if( parameter_sets_info_present_flag[ i ] ) { | | |
|             num_seq_parameter_set_minus1[i] | 5 | ue(v) |
|             for( j = 0; j <= num_seq_parameter_set_minus1[ i ]; j++ ) | | |
|                 seq_parameter_set_id_delta[ i ][ j ] | 5 | ue(v) |
|             num_subset_seq_parameter_set_minus1[ i ] | 5 | ue(v) |
|             for( j = 0; j <= num_subset_seq_parameter_set_minus1[i]; j++ ) | | |
|                 subset_seq_parameter_set_id_delta[ i ][ j ] | 5 | ue(v) |
|             num_pic_parameter_set_minus1[ i ] | 5 | ue(v) |
|             for( j = 0; j <= num_init_pic_parameter_set_minus1[ i ]; j++ ) | | |
|                 pic_parameter_set_id_delta[ i ][ j ] | 5 | ue(v) |
|         } else | | |
|             parameter_sets_info_src_op_id[ i ] | 5 | ue(v) |
|         if( bitstream_restriction_info_present_flag[ i ] ) { | | |
|             motion_vectors_over_pic_boundaries_flag[ i ] | 5 | u(1) |
|             max_bytes_per_pic_denom[ i ] | 5 | ue(v) |
|             max_bits_per_mb_denom[ i ] | 5 | ue(v) |
|             log2_max_mv_length_horizontal[ i ] | 5 | ue(v) |
|             log2_max_mv_length_vertical[ i ] | 5 | ue(v) |
|             num_reorder_frames[ i ] | 5 | ue(v) |
|             max_dec_frame_buffering[ i ] | 5 | ue(v) |
|         } | | |
|     } | | |
| } | | |

Alternatively, 3D view scalability information SEI messages may have syntax elements as defined in the following table.

| 3d_view_scalability_info( payloadSize ) { | C | Descriptor |
|---|---|---|
|   //same syntax elements as in view_scalability_info( ) | | |
|   for( i = 0; i <= num_operation_points_minus1; i++ ) { | | |
|     op_with_depth_flag[ i ] | 5 | u(1) |
|     if( view_dependency_info_present_flag[ i ] && op_with_depth_flag[ i ]) { | | |
|       num_directly_dependent_depth_views[ i ] | | |
|       for( j = 0; j < num_directly_dependent_views[ i ]; j++ ) { | | |
|         directly_dependent_depth_view_id[ i ][ j ] | 5 | ue(v) |
|       } | | |
|     } | | |
|   } | | |
| } | | |

The semantics of the other syntax elements of 3DV view scalability message is the same as the semantics of the MVC view scalability information SEI message. The syntax elements in the view scalability information SEI have the same semantics as in Annex H, but apply to operation points that may potentially contain depth components.

In the tables above, op_with_depth_flag[i] equal to 1 indicates that the current operation point contains depth views. op_with_depth_flag[i] equal to 0 indicates that the current operation point does not contain any depth views. num_directly_dependent_views[i] and directly_dependent_view_id[i][j] apply only to texture components of an operation point if the operation point contains both texture and depth (op_with_depth_flag[i] equal to 0). Alternatively, the names of the two syntax elements are changed to num_directly_dependent_texture sei_op views[i] and directly_dependent_texture_view_id[i][j], respectively, with the same semantics as above. The semantics of the other syntax elements of 3DV view scalability message are the same as the semantics of the MVC view scalability information SEI message.

In the tables above, num_directly_dependent_depth_views[i] specifies the number of depth views that the target output view of the current operation point is directly dependent on within the representation of the current operation point. The value of num_directly_dependent_depth_views[i] shall be in the range of 0 to 16, inclusive.

In the tables above, directly_dependent_depth_view sei_op id[i][j] specifies the view_id of the j-th depth view that the depth view of the target output view of the current operation point is directly dependent on within the representation of the current operation point. The value of directly_dependent_depth_view_id[i][j] shall be in the range of 0 to 1023, inclusive.

In other examples, depth only operation points may be signaled in this SEI message and thus an indication op_texture_depth_idc[i] is added, as shown in the following table.

| 3d_view_scalability_info( payloadSize ) { | C | Descriptor |
|---|---|---|
|   view_scalability_info( payloadSize ) | | |
|   for( i = 0; i <= num_operation_points_minus1; i++ ) { | | |
|     op_texture_depth_idc[ i ] | 5 | ue(v) |
|     if( view_dependency_info_present_flag[ i ] | | |
|     && op_with_depth_flag[ i ] == 1) { | | |
|       num_directly_dependent_depth_views[ i ] | | |
|       for( j = 0; j < | | |
|       num_directly_dependent_views[ i ]; j++ ) { | | |
|         directly_dependent_depth_view_id[ i ][ j ] | 5 | ue(v) |
|       } | | |
|     } | | |
|   } | | |
| } | | |

In the table above, op_texture_depth_idc[i] equal to 0 indicates that the current operation points contain only texture components. The op_texture_depth_idc[i] syntax element equal to 1 indicates that the current operation point contains both texture components and depth components. The op_texture_depth_idc[i] syntax element equal to 2 indicates that the current operation point contains only depth components. Num_directly_dependent_views[i] and directly_dependent_view_id[i][j] apply only to texture components of an operation point if the operation point contains texture (op_texture_depth_idc[i] equal to 0 or 1). Num_directly_dependent_views[i] and directly_dependent_view_id[i][j] apply only to depth components of an operation point if the operation point contains only texture (op_texture_depth_idc[i] equal to 2).

In some examples, in accordance with the techniques of the disclosure, a video encoder may generate a SEI message that includes a first syntax element, a second syntax element, and third syntax elements. The first syntax element indicates whether an operation point contains a depth component. If the operation point contains a depth view, the second syntax element indicates a number of depth components on which a target output view of the operation point directly depends, and the third syntax elements identify the depth components on which the target output view of the operation point directly depends. A video encoder may encode the depth components.

In some such examples, the video encoder may generate the SEI message such that the SEI message includes a fourth syntax element and fifth syntax elements. If the operation point has both texture and depth components, the fourth syntax element indicates how many texture components are associated with the operation point and the fifth syntax elements identify the texture components on which the target output view of the operation point directly depends.

Alternatively, the video encoder may signal depth-only operation points in the SEI message. For instance, the video encoder may generate the SEI message such that the first syntax element indicates whether the operation point contains only texture components, contains both texture components and depth components, or contains only depth components.

Furthermore, in some examples, the techniques of this disclosure may provide a video decoder that receives a SEI message that includes a first syntax element, a second syntax element, and third syntax elements. The first syntax element indicates whether an operation point contains a depth component. If the operation point contains a depth view, the second syntax element indicates a number of depth components on which a target output view of the operation point directly depends, and the third syntax elements identifies the depth components on which the target output view of the operation point directly depends. The video decoder may decode the depth components.

Furthermore, the SEI message may include a fourth syntax element and fifth syntax elements. If the operation point has both texture and depth components, the fourth syntax element indicates how many texture components are associated with the operation point and the fifth syntax elements identify the texture components on which the target output view of the operation point directly depends.

Alternatively, the SEI message may signal depth-only operation points in the SEI message. For instance, the first syntax element may indicate whether the operation point contains only texture components, contains both texture components and depth components, or contains only depth components.

With respect to operation points and adapting or modifying operation points to potentially provide for separate handling of texture and depth components, various aspects of the techniques described in this disclosure may provide for signaling of levels of operation points containing depth components in four different ways: 1) reusing the SPS syntax elements, 2) using similar syntax elements in 3DVC SPS extension, 3) adding more syntax elements in 3DVC SPS extension, and 4) using an alternate set of more syntax elements in 3DVC SPS extension.

With respect to the first way, i.e., reusing the SPS syntax elements, level definitions syntax elements in the MVC SPS extension are used to indicate the operation points containing depth components. Each operation point signaled in the MVC SPS extension as part of the subset SPS contains a profile_idc belonging to one of the 3D video profiles. Each operation point specifies a number of output views, each of which contains both a texture component and a depth component. Operation point creation unit 114 may implement this first way to facilitate separate handling of depth and texture components.

With respect to the second way, i.e., using similar syntax elements in 3DV SPS extension, the level definitions syntax elements in MVC SPS extension may still be used to indicate the operation points containing only texture components. In a 3DVC SPS extension of the subset SPS, similar level definitions are added, indicating the operation points containing depth components. Operation point creation unit 114 may implement this second way to facilitate separate handling of depth and texture components. The following syntax tables illustrate the similar syntax elements.

which contains both a texture component and a depth component. So, the semantics of the syntax elements are the same as those in the SPS MVC extension except that each view contains both a texture component and a depth component, or equivalently, each view component contains both a texture component and a depth component.

With respect to the third way, i.e., adding more syntax elements in 3DV SPS extension, the 3DV SPS extension may add more operation points containing texture components that need to be signaled on top of the operation points signaled in the MVC SPS extension. In this case, operation point creation unit 114 may add an additional flag to indicate

| | C | Descriptor |
|---|---|---|
| subset_seq_parameter_set_rbsp( ) { | | |
|     seq_parameter_set_data( ) | 0 | |
|     if( profile_idc = = 83 \|\| profile_idc = = 86 ) { | | |
|         seq_parameter_set_svc_extension( ) /* specified in Annex G */ | 0 | |
|         svc_vui_parameters_present_flag | 0 | u(1) |
|         if( svc_vui_parameters_present_flag = = 1 ) | | |
|             svc_vui_parameters_extension( ) /* specified in Annex G */ | 0 | |
|     } else if( profile_idc = = 118 \|\| profile_idc = = 128 ) { | | |
|         bit_equal_to_one /* equal to 1 */ | 0 | f(1) |
|         seq_parameter_set_mvc_extension( ) /* specified in Annex H */ | 0 | |
|         mvc_vui_parameters_present_flag | 0 | u(1) |
|         if( mvc_vui_parameters_present_flag = = 1 ) | | |
|             mvc_vui_parameters_extension( ) /* specified in Annex H */ | 0 | |
|     } | | |
|     else if ( profile_idc = = 138) { | | |
|         bit_equal_to_one /* equal to 1 */ | 0 | f(1) |
|         seq_parameter_set_mvc_extension( ) | | |
|         mvc_vui_parameters_present_flag | 0 | u(1) |
|         if( mvc_vui_parameters_present_flag = = 1 ) | | |
|             mvc_vui_parameters_extension( ) /* specified in Annex H */ | 0 | |
|         seq_parameter_set_3dv_extension( ) | | |
|         ... | | |
|         } | | |
|     } | | |
|     additional_extension3_flag | 0 | u(1) |
|     if ( additional_extension3_flag ) | | |
|         while( more_rbsp_data( ) ) | | |
|             additional_extension3_data_flag | 0 | u(1) |
|     } | | |
|     rbsp_trailing_bits( ) | 0 | |
| } | | |

| | C | Descriptor |
|---|---|---|
| seq_parameter_set_3dv_extension( ) { | | |
|     for( i = 0; i <= num_level_values_signalled_minus1; i++ ) | | |
|     num_level_values_signalled_minus1 | 0 | ue(v) |
|     for( i = 0; i <= num_level_values_signalled_minus1; i++ ) { | | |
|         level_idc[ i ] | 0 | u(8) |
|         num_applicable_ops_minus1[ i ] | 0 | ue(v) |
|         for( j = 0; j <= num_applicable_ops_minus1[ i ]; j++ ) { | | |
|             applicable_op_temporal_id[ i ][ j ] | 0 | u(3) |
|             applicable_op_num_target_views_minus1[ i ][ j ] | 0 | ue(v) |
|             for( k = 0; k <= applicable_op_num_target_views_minus1[ i ][ j ]; k++ ) | | |
|                 applicable_op_target_view_id[ i ][ j ][ k ] | 0 | ue(v) |
|             applicable_op_num_views_minus1[ i ][ j ] | 0 | ue(v) |
|         } | | |
|     } | | |
|     ... | | |
| } | | |

In the above syntax table, each operation point has num_sei_op_target_views_minus1[i][j]+1 views, each of whether the current operation point contains a depth component or not, as shown in the following syntax table.

| seq_parameter_set_3dvc_extension( ) { | C | Descriptor |
|---|---|---|
|     for( i = 0; i <= num_level_values_signalled_minus1; i++ ) | | |
|       num_level_values_signalled_minus1 | 0 | ue(v) |
|     for( i = 0; i <= num_level_values_signalled_minus1; i++ ) { | | |
|       level_idc[ i ] | 0 | u(8) |
|       num_applicable_ops_minus1[ i ] | 0 | ue(v) |
|       for( j = 0; j <= num_applicable_ops_minus1[ i ]; j++ ) { | | |
|         applicable_op_temporal_id[ i ][ j ] | 0 | u(3) |
|         applicable_op_num_target_views_minus1[ i ][ j ] | 0 | ue(v) |
|         applicable_op_with_depth_flag[ i ][ j ] | 0 | u(1) |
|         for( k = 0; k <= applicable_op_num_target_views_minus1[ i ][ j ]; k++ ) | | |
|           applicable_op_target_view_id[ i ][ j ][ k ] | 0 | ue(v) |
|         applicable_op_num_views_minus1[ i ][ j ] | 0 | ue(v) |
|       } | | |
|     } | | |
|     ... | | |
| } | | |

In the table above, applicable_op_with_depth_flag[i][j] equal to 1 indicates that in the current operation point (identified by i and j), each target output view contains both a texture component and a depth component, this flag equal to 0 indicates that in the current operation point contains only texture for each target output view. The semantics of the other syntax elements of the 3DVC scalable nesting SEI message are the same as the semantics of the MVC scalable nesting SEI message.

With respect to the fourth way, i.e., using an alternate set of more syntax elements in 3DV SPS extension, there might be depth only operation points. In this instance, operation point creation unit 114 may add a 2-bit indication to signal three different cases for each operation point: texture only, depth only and both texture and depth. The following table illustrates these new syntax elements to be added to the SPS 3DVC extension:

equal to 2 indicates that the current operation point contains only depth for each target output view. Alternatively, applicable_op_with_texture_depth_idc[i][j] can be coded as ue(v).

In some instances, for a 3DV operation point, two different view dependencies may be signaled in, e.g., an active texture MVC SPS and an active view MVC SPS because the depth views may have different inter-view dependencies. One example is that there might be no inter-view dependency at all for depth. In this case the semantics of applicable_op_num_views_minus 1 [i][j] is not clear. In the context of MVC, applicable_op_num_views_minus1[i][j] specifies the number of views to be decoded for a specific operation point.

In some examples, the same view dependency can be assumed for texture and depth. If view dependencies of texture and depth are the same, the semantics of this syntax element (i.e., applicable_op_num_views_minus1[i][j]) can

| seq_parameter_set_3dvc_extension( ) { | C | Descriptor |
|---|---|---|
|     for( i = 0; i <= num_level_values_signalled_minus1; i++ ) | | |
|       num_level_values_signalled_minus1 | 0 | ue(v) |
|     for( i = 0; i <= num_level_values_signalled_minus1; i++ ) { | | |
|       level_idc[ i ] | 0 | u(8) |
|       num_applicable_ops_minus1[i] | 0 | ue(v) |
|       for( j = 0; j <= num_applicable_ops_minus1[ i ]; j++ ) { | | |
|         applicable_op_temporal_id[ i ][ j ] | 0 | u(3) |
|         applicable_op_num_target_views_minus1[ i ][ j ] | 0 | ue(v) |
|         applicable_op_with_texture_depth_idc[ i ][ j ] | 0 | u(2) |
|         for( k = 0; k <= applicable_op_num_target_views_minus1[ i ][ j ]; k++ ) | | |
|           applicable_op_target_view_id[ i ][ j ][ k ] | 0 | ue(v) |
|         applicable_op_num_views_minus1[ i ][ j ] | 0 | ue(v) |
|       } | | |
|     } | | |
|     ... | | |
| } | | |

In the table above, applicable_op_with_texture_depth_idc[i][j] equal to 0 indicates that in the current operation point (identified by i and j), each target output view contains both a texture component and a depth component, applicable_op_with_texture_depth_idc[i][j] equal to 1 indicates that the current operation point contains only texture for each target output view, applicable_op_with_texture_depth_idc[i][j]

be kept aligned to the number of views to be decoded, however, it is implied that each view contains texture and depth.

In some examples, accurate numbers of views to be decoded for both texture and depth are signaled. The following table illustrates syntax elements of a sequence parameter set 3DVC extension that incorporates this aspect of the techniques:

| seq_parameter_set_3dvc_extension( ) { | C | Descriptor |
|---|---|---|
|     for( i = 0; i <= num_level_values_signalled_minus1; i++ ) | | |
|         num_level_values_signalled_minus1 | 0 | ue(v) |
|     for( i = 0; i <= num_level_values_signalled_minus1; i++ ) { | | |
|         level_idc[ i ] | 0 | u(8) |
|         num_applicable_ops_minus1[ i ] | 0 | ue(v) |
|         for( j = 0; j <= num_applicable_ops_minus1[ i ]; j++ ) { | | |
|             applicable_op_temporal_id[ i ][ j ] | 0 | u(3) |
|             applicable_op_num_target_views_minus1[ i ][ j ] | 0 | ue(v) |
|             for( k = 0; k <= applicable_op_num_target_views_minus1[ i ][ j ]; k++ ) | | |
|                 applicable_op_target_view_id[ i ][ j ][ k ] | 0 | ue(v) |
|             applicable_op_num_views_minus1[ i ][ j ] | 0 | ue(v) |
|             applicable_op_num_views_depth_minus1[ i ][ j ] | 0 | ue(v) |
|         } | | |
|     } | | |
|     ... | | |
| } | | |

In the table above, applicable_op_num_views_minus1[i][j] plus 1 specifies the number of texture views required for decoding the target output views corresponding to the j-th operation point to which the level indicated by level_idc[i] applies. Applicable_op_num_views_depth_minus1[i][j] plus 1 specifies the number of depth views required for decoding the target output views corresponding to the j-th operation point to which the level indicated by level_idc[i] applies. Alternatively, applicable_op_num_views_depth_minus1[i][j] is not added but the semantics of applicable_op_num_views_minus1[i][j] is changed. Applicable_op_num_views_minus1[i][j] plus 1 specifies the number of texture views plus the number of depth views required for decoding the target output views corresponding to the j-th operation point to which the level indicated by level_idc[i] applies.

In some instances, the techniques of this disclosure provide for signaling, in a sequence parameter set, a number of texture views to be decoded for an operation point and a number of depth views to be decoded for the operation point. Signaling the number of texture views and the number of depth views may comprise generating, in the sequence parameter set, a syntax element that indicates a number of views to be decoded for the operation point, each of the views having one of the texture views and one of the depth views. Signaling the number of texture views and the number of depth views may comprise generating, in the sequence parameter set, a first syntax element and a second syntax element, the first syntax element specifying the number of texture views to be decoded for the operation point, and the second syntax element specifying the number of depth views to be decoded for the operation point. Signaling the number of texture views and the number of depth views may comprise generating, in the sequence parameter set, a syntax element that indicates the number of texture views to be decoded for the operation point plus the number of depth views to be decoded for the operation point.

In some examples, the techniques of this disclosure may provide for receiving a sequence parameter set that signals a number of texture views to be decoded for an operation point and a number of depth views to be decoded for the operation point. In such examples, the sequence parameter set may include a syntax element that indicates a number of views to be decoded for the operation point, each of the views having one of the texture views and one of the depth views. The sequence parameter set may include a first syntax element and a second syntax element, the first syntax element specifying the number of texture views to be decoded for the operation point, and the second syntax element specifying the number of depth views to be decoded for the operation point. The sequence parameter set may include a syntax element that indicates the number of texture views to be decoded for the operation point plus the number of depth views to be decoded for the operation point.

While various aspects of the techniques are described above as being performed by encapsulation unit 21, the techniques may be performed in a same or reciprocal manner by decapsulation unit 29. Moreover, various aspects of the techniques described above as being performed by encapsulation unit 21 may also, in other implementations, be performed by video encoder 20 (with video decoder 30 performing same or reciprocal operations as those being performed by video encoder 20). Thus, while a particular implementation is shown in the examples of FIG. 1-3, the techniques should not be limited to this example, but may apply to other implementations that provide for separate handling of texture and depth components of a view component specified by multiview video data.

Figure 5:
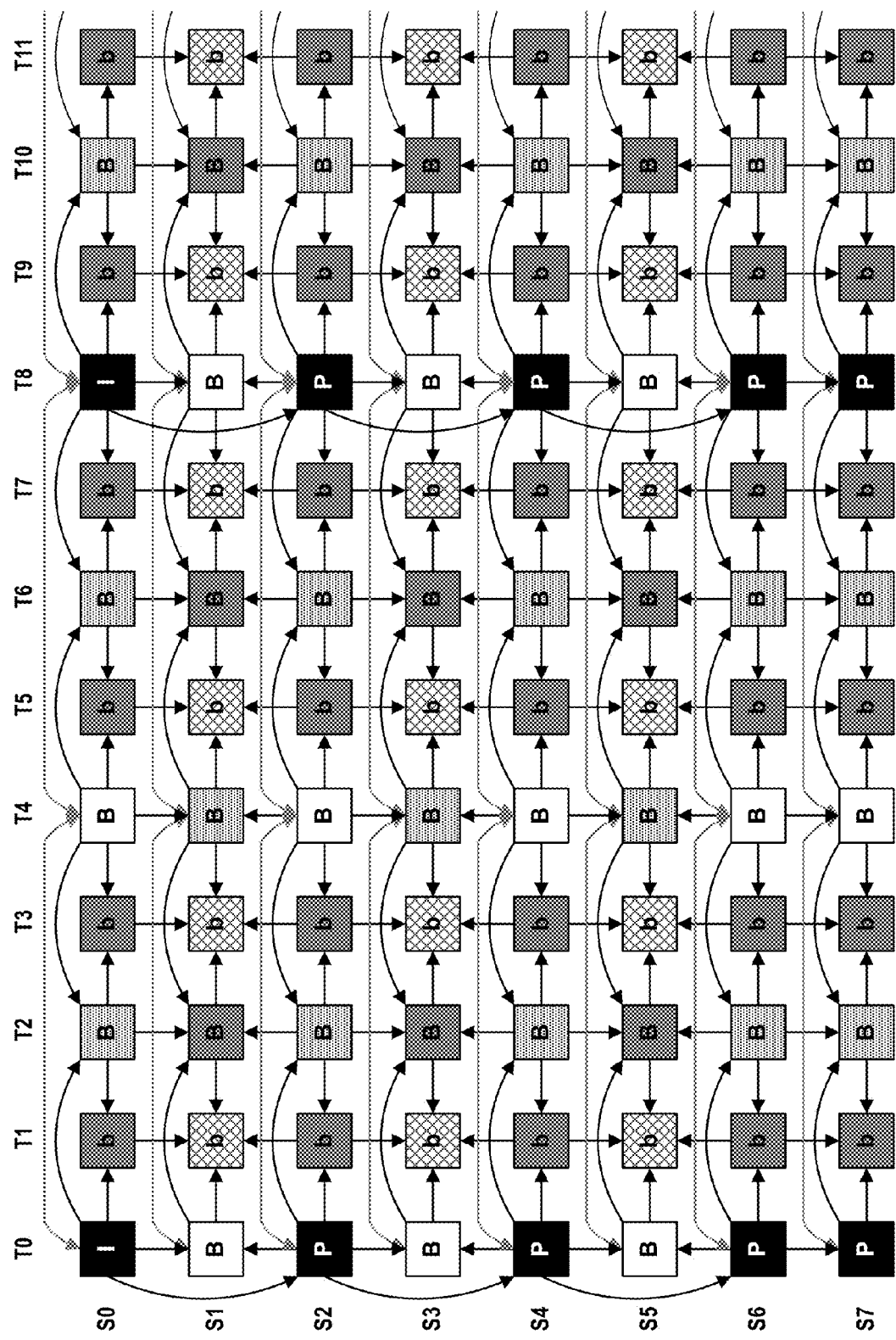
FIG. 5 is a conceptual diagram illustrating an example Multiview Video Coding (MVC) prediction pattern.

FIG. 5 is a conceptual diagram illustrating an example MVC prediction pattern. The following description of MVC again relates to 3DVC in the sense that 3DVC incorporates MVC plus depth. Accordingly, the description of MVC and the various predictions provided by MVC are described to provide context for understanding 3DVC and the techniques described in this disclosure that relate to 3DVC.

In the example of FIG. 5, eight views are illustrated, and twelve temporal locations are illustrated for each view. In general, each row in FIG. 5 corresponds to a view, while each column indicates a temporal location. Each of the views may be identified using a view identifier ("view_id"), which may be used to indicate a relative camera location with respect to the other views. In the example shown in FIG. 5, the view IDs are indicated as "S0" through "S7," although numeric view IDs may also be used. In addition, each of the temporal locations may be identified using a picture order count (POC) value, which indicates a display order of the pictures. In the example shown in FIG. 4, the POC values are indicated as "T0" through "T11."

Although MVC has a so-called base view which is decodable by H.264/AVC decoders and stereo view pair can be supported by MVC, MVC may support more than two views as a 3D video input. Accordingly, a renderer of a client having an MVC decoder may expect 3D video content with multiple views.

Pictures in FIG. 5 are indicated using a shaded block including a letter, designating whether the corresponding picture is intra-coded (that is, an I-frame), or inter-coded in one direction (that is, as a P-frame) or in multiple directions (that is, as a B-frame). In general, predictions are indicated by arrows, where the pointed-to picture uses the point-from object for prediction reference. For example, the P-frame of view S2 at temporal location T0 is predicted from the I-frame of view S0 at temporal location T0. Each of the pictures shown in FIG. 5 may be referred to as a view component.

As with single view video encoding, pictures of a multi-view video sequence may be predictively encoded with respect to pictures at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, pictures may be inter-view predicted. That is, a view component can use the view components in other views for reference. In MVC, for example, inter-view prediction is realized as if the view component in another view is an inter-prediction reference. The potential inter-view references may be signaled in the SPS MVC extension and may be modified by the reference picture list construction process, which enables flexible ordering of the inter-prediction or inter-view prediction references.

FIG. 5 provides various examples of inter-view prediction. Pictures of view S1, in the example of FIG. 5, are illustrated as being predicted from pictures at different temporal locations of view S1, as well as inter-view predicted from pictures of pictures of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 5, capital "B" and lowercase "b" are intended to indicate different hierarchical relationships between pictures, rather than different encoding methodologies. In general, capital "B" frames are relatively higher in the prediction hierarchy than lowercase "b" frames. FIG. 5 also illustrates variations in the prediction hierarchy using different levels of shading, where a greater amount of shading (that is, relatively darker) pictures are higher in the prediction hierarchy than those pictures having less shading (that is, relatively lighter). For example, all I-frames in FIG. 5 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that pictures relatively higher in the prediction hierarchy should be decoded before decoding pictures that are relatively lower in the hierarchy, such that those pictures relatively higher in the hierarchy can be used as reference pictures during decoding of the pictures relatively lower in the hierarchy. A view order index is an index that indicates the decoding order of view components in an access unit. The view order indices may be implied in a parameter set, such as an SPS.

In this manner, pictures used as reference pictures may be decoded before decoding the pictures that are encoded with reference to the reference pictures. A view order index is an index that indicates the decoding order of view components in an access unit. According to MVC/AVC, for each view order index i, the corresponding view_id is signaled. The decoding of the view components follows the ascending order of the view order indexes. If all the views are presented, then the set of view order indexes comprises a consecutively ordered set from zero to one less than the full number of views.

In some instances, a subset of a whole bitstream can be extracted to form a sub-bitstream which still conforms to MVC. There are many possible sub-bitstreams that specific applications may require, based on, for example, a service provided by a server, the capacity, support, and capabilities of decoders of one or more clients, and/or the preference of one or more clients. For example, a client might require only three views, and there might be two scenarios. In one example, one client may require a smooth viewing experience and might prefer views with view_id values S0, S1, and S2, while another other client may require view scalability and prefer views with view_id values S0, S2, and S4. Both of these sub-bitstreams can be decoded as independent MVC bitstreams and can be supported simultaneously.

While FIG. 5 shows eight views (S0-S7), as noted above, the MVC/AVC extension supports up to 1024 views and uses a view_id in a NAL unit header to identify the view to which a NAL unit belongs. A view order index may be signaled as part of a NAL unit header. That is, for purposes of comparison, a view order index may replace the view_id that is signaled in the NAL unit header of the MVC/AVC extension. View order generally describes the ordering of the views in an access unit, and a view order index identifies a particular view in view order of the access unit. That is, a view order index describes the decoding order of a corresponding view component of an access unit.

Accordingly, an SPS may provide a relationship between view_ids for the views and view order indexes for the views. Using the view order index and the data in the SPS, video encoder 20 and video decoder 30 may replace the 10 bit view_id of MVC/AVC in the NAL unit header by the view order index, which may lead to a bit savings over the MVC/AVC scheme.

An example SPS that provides a relationship between view_ids for the views and view order indexes is provided in the table below:

| SEQUENCE PARAMETER SET MVC EXTENSION | | |
|---|---|---|
| seq_parameter_set_mvc_extension( ) { | C | Descriptor |
|   num_views_minus1 | 0 | ue(v) |
|   for( i = 0; i <= num_views_minus1; i++ ) { | | |
|     view_id[ i ] | 0 | ue(v) |
|     view_level[ i ] | 0 | ue(v) |
|   } | | |
|   for( i = 1; i <= num_views_minus1; i++ ) { | | |
|     num_ref_views[ i ] | 0 | ue(v) |
|     for( j = 0; j < num_ref_views[ i ]; j++ ) | | |
|       ref_view_idx[ i ][ j ] | 0 | ue(v) |

SEQUENCE PARAMETER SET MVC EXTENSION

| seq_parameter_set_mvc_extension( ) { | C | Descriptor |
|---|---|---|
| } | | |
| num_level_values_signalled_minus1 | 0 | ue(v) |
| for( i = 0; i <= num_level_values_signalled_minus1; i++ ) { | | |
|     level_idc[ i ] | 0 | u(8) |
|     num_applicable_ops_minus1[i] | 0 | ue(v) |
|     for( j = 0; j <= num_applicable_ops_minus1[ i ]; j++ ) { | | |
|         applicable_op_temporal_id[ i ][ j ] | 0 | u(3) |
|         applicable_op_num_target_views_minus1[ i ][ j ] | 0 | ue(v) |
|         for( k = 0; k <= applicable_op_num_target_views_minus1[ i ][ j ]; k++ ) | | |
|             applicable_op_target_view_idx[ i ][ j ][ k ] | 0 | ue(v) |
|         applicable_op_num_views_minus1[ i ][ j ] | 0 | ue(v) |
|     } | | |
| } | | |
| } | | |

The SPS shown in the above Table specifies inter-view dependency relationships for a coded video sequence. The SPS also specifies level values for a subset of the operation points for the coded video sequence. All SPSs that are referred to by a coded video sequence should be identical. However, some views identified by view_id[i] may not be present in the coded video sequence. In addition, some views or temporal subsets described by the SPS may have been removed from the original coded video sequence, and thus may not be present in the coded video sequence. The information in the SPS, however, may always apply to the remaining views and temporal subsets.

In the above table, the num_views_minus1 plus 1 syntax element specifies the maximum number of coded views in the coded video sequence. The value of num_view_minus1 may be in the range of 0 to 31, inclusive. In some instances, the actual number of views in the coded video sequence may be less than num_views_minus1 plus 1. The view_id[i] element specifies the view identifier of the view with a view order index equal to i. The view_level[i] element specifies the view_level of the view with a view order index equal to i. In some examples, all view components with a view_level up to a predefined value (VL) may be decodable without decoding any view component with a view_level larger than VL.

The num_ref_views[i] element specifies the number of view components for inter-view prediction in the initial reference picture list RefPicList0 and RefPicList1 when decoding view components with view order index equal to i. The value of the num_ref_views[i] element may not be greater than Min(15, num_views_minus1). The value of num_ref_views[0] may be equal to 0. In addition, the ref_view_idx[i][j] element may specify the view order index of the j-th view component for inter-view prediction in the initial reference picture list RefPicList0 and RefPicList1 when decoding a view component with view order index equal to i. The value of ref_view_idx[i][j] may be in the range of 0 to 31, inclusive.

Figure 6:
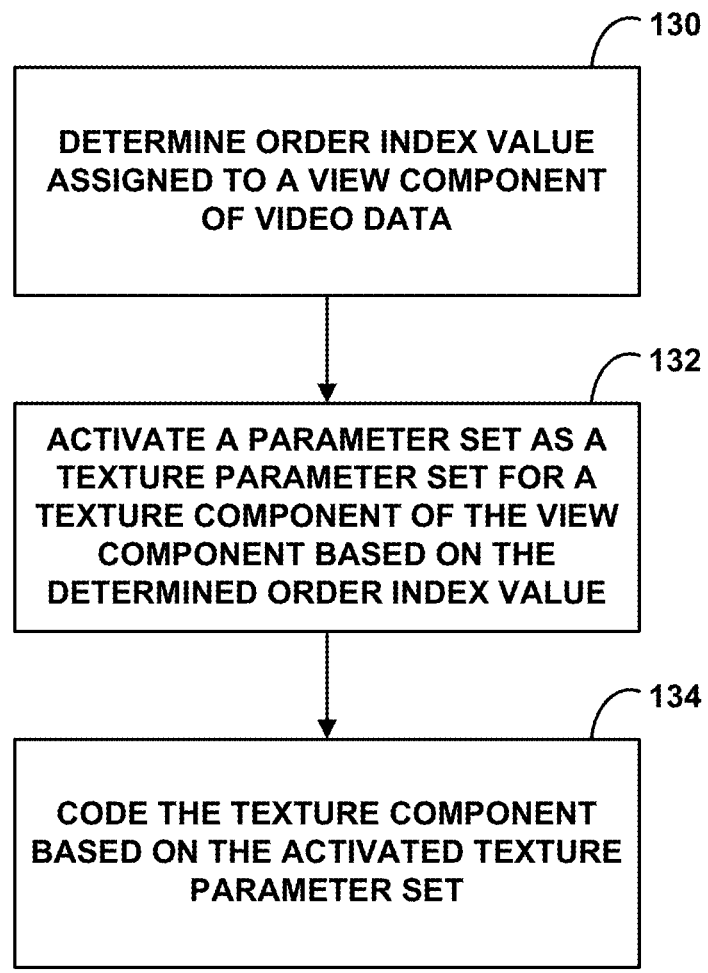
FIG. 6 is a flow diagram illustrating operation of a video coding device in implementing parameter set activation for MVC-compatible 3DVC in accordance with various aspects of the techniques described in this disclosure.

FIG. 6 is a flow diagram illustrating operation of a video coding device in implementing parameter set activation in accordance with various aspects of the techniques described in this disclosure. Initially, a video coding device, such as video decoder 30, may determine an order index value assigned to a view component of multiview video data (130). This order index value is described above in more detail with respect to FIG. 5. As described above, video decoder 30 may then activate a parameter set as a texture parameter set for the texture component of the view component based at least on the determined view order index value assigned to the view component of the multiview video data (132). After activating this texture parameter set, video encoder 30 may then code the texture component of the view component based on the activated texture parameter set (134).

In some instances, video decoder 30 codes only the texture component of the view component and not the depth component of the view component based on the activated texture parameter set. In some instances, video decoder 30 activates another parameter set for the depth component of the view component based at least on the view order index value assigned to the view component of the multiview video data and decodes the depth component of the view component based on the parameter set activated for the depth component of the view component and not the activated texture parameter set in the manner described above. Thus, while not explicitly shown in the example of FIG. 6, additional parameter sets may be individually activated for the depth component, which video decoder 30 may then use to decode the depth component but not the texture component.

In some of the above described instances, video decoder 30 may activate a sequence parameter set for coding the view component of the multiview video data based at least on the view order index value assigned to the view component of the multiview video data. Moreover, as noted above, video decoder 30 may activate a sequence parameter set as the texture sequence parameter set for the texture component of the view component based at least on the view order index value assigned to the view component of the multiview video data such that one or more syntax elements specified by the texture sequence parameter set either override or augment one or more syntax elements specified by the activated sequence parameter set.

In some of the above described examples, video decoder 30 may activate a picture parameter set as the texture picture parameter set for the texture component of the view component based at least on the view order index value assigned to the view component of the multiview video data such that one or more syntax elements specified by the texture picture parameter set either override or augment one or more syntax elements specified by the activated sequence parameter set.

In some of the above described examples, video decoder 30 may activate a picture parameter set as a view picture parameter set for the view component of the multiview video data based at least on the view order index value assigned to the view component of the multiview video data. Additionally, video decoder 30 may then activate the parameter set as the texture parameter set by activating a picture parameter set as the texture picture parameter set for the texture component of the view component based at least on the view order index value assigned to the view component of the multiview video data such that one or more syntax elements specified by the texture picture parameter set either override or augment one or more syntax elements specified by the activated view picture parameter set.

In some examples, video decoder 30 may then activate the parameter set as the texture parameter set by activating one or more of a sequence parameter set and a picture parameter as a texture sequence parameter set and a texture picture parameter set, respectively, for the texture component of the view component based at least on the view order index value assigned to the view component of the multiview video data.

It should also be understood that the steps shown and described with respect to FIG. 6 are provided as merely one example. That is, the steps shown in the example of FIG. 6 need not necessarily be performed in the order shown in FIG. 6, and fewer, additional, or alternative steps may be performed. Moreover, while the techniques are described above with respect to a particular video coder, i.e., video decoder 30, the techniques may be implemented by any video coder, including video encoder 20.

Figure 7:
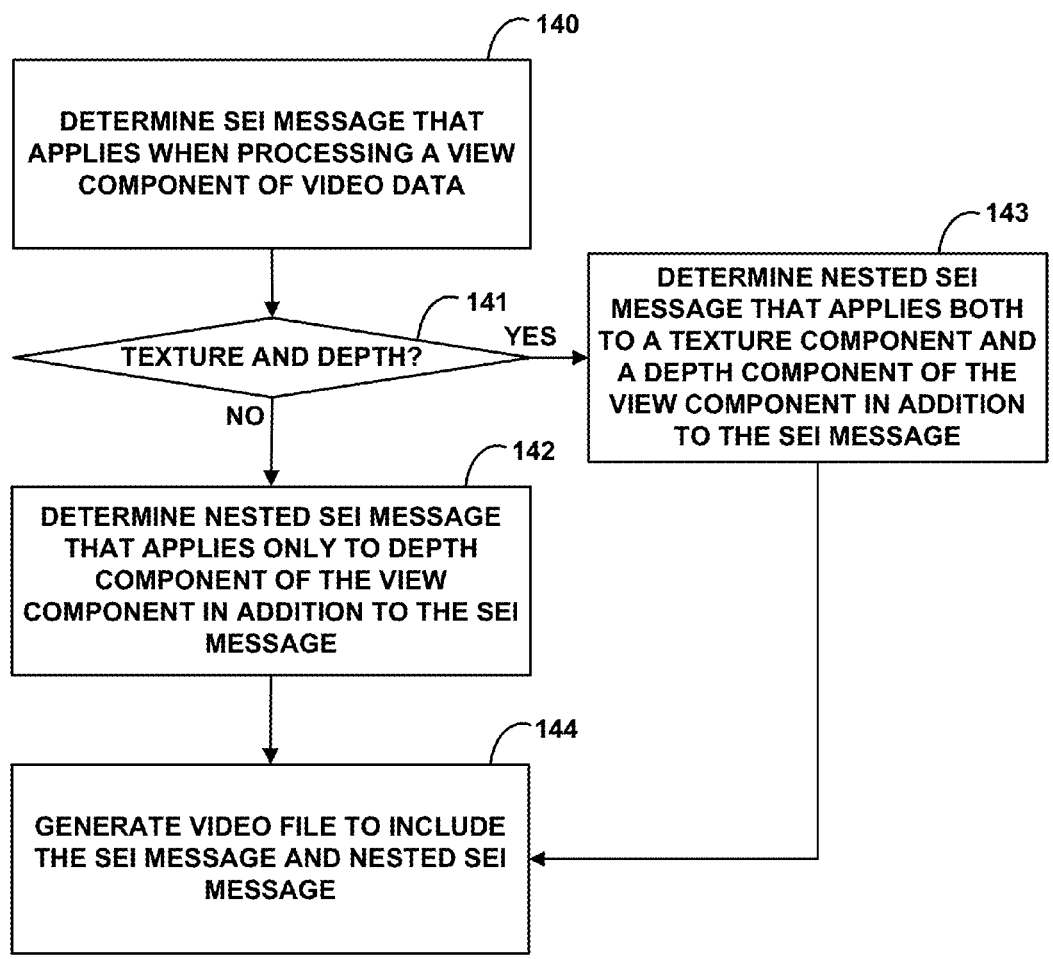
FIG. 7 is a flow diagram illustrating example operation of processing multiview video data to generate nested supplemental enhancement information (SEI) messages for MVC-compatible 3DVC in accordance with the techniques described in this disclosure.

FIG. 7 is a flow diagram illustrating example operation of processing multiview video data to generate nested SEI messages in accordance with the techniques described in this disclosure. While described with respect to a particular unit below, i.e., encapsulation unit 21, the techniques may generally be implemented by any video coding device, including destination device 14 and more particularly decapsulation unit 29 of destination device 14.

Initially, encapsulation unit 21 receives encoded multiview video data and invokes SEI message generation unit 108, which determines a supplemental enhancement information (SEI) message that applies when processing the view component of the multiview video data in the manner described above (140). SEI message generation unit 108 may, as described above, also determine whether a nested SEI message applies to both texture and depth components of the view component or only to the depth component of the view component (141). Upon determining that the nested SEI message applies only to the depth component ("NO" 141), SEI message generation unit 108 may determine a nested supplemental enhancement information message that applies only to the depth component of the view component in addition to the supplemental enhancement information message (142). However, upon determining that the nested SEI message applies to both the depth and texture components ("YES" 141), SEI message generation unit 108 may determine a nested supplemental enhancement information message that applies both to the texture component and the depth component of the view component in addition to the supplemental enhancement information message (143). Video file creation unit 104 may then generate a video file that includes both the SEI message and the nested SEI message (144).

In some instances, encapsulation unit 21 generates this video file and provides this video file to router 36 or another device, such as a video server of content delivery network 34 (both of which are described above with respect to the example of FIG. 1). This device may then process the depth component of the view component based on the supplemental enhancement information message and the nested supplemental enhancement information message.

In some examples, encapsulation unit 21 determines the nested supplemental enhancement information message that applies in addition to the parent supplemental enhancement information message when only coding the depth component of the view component. Router 36 in this instance may then process only the depth component of the view component and not the texture component of the view component based on the parent supplemental enhancement information message and the nested supplemental enhancement information message.

As noted above, encapsulation unit 21 may determine whether the nested supplemental enhancement information message applies in addition to the supplemental enhancement information message when coding the texture component of the view component. As a result, router 36 may, in this instance, process the texture component of the view component based on the supplemental enhancement information message and the nested supplemental enhancement information message based on the determination of whether the nested supplemental enhancement information message applies in addition to the supplemental enhancement information message when coding the texture component of the view component.

When determining that the nested supplemental enhancement message applies in addition to the supplemental enhancement information message when processing the texture component of the view component, router 36 may identify a flag in the nested supplemental enhancement information message that specifies whether or not the nested supplemental enhancement information message applies only to the depth component or to both the view component and the depth component and determine that the nested supplemental enhancement message applies in addition to the supplemental enhancement information message when coding the texture component of the view component based on the identified flag. The flag may comprise one or more of a supplemental enhancement information view applicability flag and a supplemental enhancement information operational view applicability flag.

In some instances, when determining whether the nested supplemental enhancement information message applies in addition to the supplemental enhancement information message when processing the texture component of the view component, router 36 may determine that the nested supplemental enhancement information message applies, in addition to the supplemental enhancement information message, when processing both the depth component of the view component and the texture component of the view component. Router 36 may, in this instance, process the texture component of the view component based on the supplemental enhancement information message and the nested supplemental enhancement information message.

In some instances, when determining whether the nested supplemental enhancement information message applies in addition to the supplemental enhancement information message when coding the texture component of the view component, router 36 may determine that the nested supplemental enhancement information message only applies in addition to the supplemental enhancement information message when coding the depth component of the view component and not the texture component of the view component. As a result, router 36 may process the texture component of the view component based on the supplemental enhancement information message and not based on the nested supplemental enhancement information message.

It should also be understood that FIG. 7 merely provides one example. That is, the steps shown in the example of FIG. 7 need not necessarily be performed in the order shown in FIG. 7, and fewer, additional, or alternative steps may be performed.

Figure 8:
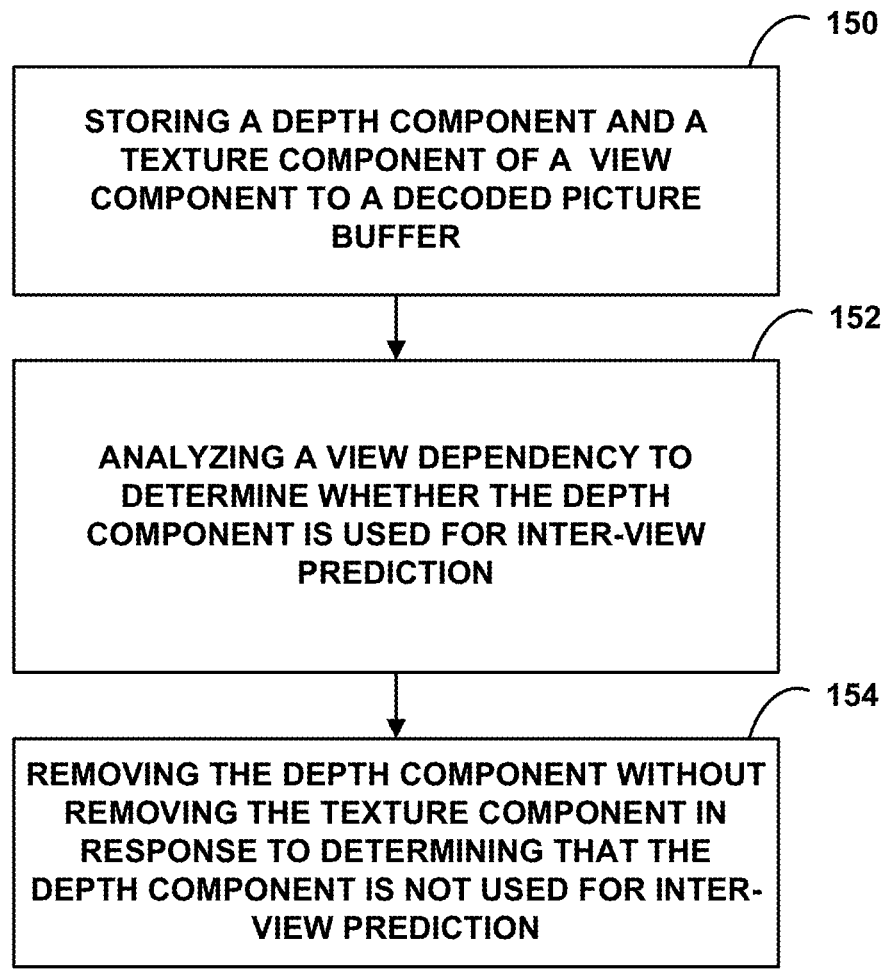
FIG. 8 is a flow diagram illustrating example operation of a video coding device in separately removing texture and depth components from a decoded picture buffer for MVC-compatible 3DVC in accordance with the techniques described in this disclosure.

FIG. 8 is a flow diagram illustrating example operation of a video coding device in separately removing texture and depth components from a decoded picture buffer in accordance with the techniques described in this disclosure. The example shown in FIG. 8 is generally described as being performed by video decoder 30 (FIGS. 1 and 3). However, it should be understood that the process described with respect to FIG. 8 may be carried out by a variety of other processors, processing units, hardware-based coding units such as encoder/decoders (CODECs), and the like.

In general, video decoder 30 may store a depth component and a texture component of a view component (specified by multiview video data) in a decoded picture buffer, which is shown as reference picture memory 92 in the example of FIG. 3 (150). Video decoder 30 may then analyze a view dependency to determine whether the depth component is used for inter-view prediction (where such view dependency may be reflected above with respect to the example of FIG. 5; 152). Video decoder 30 may analyze this view dependency only for the depth component and separately analyze a view dependency when attempting to remove the associated texture component from reference picture memory 92. In some instances, the view dependency is signaled in a multiview video coding sequence parameter set extension of a subset sequence parameter set. The subset sequence parameter set may contain a three dimensional video profile and is activated as an active view multiview video coding sequence parameter set when analyzing the view dependency. In any event, video decoder 30 may then remove the depth component from reference picture memory 92 without removing the texture component in response to determining that the depth component is not used for inter-view prediction (154).

Prior to removing this depth component, video decoder 30 may qualify the depth component as eligible for removal by determining that the depth component does not belong to a target output view and is associated with a network abstraction layer reference identification code having a value equal to zero. As a result of potentially providing separate handling of depth and texture components, video decoder 30 may determine one or more reference pictures for the depth component that are different from the texture component. That is, video decoder 30 may determine the one or more reference pictures for the depth component by, at least, determining a reference picture list that identifies the one or more reference pictures for the depth component and determining a reference picture list that identifies one or more additional reference pictures for the texture component, wherein the one or more additional reference pictures determined for the texture component are different than the one or more reference pictures determined for the depth component.

In determining the reference picture list for the depth component video decoder 30 may determine the reference picture list for the depth component and the texture component based on markings of the depth and texture components by video encoder 20, which are used to identify the reference picture list for the depth component separately from marking the texture component. In some instances, one or more syntax elements may be used to separately mark the depth component with the reference picture list determined for the depth component and one or more syntax elements are used to separately mark the texture component with the reference picture list determined for the texture component.

In some instances, video decoder 30 may determine that the depth component and the texture component belong to a target output view to be output for display and simultaneously or nearly simultaneously output the depth component and the texture component.

It should be understood that the steps shown and described with respect to the example of FIG. 8 are provided as merely one example. That is, the steps shown in the example of FIG. 8 need not necessarily be performed in the order shown in FIG. 8, and fewer, additional, or alternative steps may be performed.

Figure 9:
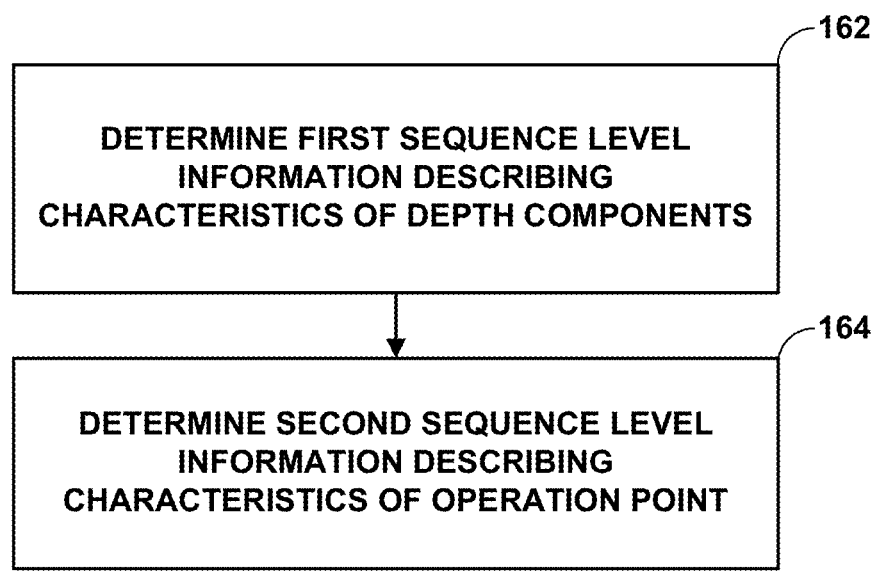
FIG. 9 is a flow diagram illustrating example operation of a video coding device in determining sequence level information for MVC-compatible 3DVC in accordance with the techniques described in this disclosure.

FIG. 9 is a flow diagram illustrating example operation of a video coding device in determining sequence level information for MVC-compatible 3DVC in accordance with the techniques described in this disclosure. The example shown in FIG. 8 is generally described as being performed by video decoder 30 (FIGS. 1 and 3). However, it should be understood that the process described with respect to FIG. 8 may be carried out by a variety of other processors, processing units, hardware-based coding units such as encoder/decoders (CODECs), and the like.

As described above, video decoder 30 may determine first sequence level information describing characteristics of the depth components and determining second sequence level information describing characteristics of an operation point of the video data (160, 162). Moreover, video decoder 30 may determining a reference picture list that identifies one or more reference pictures for the depth components indicated in the three-dimensional video coding sequence parameter set.

In some examples, the second sequence level information includes a three-dimensional video coding sequence parameter set that described, for the operation point, a list of target output views, a number of texture views to be decoded when decoding the operation point, and a number of depth views to be decoded for when decoding the operation point, where the number of texture views to be decoded is different form the number of depth views. In some examples, video decoder 30 may further target, for each of the target output views specified in the list of target output views, the one or more depth components when available.

In some examples, video decoder 30 may specify a three-dimensional video coding scalability information SEI message as part of the video data, wherein three-dimensional video coding scalability information SEI message includes a description of the operation point without the depth components or a description of the operation point with the depth components. In some instances, the SEI message includes an indication of whether the operation point includes the depth components. Moreover, in some examples, the SEI message includes an indication of whether the operation point includes the depth components and directly dependent depth views with directly dependent texture views for the decoding of the operation point.

It should be understood that the steps shown and described with respect to the example of FIG. 9 are provided as merely one example. That is, the steps shown in the example of FIG. 9 need not necessarily be performed in the order shown in FIG. 9, and fewer, additional, or alternative steps may be performed.

While certain syntax elements described with respect to this disclosure have been provided example names for purposes of explanation, it should be understood that the concepts described in this disclosure are more generally applicable to any syntax elements, regardless of name. For example, while certain aspects refer to a "view order index," "view_order_index" or "view_idx," it should be understood that such a syntax element may be given an alternative name in a future coding standard.

While certain techniques of this disclosure are described with respect to the H.264 standard, it should be understood that the techniques are not necessarily limited to a particular coding standard. That is, the techniques more generally relate to achieving coding efficiencies in 3DVC, for example, through shorter and/or less complex NAL units and parameter sets, as described above.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method of coding video data including a view component comprising a depth component and a texture component, the method comprising:
    activating, with a processor of a device, a parameter set as a texture parameter set for the texture component of the view component, the texture parameter set being stored to a memory of the device;
    coding, with the processor, only the texture component of the view component and not the depth component of the view component based on the activated texture parameter set;
    activating, with the processor, a parameter set for the depth component of the view component concurrent to the activation of the texture parameter set, the parameter set for the depth component being stored to the memory; and
    coding, with the processor, the depth component of the view component based on the parameter set activated for the depth component of the view component and not the activated texture parameter set.

2. The method of claim 1, further comprising activating a picture parameter set as a depth picture parameter set for the depth view component of the video data.

3. The method of claim 1, wherein coding the texture component of the view component comprises coding only the texture component of the view component and not the depth component of the view component based on the activated texture parameter set.

4. The method of claim 1, further comprising activating a texture sequence parameter set for coding the texture view component and all other texture view components of the video data within a same view of the video data.

5. The method of claim 1, further comprising activating a depth sequence parameter set for coding the depth view component and all other depth view components of the video data based within a same view of the video data.

6. The method of claim 1, further comprising activating a picture parameter set as a view picture parameter set for the texture view component of the video data.

7. The method of claim 1, wherein coding the texture component comprises encoding, with a video encoder, the texture component of the view component based on the activated texture parameter set.

8. The method of claim 1, wherein coding the texture component comprises decoding, with a video decoder, the texture component of the view component based on the activated texture parameter set.

9. The method of claim 1, wherein the depth component and the texture component have different resolutions.

10. The method of claim 1, wherein the video data conforms to a three-dimensional video coding extension to a H.264/Advanced Video Coding standard and is backwards compatible with a multiview video coding extension to the H.264/Advanced Video Coding standard.

11. A video coding device for coding video data including a view component comprised of a depth component and a texture component, the video coding device comprising:
   a processor configured to activate a parameter set as a texture parameter set for the texture component of the view component, code only the texture component of the view component and not the depth component of the view component based on the activated texture parameter set, activate a parameter set for the depth component of the view component concurrent to the activation of the texture parameter set, and code the depth component of the view component based on the parameter set activated for the depth component of the view component and not the activated texture parameter set; and
   a memory configured to store the texture parameter set and the parameter set activated for the depth component.

12. The video coding device of claim 11, wherein the processor is further configured to activate a picture parameter set as a depth picture parameter set for the depth view component of the video data.

13. The video coding device of claim 11, wherein the processor is further configured to, when coding the texture component of the view component, code only the texture component of the view component and not the depth component of the view component based on the activated texture parameter set.

14. The video coding device of claim 11, wherein the processor is further configured to activate a texture sequence parameter set for coding the texture view component and all other texture view components of the video data within a same view of the video data.

15. The video coding device of claim 11, wherein the processor is further configured to activate a depth sequence parameter set for coding the depth view component and all other depth view components of the video data based within a same view of the video data.

16. The video coding device of claim 11, wherein the processor is further configured to activate a picture parameter set as a view picture parameter set for the texture view component of the video data.

17. The video coding device of claim 11, wherein the processor is further configured to, when coding the texture component, encode the texture component of the view component based on the activated texture parameter set.

18. The video coding device of claim 11, wherein the processor is further configured to, when coding the texture component, decode the texture component of the view component based on the activated texture parameter set.

19. The video coding device of claim 11, wherein the depth component and the texture component have different resolutions.

20. The video coding device of claim 11, wherein the video data conforms to a three-dimensional video coding extension to a H.264/Advanced Video Coding standard and is backwards compatible with a multiview video coding extension to the H.264/Advanced Video Coding standard.

21. A video coding device for coding video data including a view component comprised of a depth component and a texture component, the video coding device comprising:
   means for activating a parameter set as a texture parameter set for the texture component of the view component;
   means for storing the texture parameter set;
   means for coding only the texture component of the view component and not the depth component of the view component based on the activated texture parameter set,
   means for activating a parameter set for the depth component of the view component concurrent to the activation of the texture parameter set;
   means for storing the parameter set activated for the depth component; and
   means for coding the depth component of the view component based on the parameter set activated for the depth component of the view component and not the activated texture parameter set.

22. The video coding device of claim 21, further comprising means for activating a picture parameter set as a depth picture parameter set for the depth view component of the video data.

23. The video coding device of claim 21, wherein the means for coding the texture component of the view component comprises means for coding only the texture component of the view component and not the depth component of the view component based on the activated texture parameter set.

24. The video coding device of claim 21, further comprising means for activating a texture sequence parameter set for coding the texture view component and all other texture view components of the video data within a same view of the video data.

25. The video coding device of claim 21, further comprising means for activating a depth sequence parameter set for coding the depth view component and all other depth view components of the video data based within a same view of the video data.

26. The video coding device of claim 21, further comprising means for activating a picture parameter set as a view picture parameter set for the texture view component of the video data.

27. The video coding device of claim 21, wherein the depth component and the texture component have different resolutions.

28. The video coding device of claim 21, wherein the video data conforms to a three-dimensional video coding extension to a H.264/Advanced Video Coding standard and is backwards compatible with a multiview video coding extension to the H.264/Advanced Video Coding standard.

29. A non-transitory computer-readable storage medium having stored thereon instructions that, when executed, cause one or more processors of a video coding device to:

activate a parameter set as a texture parameter set for the texture component of the view component;

code only the texture component of the view component and not the depth component of the view component based on the activated texture parameter set;

activate a parameter set for the depth component of the view component concurrent to the activation of the texture parameter set; and code the depth component of the view component based on the parameter set activated for the depth component of the view component and not the activated texture parameter set.

30. The non-transitory computer-readable storage medium of claim 29, further having stored thereon instructions that, when executed cause the one or more processors to activate a picture parameter set as a depth picture parameter set for the depth view component of the video data.

31. The non-transitory computer-readable storage medium of claim 29, wherein the instructions that, when executed, cause the one or more processors to code the texture component of the view component comprise instructions that, when executed, cause the one or more processors to code only the texture component of the view component and not the depth component of the view component based on the activated texture parameter set.

32. The non-transitory computer-readable storage medium of claim 29, further having stored thereon instructions that, when executed cause the one or more processors to activate a texture sequence parameter set for coding the texture view component and all other texture view components of the video data within a same view of the video data.

33. The non-transitory computer-readable storage medium of claim 29, further having stored thereon instructions that, when executed cause the one or more processors to activate a depth sequence parameter set for coding the depth view component and all other depth view components of the video data based within a same view of the video data.

34. The non-transitory computer-readable storage medium of claim 29, further having stored thereon instructions that, when executed cause the one or more processors to activate a picture parameter set as a view picture parameter set for the texture view component of the video data.

35. The non-transitory computer-readable storage medium of claim 29, wherein the instructions that, when executed, cause the one or more processors to code the texture component comprise instructions that, when executed, cause the one or more processors to encode the texture component of the view component based on the activated texture parameter set.

36. The non-transitory computer-readable storage medium of claim 29, wherein the instructions that, when executed, cause the one or more processors to coding the texture component comprise instructions that, when executed, cause the one or more processors to decode the texture component of the view component based on the activated texture parameter set.

37. The non-transitory computer-readable storage medium of claim 29, wherein the depth component and the texture component have different resolutions.

38. The non-transitory computer-readable storage medium of claim 29, wherein the video data conforms to a three-dimensional video coding extension to a H.264/Advanced Video Coding standard and is backwards compatible with a multiview video coding extension to the H.264/Advanced Video Coding standard.

* * * * *